US007783129B2

(12) United States Patent  (10) Patent No.: US 7,783,129 B2
Aoyama et al.  (45) Date of Patent: *Aug. 24, 2010

(54) IMAGE PROCESSING APPARATUS, IMAGE PROCESSING SYSTEM AND IMAGE PROCESSING METHOD

(75) Inventors: Koji Aoyama, Saitama (JP); Tohru Kurata, Saitama (JP); Atsushi Nose, Kanagawa (JP); Kimitaka Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/232,766

(22) Filed: Sep. 24, 2008

(65) Prior Publication Data

US 2009/0046179 A1    Feb. 19, 2009

Related U.S. Application Data

(63) Continuation of application No. 10/524,758, filed as application No. PCT/JP03/10410 on Aug. 18, 2003, now Pat. No. 7,457,478.

(30) Foreign Application Priority Data

Aug. 20, 2002    (JP)    ............................. 2002-239865

(51) Int. Cl.
  *G06K 9/40* (2006.01)
  *G06K 9/32* (2006.01)
  *G01B 9/00* (2006.01)
(52) U.S. Cl. .................. 382/275; 382/255; 382/274; 382/293; 356/124
(58) Field of Classification Search ............ 382/254, 382/274–275, 293, 298; 356/124–426
See application file for complete search history.

(56) References Cited

U.S. PATENT DOCUMENTS 5,048,102 A  *  9/1991  Tararine et al. ............. 382/300
(Continued)

FOREIGN PATENT DOCUMENTS

EP         0 479 618 A2    4/1992
(Continued)

OTHER PUBLICATIONS

Nijmeijer et. al., "Correction of Lens-Distortion for Real-Time Image Processing Systems", Proceedings of the 1993 IEEE Workshop on VLSI Signal Processing, Veldhoven, The Netherlands, Oct. 1993, pp. 316-324.*

(Continued)

*Primary Examiner*—Vu Le
*Assistant Examiner*—Nathan Bloom
(74) *Attorney, Agent, or Firm*—Rader, Fishman & Grauer PLLC

(57) ABSTRACT

An image processing apparatus, an image processing system and an image processing method can correct the distortion of an image at a low cost and can generate a high quality image in real time. An image processing apparatus is provided which is an image processing apparatus for correcting an original image having distortion. The apparatus includes a horizontal one-dimensional interpolating unit (501) for correcting the distortion in the horizontal direction by performing a one-dimensional interpolation operation using a horizontal correcting parameter Xm which indicates a correction quantity in the horizontal direction at a pixel point constituting the original image, and a vertical one-dimensional interpolating unit (502) for correcting the distortion of the original image in the vertical direction by performing the one-dimensional interpolation operation to the image obtained by the correction by the horizontal one-dimensional interpolating unit (501), using a vertical correcting parameter Ym which indicates a correction quantity in the vertical direction at the pixel point constituting the original image.

8 Claims, 35 Drawing Sheets

U.S. PATENT DOCUMENTS

| | | | |
|---|---|---|---|
| 5,276,519 A | | 1/1994 | Richards et al. |
| 5,675,380 A | | 10/1997 | Florent et al. |
| 6,141,382 A | * | 10/2000 | Krishnamurthy et al. .................. 375/240.17 |
| 6,538,691 B1 | * | 3/2003 | Macy et al. .............. 348/222.1 |
| 2002/0196472 A1 | * | 12/2002 | Enomoto ................... 358/3.26 |
| 2003/0020732 A1 | * | 1/2003 | Jasa et al. .................. 345/645 |

FOREIGN PATENT DOCUMENTS

| | | |
|---|---|---|
| EP | 0 689 353 A2 | 12/1995 |
| JP | 04-061570 | 2/1992 |
| JP | 04-354068 | 12/1992 |
| JP | 06-205273 | 7/1994 |
| JP | 2000-184247 | 6/2000 |
| JP | 2000-324339 | 11/2000 |
| JP | 2001-086332 | 3/2001 |
| JP | 2002-015327 | 1/2002 |
| JP | 2002-190979 | 7/2002 |
| JP | 2002-232838 | 8/2002 |
| JP | 2002-335438 | 11/2002 |

OTHER PUBLICATIONS

Supplementary European Search Report dated Jan. 10, 2008 for corresponding European Application No. EP 03 79 2699.

Ilmar A. Hein, et al. Medical Imaging 2000: Physics of Medical Imaging, Proceedings of SPIE, vol. 3977, No. 1605-7422/00, 2000, pp. 621-632, XP002460756.

J. C. Aparicio Fernandes, et al. Fast Correction of Lens Distortion for Image Applications, ISIE 1997- Guimaraes, Portugal, [age 708, XP002460757.

Ed Catmill, et al., 3-D Transformations of Images in Scanline Order, Proceedings of teh 7th Annual Conference on Computer Graphics and Interactive Techniques, 1980. pp. 279-285, XP002460758.

Japanese Office Action dated Feb. 12, 2008 for corresponding Japanese Application No. 2002-239865.

* cited by examiner

Fig.3A 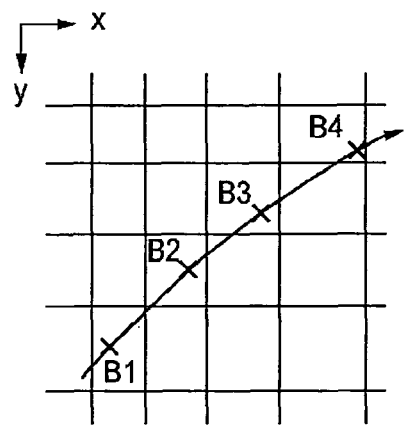 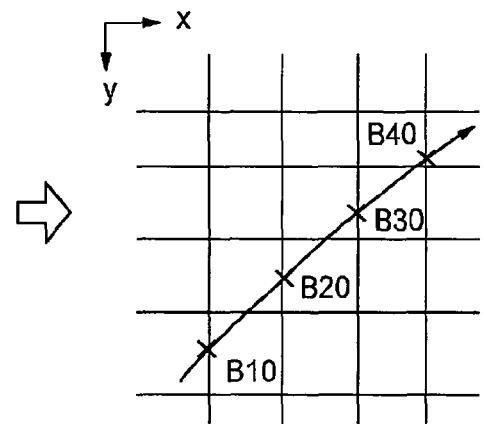
Fig.3B 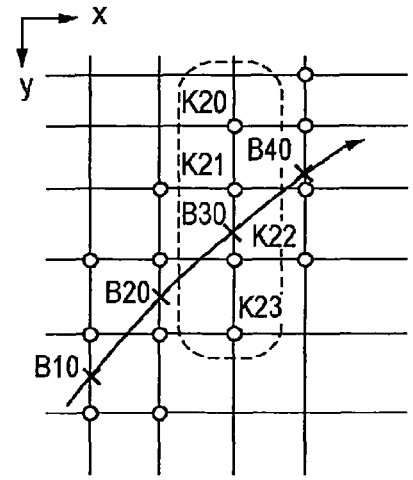 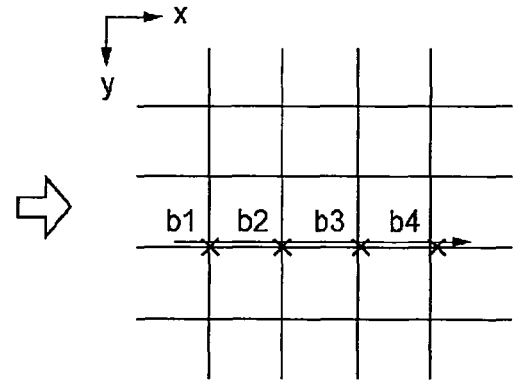

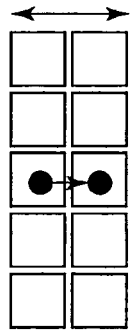 Fig.29A PATTERN1
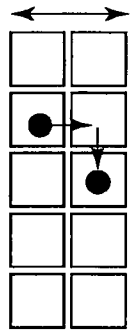 Fig.29B PATTERN2
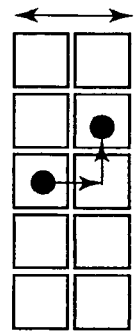 Fig.29C PATTERN3

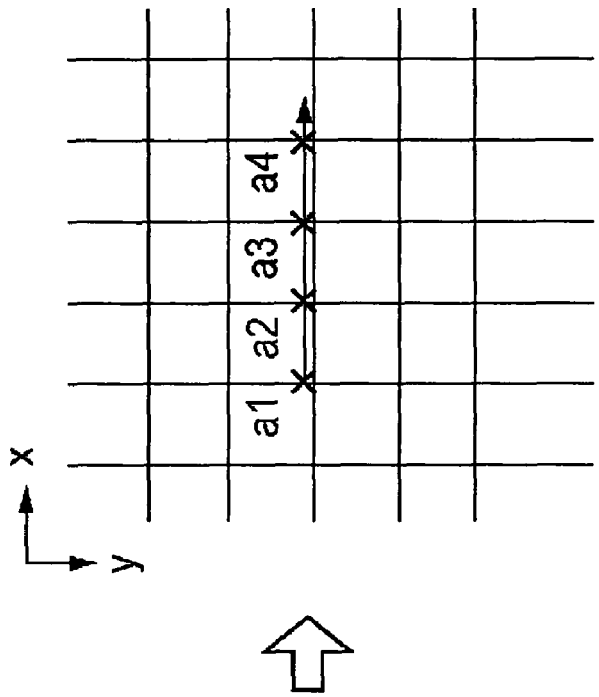
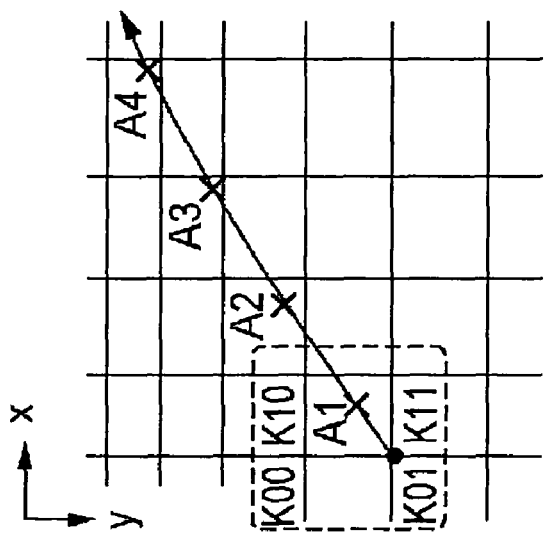
Fig.36A
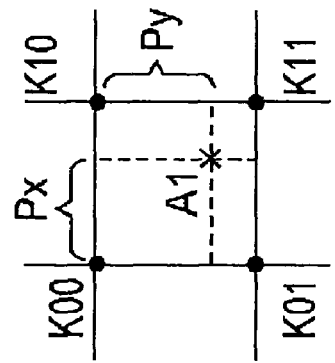
Fig.36B

IMAGE PROCESSING APPARATUS, IMAGE PROCESSING SYSTEM AND IMAGE PROCESSING METHOD

CROSS REFERENCE TO RELATED APPLICATIONS

The present application is a Continuing Application of the patent application Ser. No. 10/524,758, filed Nov. 14, 2005, which is based on a national stage application of PCT/JP03/10410, filed on Aug. 18, 2003, which in turn claims priority from Japanese applications Nos. 2002-239865 filed on Aug. 20, 2002, the entire contents of which are incorporated herein by reference.

TECHNICAL FIELD

The present invention relates to an image processing apparatus, an image processing system and an image processing method, which are used for a video camera, a digital still camera, silver salt camera, and the like.

BACKGROUND ART

Conventionally, in an image taken by a video camera, a digital still camera, a silver salt camera or the like, distortion has been generated owing to the influence of the distortion aberration characteristic of an imaging lens. The distortion is not conspicuous here in a high-precision high-performance lens. However, in case of using a low-priced lens or an optical zoom lens, it is difficult to avoid the influences of image distortion completely.

Accordingly, an image processing apparatus correcting the distortion by signal processing has recently been proposed. FIG. 33 shows the configuration of a conventional image processing apparatus 100. As shown in FIG. 33, the conventional image processing apparatus 100 includes a lens 200, an imaging device 300, a data converting unit 400, a signal processing unit 500, an image memory 600, a control micro computer 700, a synchronizing signal generating unit 800, a correction data table 1010, a recording unit 1100, a reproducing unit 1200 and a displaying system processing unit 1300.

Now, referring to the flow chart of FIG. 34, an outline of the operation of the image processing apparatus 100 is described. First, at Step S1, an analog image signal of a subject 101 is input through the lens 200 and the imaging device 300. Then, at Step S2, the data converting unit 400 converts the analog image signal into a digital image signal to generate an image 102.

Next, at Step S3, the signal processing unit 500 performs a correction operation to the distorted image 102 by using distortion correction vectors (hereinafter simply referred to as "correction vectors") stored in the correction data table 1010. Then, at Step S4, the control micro computer 700 determines whether the input of images is ended or not. When the control micro computer 700 determines that the input should not be ended, the operation returns to Step S1.

The foregoing is the outline of the operation of the conventional image processing apparatus 100 shown in FIG. 33, and the contents of the operation will be described in detail in the following.

The lens 200 condenses the reflected light from the subject 101 to map the image of the subject 101 on the imaging device 300. Moreover, the imaging device 300 is formed of a CCD, a CMOS sensor or the like. The imaging device 300 captures the projected image to generate an analog image signal. Moreover, the data converting unit 400 converts the analog signal supplied from the imaging device 300 into a digital image signal to generate the image 102. On the other hand, the control micro computer 700 issues a command commanding a predetermined operation according to an input into an external user interface.

Moreover, the signal processing unit 500 stores the digital image signal generated by the data converting unit 400 into the image memory 600 in accordance with the command supplied from the control micro computer 700. Then, the signal processing unit 500 reads correction vectors corresponding to all pixels, whose correction vectors have been previously recorded in the correction data table 1010, from the table 1010. After the signal processing unit 500 has obtained necessary image signals from the image memory 600 according to the correction information, the signal processing unit 500 corrects the distortion of the image 102 output from the data converting unit 400 by executing the geometric correction of the image signals by a two-dimensional interpolation system to the image signals.

Now, the image signals generated by the signal processing unit 500 are supplied to the displaying system processing unit 1300 and the image is displayed on a monitor, or are supplied to the recording unit 1100 and recorded in an external medium 1400 such as a tape, a disc or a memory. Moreover, the image signals recorded in the medium 1400 are reproduced by the reproducing unit 1200. The reproduced signal is supplied to the displaying system processing unit 1300, and the reproduced image is displayed on the monitor.

Incidentally, the synchronizing signal generating unit 800 generates an internal synchronizing signal according to a clock signal CLK supplied from the outside and supplies the generated internal synchronizing signal to the imaging device 300, the data converting unit 400 and the signal processing unit 500.

FIG. 35 is a block diagram showing the configuration of the signal processing unit 500 shown in FIG. 33. As shown in FIG. 35, the signal processing unit 500 includes a timing control unit 510, an interpolation phase/input data coordinate calculating unit 520, a data obtaining unit 530, an interpolation coefficient generating unit 540, a data interpolation calculating unit 550, an output data buffer 560 and a data writing unit 570.

Hereupon the data writing unit 570 supplies a digital image signal supplied from the data converting unit 400 to the image memory 600 together with a writing control signal Sw and makes the image memory 600 to store the digital image signal.

Moreover, the timing control unit 510 generates a control timing signal St according to the internal synchronizing signal supplied from the synchronizing signal generating unit 800. The interpolation phase/input data coordinate calculating unit 520 calculates the coordinates of an output image according to the supplied control timing signal St and supplies a correction vector request signal Sa requesting a correction vector of the obtained coordinates to the correction data table 1010.

The correction data table 1010 obtains a correction vector in accordance with the correction vector request signal Sa from the built-in table and supplies the obtained correction vector to the data obtaining unit 530 and the interpolation coefficient generating unit 540. The data obtaining unit 530 obtains interpolation data according to the integer component of the correction vector output from the correction data table 1010 from the image memory 600 by supplying a read control signal Sr to the image memory 600. Incidentally, the data obtaining unit 530 supplies the obtained interpolation data to the data interpolation calculating unit 550.

On the other hand, the interpolation coefficient generating unit 540 generates an interpolation coefficient according to the decimal component of the correction vector supplied from the correction data table 1010 and supplies the generated interpolation coefficient to the data interpolation calculating unit 550. Then, the data interpolation calculating unit 550 executes an interpolation operation in accordance with the interpolation data supplied from the data obtaining unit 530 and the interpolation coefficient supplied from the interpolation coefficient generating unit 540. Incidentally, a two-dimensional interpolation operation is executed as the interpolation operation.

In the following, FIGS. 36A and 36B are referred to while image conversion by means of two-dimensional interpolation is described. FIG. 36A shows images before and after the two-dimensional interpolation, and FIG. 36B shows an enlarged view of a part of FIG. 36A.

Now, for example, when an arrow connecting a point a1 to a point a4 shown in FIG. 36A is an output image, it is supposed that the points on the image 102 corresponding to the points a1 to a4 constituting the output image are points A1 to A4. Consequently, FIG. 36A shows a case where an original image composed of an arrow connecting the point A1 to the point A4 is converted to the output image connecting the point a1 to point a4 by the two-dimensional interpolation.

In this case, when the image of each point of the output image is determined by using two pieces of image data in each of the x and y directions (2×2), the image data at the point a1 is determined by using, for example, four grid points K00, K01, K10 and K11 enclosing the point A1. Incidentally, the image data of the points a2 to a4 are determined by also executing similar operations to the points A2 to A4 and. Hereupon, the four grid points K00, K01, K10 and K11 are determined according to the correction coordinates output from the correction data table 1010.

Moreover, as shown in FIG. 36B, when it is supposed that both the distances between the grid point K00 and the grid point K10, and between the grid point K10 and the grid point K11 are 1, the positions of the point A1 in the x direction and the y direction are severally specified by decimal parameters Px and Py. In this case, the weighting (interpolation coefficient) Cn (n=1 to 4) of each of the image data at grid points K00, K01, K10 and K11 used for the calculation of the image data at the point a1 is determined on the basis of the decimal components, i.e. the decimal parameters Px and Py, of the correction vector supplied from the correction data table 1010.

Moreover, the data obtained as a result of the interpolation operation of the data interpolation calculating unit 550 is held in the output data buffer 560, and is output to the displaying system processing unit 1300 or the recording unit 1100 at predetermined timing.

Hereupon, the conventional data interpolation calculating unit 550 is configured as shown in FIG. 37. Incidentally, in FIG. 37, a configuration in the case where the image of each point of an output image is determined by using the image data composed of 16 in all in the state in which four pieces of the image data are severally arranged in x and y directions (4×4).

As shown in FIG. 37, the conventional data interpolation calculating unit 550 includes four line memories 900, 16 registers 901 in all, each four of which are serially-connected to the output node of each of the line memories 900, 16 multiplication circuits 902 each multiplying each image data output from each of the registers 901 by a corresponding interpolation coefficient CHn (n=00 to 33), an adding circuit 904 for adding the data obtained by the 16 multiplication circuits 902, and a dividing circuit 905 for performing the division of the data obtained by the adding circuit 904.

According to the conventional image processing apparatus described above, the distortion of an image can be corrected in real time, however, there is a problem in which the scale of the circuit becomes large and the cost of the apparatus increases because it is necessary to provide correction vectors corresponding to all pixels.

Furthermore, in the case where the position of the lens 200 is changed or in the case where an exchange of the lens is performed, it is necessary to update the correction vectors according to the change of the distortion aberration characteristic of the lens. Consequently, an expensive large capacity correction data table 1010 becomes necessary.

Moreover, the updating of the correction data table 1010 is executed by the control micro computer 700 on the basis of the instruction from the user interface. However, there is another problem in which real time processing of control micro computer 700 becomes difficult because large communication capability is required between the control micro computer 700 and the correction data table 1010.

Incidentally, there is a method of operating a correction vector sequentially in place of providing the correction data table 1010, but by such a method the real time processing without the so-called frame delay is difficult. Then, there is a problem in which large hardware becomes necessary for realizing real time processing to increase the cost.

Moreover, as described above, in the two-dimensional interpolation, the image data at a plurality of points on a two-dimensional surface on which the image is formed is used for correcting the image data of one point. However, since image data at many points becomes necessary for obtaining a high quality image, there is a problem in which the frequency of accessing the image memory 600 becomes high to make it impossible to achieve the accelerating of operation.

Moreover, in case of executing two-dimensional interpolation, it is necessary that the port width of the image memory 600 is a bandwidth being several times as large as an output rate. That is to say, for example, in the case where the image data at one pixel is generated from the image data at four pixels in two-dimensional interpolation, the port width needs to be a bandwidth four times as large as that of one pixel.

As described above, because a certain condition of the port width is necessary in case of executing the two-dimensional interpolation, it is very difficult to use a high-performance filter of a high-order tap (the "tap" means the number of pieces of data in a direction being an object of image processing), so that there is a problem of the difficulty of obtaining a high quality image.

The present invention was made for solving the above-mentioned problems, and an object of the present invention is to provide an image processing apparatus, an image processing system and an image processing method, which are for correcting the distortion of an image at a low cost and generating a high quality image in real time.

DISCLOSURE OF THE INVENTION

The object of the present invention is attained by providing an image processing apparatus including image correcting means for correcting an original image having distortion, according to a supplied correction vector. The apparatus is characterized by including: decoding means for decoding the correction vector, which is encoded and supplied from the outside, and for supplying the decoded correction vector to the image correcting means.

According to such means, the encoded correction vector supplied from the outside is decoded, and the image correcting means corrects the original image in accordance with the decoded correction vector. Consequently, the necessary of previously holding the correction vectors at all pixel points constituting the original image in the image processing apparatus is avoided. Consequently, the scale of apparatus and the manufacturing cost of the image processing apparatus for correcting the original image having distortion in real time can be reduced.

Hereupon, by being further provided with decoding control means for selectively decoding the correction vector by issuing a command according to an input to a user interface, the correction can be realized by means of an appropriate correction vector according to a capturing environment of the original image such as the position of the lens and trembling.

Moreover, the object of the present invention is attained by providing an image processing apparatus including image correcting means for correcting an original image having distortion, the apparatus characterized by including horizontal correcting means for correcting distortion in the horizontal direction of an original image by performing a one-dimensional interpolation operation to the original image by using a horizontal correcting parameter indicating a correction quantity of the horizontal direction at a pixel point constituting the original image, and vertical correcting means for correcting distortion in the vertical direction of the original image by performing a one-dimensional interpolation operation using a vertical correcting parameter indicating a correction quantity of the vertical direction at the pixel point constituting the original image to the image obtained by the correction by the horizontal correcting means.

According to such means, the horizontal correcting means performs the one-dimensional interpolation operation in the horizontal direction of the original image, and the vertical correcting means performs the one-dimensional interpolation operation in the vertical direction of the original image. Consequently, the distortion of the original image can be corrected in real time at a low cost.

Incidentally, either of the correction by the horizontal correcting means and the correction by the vertical correcting means may be executed first.

That is to say, the object of the present invention can be also attained by providing an image processing apparatus characterized by including vertical correcting means for correcting distortion in the vertical direction of the original image by performing a one-dimensional interpolation operation using a vertical correcting parameter indicating a correction quantity of the vertical direction at a pixel point constituting the original image to the original image, and horizontal correcting means for correcting distortion in the horizontal direction of the original image by performing a one-dimensional interpolation operation using a horizontal correcting parameter indicating a correction quantity in the horizontal direction at a pixel point constituting the original image to the image obtained by the correction of the vertical correcting means.

In the above description, when the horizontal correcting means is set to expand and contract the original image in the horizontal direction by adjusting an interval in the horizontal direction of pixel points at which image data is obtained by the one-dimensional interpolation operation, and the vertical correcting means is set to expand and contract the original image in the vertical direction by adjusting an interval in the vertical direction of the pixel points at which the image data is obtained by the one-dimensional interpolation operation, the expansion or the contraction of the original image can be easily realized together with distortion correction.

More specifically, the horizontal correcting means can be set to include first data obtaining means for selectively obtaining the image data at the pixel points according to an integer component of the horizontal correcting parameter, first interpolation coefficient generating means for generating an interpolation coefficient according to a decimal component of the horizontal correcting parameter, and first interpolation operating means for executing the one-dimensional interpolation operation by using the image data obtained by the first data obtaining means and the interpolation coefficient generated by the first interpolation coefficient generating means, and the vertical correcting means can be set to include second data obtaining means for selectively obtaining the image data at the pixel points according to an integer component of the vertical correcting parameter, second interpolation coefficient generating means for generating an interpolation coefficient according to a decimal component of the vertical correcting parameter, and second interpolation operating means for executing the one-dimensional interpolation operation by using the image data obtained by the second data obtaining means and the interpolation coefficient generated by the second interpolation coefficient generating means. Incidentally, the decimal component is set to be an interpolation phase.

Moreover, in the above description, storing means for storing the horizontally corrected image obtained by the correction of the horizontal correcting means can be further provided, and the vertical correcting means can be set to include data obtaining means for obtaining the horizontally corrected image according to the vertical correcting parameter from the storing means, and interpolation operating means for performing the one-dimensional interpolation operation using the vertical correcting parameter to the horizontally corrected image data obtained by the obtaining means.

According to such means, because only the horizontally corrected image necessary for the one-dimensional interpolation operation in the vertical direction is selectively obtain from the storing means by the data obtaining means, the one-dimensional interpolation operation can be effectively executed.

Moreover, the object of the present invention is attained by providing an image processing system including image correcting means for correcting an original image having distortion according to a supplied correction vector, the apparatus characterized by including encoding means for selectively encoding the correction vector at a pixel point constituting the original image, and decoding means for decoding the encoded correction vector supplied from the encoding means and supplying the decoded correction vector to the image correcting means.

By such means, the decoding means decodes the correction vector encoded by the encoding means, and the image correcting means corrects the original image according to the decoded correction vector. Consequently, distortion correction can be executed without using the correction vectors at all pixel points of the original image, and the original image can be corrected in real time at a low cost.

Moreover, the object of the present invention is attained by providing an image processing system for correcting an original image having distortion, the system characterized by including encoding means for selectively encoding a horizontal correcting parameter indicating a correction quantity in the horizontal direction at a pixel point constituting the original image and a vertical correcting parameter indicating a correction quantity in the vertical direction at the pixel point, horizontal decoding means for decoding the encoded horizontal correcting parameter supplied from the encoding means, horizontal correcting means for correcting distortion in the horizontal direction of the original image by performing a one-dimensional interpolation operation using the horizontal correcting parameter decoded by the horizontal decoding means to the original image, vertical decoding means for decoding the encoded vertical correcting parameter supplied from the encoding means, and vertical correcting means for correcting distortion in the vertical direction of the original image by performing a one-dimensional interpolation operation using the vertical correcting parameter decoded by the vertical decoding means to the image obtained by the correction by the horizontal correcting means.

By such means, the horizontal correcting means performs the one-dimensional interpolation operation in the horizontal direction to the original image, and the vertical correcting means performs the one-dimensional interpolation operation to the original image in the vertical direction. Consequently, the distortion of an image can be corrected in real time at a low cost.

Hereupon, if the encoding means is set to include grid splitting means for performing grid split to the original image according to a control signal supplied from a user interface, and parameter compressing means for selectively compressing a horizontal correcting parameter at a grid point obtained by the grid split and supplies the compressed horizontal correcting parameter to the horizontal decoding means, and for selectively compressing a vertical correcting parameter at the grid point and supplies the compressed vertical correcting parameter to the vertical decoding means, then the horizontal correcting parameter and the vertical correcting parameter can be effectively supplied to the horizontal and the vertical decoding means.

Moreover, in this case, for example, by setting the horizontal decoding means to include first grid determining means for determining a grid frame enclosing each pixel point of a generation image according to a grid generated by the grid splitting means, and horizontal parameter calculating means for approximating each grid frame determined by the first grid determining means by a function, and for calculating the horizontal correcting parameter at each pixel point of the generation image by using the function, and by setting the vertical decoding means to include second grid determining means for determining a grid frame enclosing each pixel point of the generation image according to a grid generated by the grid splitting means, and vertical parameter calculating means for approximating each grid frame determined by the second grid determining means by a function, and for calculating the vertical correcting parameter at each pixel point of the generation image by using the function, the encoded horizontal correcting parameter and the vertical correcting parameter can be decoded at a high precision.

Hereupon, at least one of the horizontal parameter calculating means and the vertical parameter calculating means can be set to approximate at least one grid frame by means of n-th order polynomial (n is a natural number).

Moreover, the object of the present invention is attained by providing an image processing method for correcting an original image having distortion, the method characterized by including first step of correcting the distortion in the horizontal direction of the original image by performing a one-dimensional interpolation operation using a horizontal correcting parameter indicating a correction quantity in the horizontal direction at a pixel point constituting the original image to the original image, and a second step of correcting the distortion in the vertical direction of the original image by performing a one-dimensional interpolation operation using a vertical correcting parameter indicating a correction quantity in the vertical direction at a pixel point constituting the original image to the image obtained at the first step.

According to such means, at the first step, the one-dimensional interpolation operation is performed to the original image in the horizontal direction, and at the second step, the one-dimensional interpolation operation is performed to the original image in the vertical direction. Consequently, the distortion of the image can be corrected in real time at a low cost.

Hereupon, if it is supposed that the original image is expanded and contracted in the horizontal direction by adjustment of an interval in the horizontal direction of pixel points at which image data is obtained by the one-dimensional interpolation operation at least the first step, or if it is supposed that the original image is expanded and contracted in the vertical direction by adjustment of an interval in the vertical direction of the pixel points at which the image data is obtained by the one-dimensional interpolation operation at the second step, then the original image can be more easily expanded or contracted in the horizontal direction, the vertical direction or both of them.

Moreover, the object of the present invention is attained by providing an image processing method for correcting an original image having distortion, the method characterized by including a first step of performing grid split to the original image according to a control signal supplied from a user interface, a second step of selectively encoding correction quantities in the horizontal direction and in the vertical direction at a grid point obtained by the grid split, a third step of decoding the encoded correction quantities in the horizontal direction and in the vertical direction, a fourth step of performing a one-dimensional interpolation operation to the original image in the horizontal direction according to the decoded correction quantity in the horizontal direction, and a fifth step of performing a one-dimensional interpolation operation to the original image in the vertical direction according to the decoded correction quantity in the vertical direction.

According to such means, the correction quantity at each pixel point of the original image is effectively encoded and decoded, and the one-dimensional interpolation operations in the horizontal direction and in the vertical direction are performed according to the decoded correction quantity. Consequently, correction processing of the original image in real time can be easily realized.

Hereupon, if it is supposed that the third step includes a grid frame determining step of determining a grid frame enclosing each pixel point of a generation image according to the grid generated at the first step, and a parameter calculating step of approximating each grid frame determined at the grid frame determining step by means of a function and for calculating the correction quantities in the horizontal direction and in the vertical direction at each pixel point constituting the generation image by means of the function, then the encoded correction quantities in the horizontal direction and in the vertical direction can be easily and surely decoded.

Incidentally, at the parameter calculating step, it is considerable that at least one grid frame is approximated by means of, for example, an n-th order polynomial (n is a natural number).

BRIEF DESCRIPTION OF DRAWINGS

FIGS. 3A and 3B are views illustrating the outline of a one-dimensional interpolation operation executed by a signal processing unit shown in FIG. 2;

FIGS. 29A, 29B and 29C are views showing changeable patterns of an adjoining pixel in the vertical direction;

FIGS. 36A and 36B are views showing the principle of image conversion by means of two-dimensional interpolation.

BEST MODE FOR CARRYING OUT THE INVENTION

Figure 1:
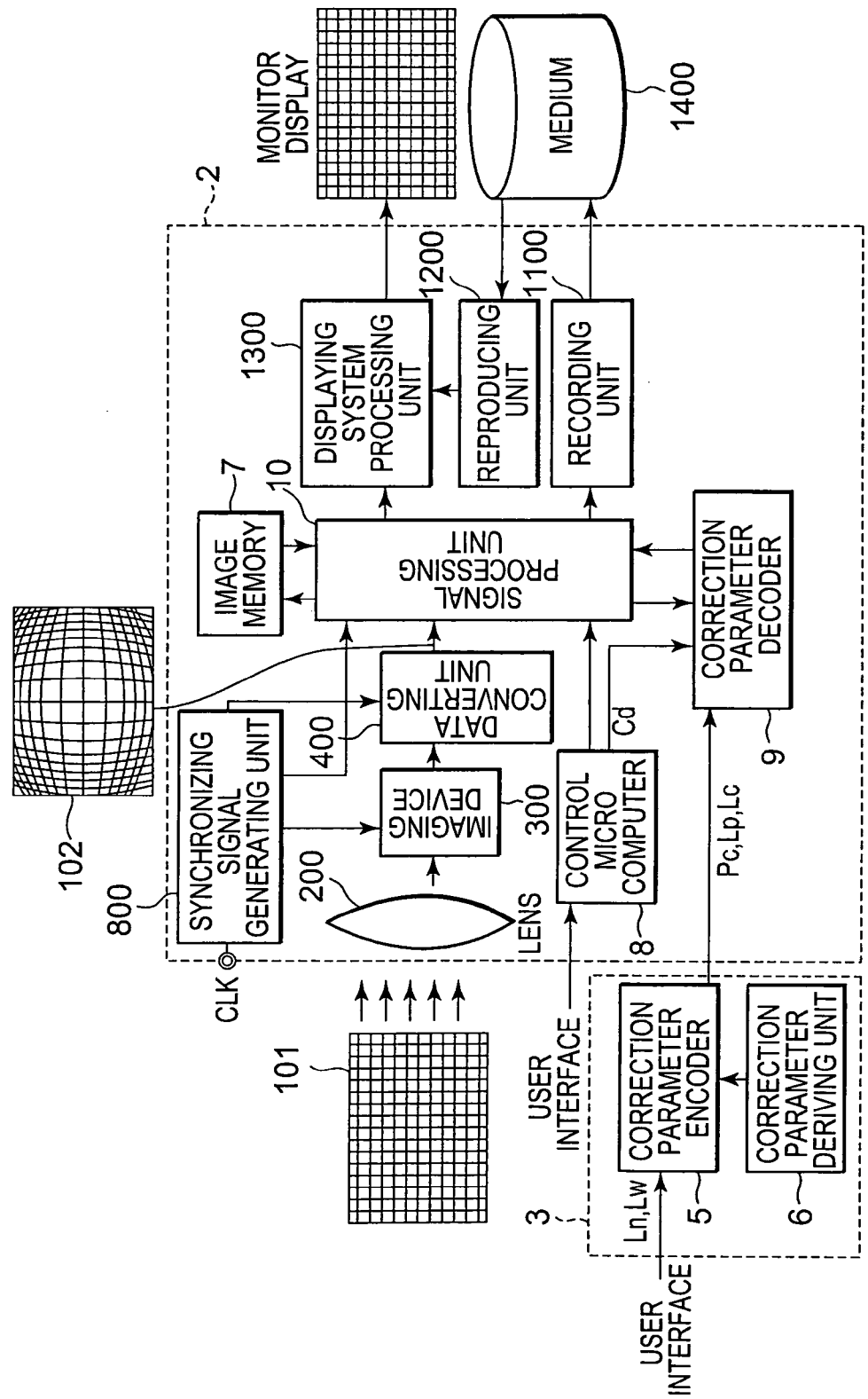
FIG. 1 is a block diagram showing the configuration of an image processing system according to an embodiment of the present invention.

In the following, the embodiments of the present invention will be described in detail by reference to the attached drawings. Incidentally, the same reference marks in the drawings denote the same or corresponding parts.

FIG. 1 is a block diagram showing the configuration of an image processing system according to an embodiment of the present invention. As shown in FIG. 1, the image processing system according to the embodiment of the present invention is provided with an image processing apparatus 2, a pre-processing apparatus 3 and the medium 1400. The image processing apparatus 2 includes the lens 200, the imaging device 300, the data converting unit 400, a signal processing unit 10, an image memory 7, a control micro computer 8, a correction parameter decoder 9, the synchronizing signal generating unit 800, the recording unit 1100, the reproducing unit 1200 and the displaying system processing unit 1300. The pre-processing apparatus 3 includes a correction parameter encoder 5 and a correction parameter deriving unit 6.

Hereupon, the lens 200 is one condensing reflected light from the subject 101 to map the condensed reflected light to the imaging device 300, and is not only a single focus lens, but also may be one including a zooming function. Moreover, the imaging device 300 is composed of a CCD or a CMOS sensor, and captures a projected image according to an internal synchronizing signal supplied from the synchronizing signal generating unit 800 to generate an analog image signal.

The data converting unit 400 is connected to the imaging device 300, and converts the analog image signal generated by the imaging device 300 to a digital image signal in accordance with the internal synchronizing signal supplied from the synchronizing signal generating unit 800 to generate the image 102.

The signal processing unit 10 is connected to the control micro computer 8, the data converting unit 400, the image memory 7, the correction parameter decoder 9 and the synchronizing signal generating unit 800. Then, the signal processing unit 10 stores the digital image signal supplied from the data converting unit 400 into the image memory 7 in accordance with a command supplied from the control micro computer 8, and executes correction processing of the stored image signal on the basis of a correction quantity parameter supplied from the correction parameter decoder 9. Then, the signal processing unit 10 supplies the image signal obtained by the correction to the displaying system processing unit 1300 and the recording unit 1100. Incidentally, the signal processing unit 10 will be described later in detail.

On the other hand, the correction parameter deriving unit 6 previously calculates a correction quantity vector according to each position of all pixels on the basis of data pertaining to the distortion aberration of the lens 200 or the like. Moreover, the correction parameter encoder 5 is connected to the correction parameter deriving unit 6 and the user interface, and compresses (encodes) the correction quantity vector supplied from the correction parameter deriving unit 6 in accordance with control signals Ln and Lw supplied from the user interface to supply the compressed data Pc to the correction parameter decoder 9.

Incidentally, both of the operation of the correction parameter deriving unit 6 and the encoding are operations having very large loads, but the operations may be calculated by using a personal computer or the like separately. Consequently, the loads do not influence to the real time processing of the image processing apparatus 2.

Moreover, in the image processing system according to the embodiment of the present invention, the pre-processing apparatus 3 is not an indispensable constituent element, and various embodiments in which the compressed data Pc is supplied from the outside of the image processing apparatus 2 to the correction parameter decoder 9 are similarly considerable.

Moreover, the control micro computer 8 outputs commands and the like commanding a predetermined operation to the signal processing unit 10 in accordance with a control signal from the user interface, and supplies the position information of the lens 200 and the like to the correction parameter decoder 9.

The correction parameter decoder 9 is connected to the correction parameter encoder 5, the control micro computer 8 and the signal processing unit 10. Then, the correction parameter decoder 9 expands (decodes) the encoded compressed data Pc supplied from the correction parameter encoder 5 to a correction quantity parameter corresponding to each pixel on the basis of information and the like supplied from the control micro computer 8 and supplies the correction quantity parameter to the signal processing unit 10.

Hereupon, the correction parameter decoder 9 supplies the correction quantity parameter to the signal processing unit 10 independent of the interpolation method executed in the signal processing unit 10. Incidentally, the correction parameter encoder 5 and the correction parameter decoder 9 will be described later in detail.

Moreover, the recording unit 1100 is connected to the signal processing unit 10, and records an image signal generated by the signal processing unit 10 into a medium (recording medium) 1400 such as a tape, a flexible disc, a digital versatile disc (DVD), a hard disc and a memory. Incidentally, the image signal generated by the signal processing unit 10 can be set to be recorded in the medium 1400 by means of the Internet, a wireless communication or the like.

Moreover, the reproducing unit 1200 is connected to the medium 1400, and reproduces an image signal stored in the medium 1400 to supply the reproduced image signal to the displaying system processing unit 1300. The displaying system processing unit 1300 is connected to the signal processing unit 10 and the reproducing unit 1200, and displays the image signal supplied from the signal processing unit 10 or the reproducing unit 1200 on a monitor.

Incidentally, the synchronizing signal generating unit 800 generates an internal synchronizing signal on the basis of the clock signal CLK supplied from the outside, and supplies the generated internal synchronizing signal to the imaging device 300, the data converting unit 400 and the signal processing unit 10.

Figure 2:
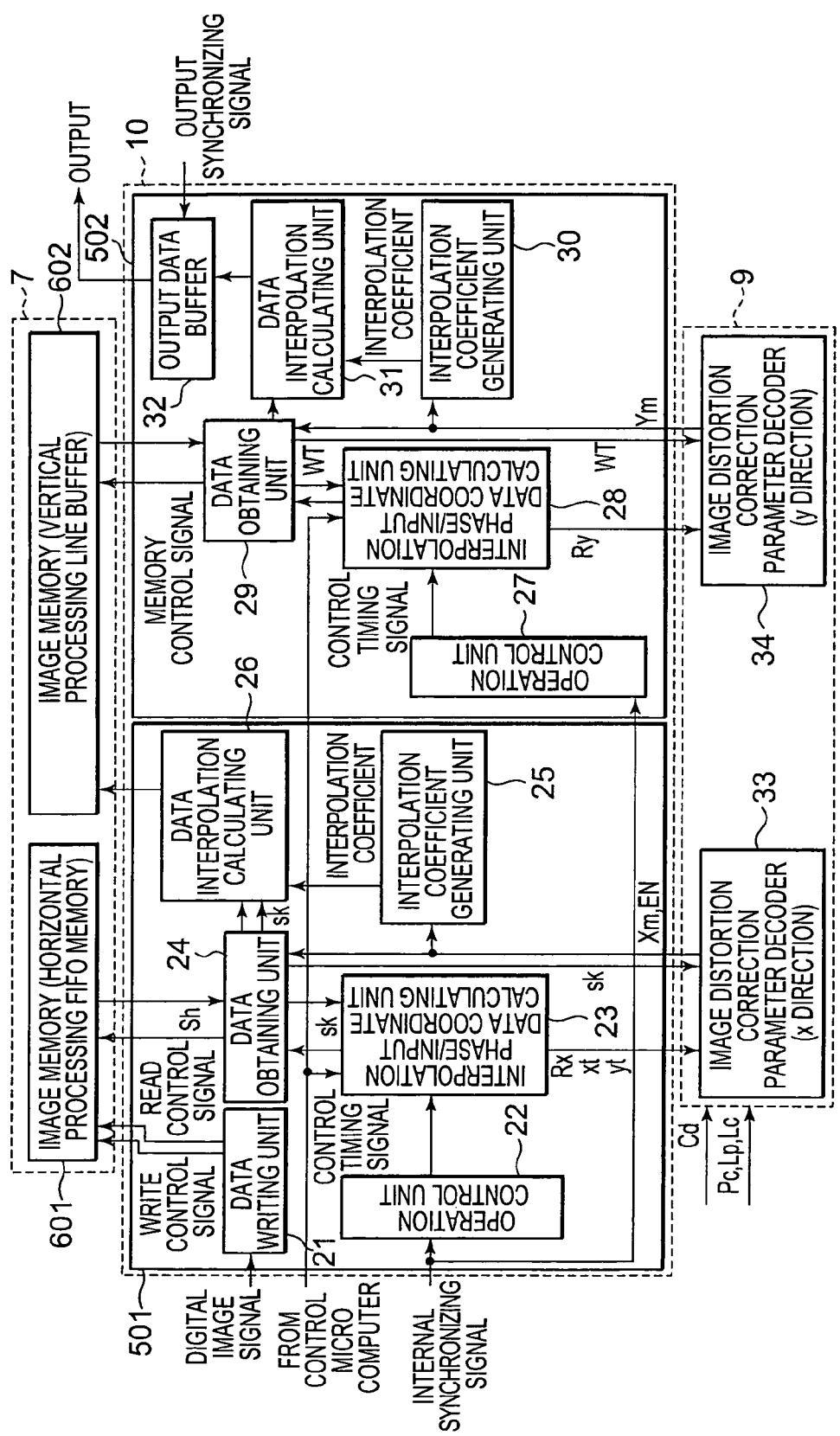
FIG. 2 is a block diagram showing the configuration of a signal processing unit shown in FIG. 1.

FIG. 2 is a block diagram showing the configuration of the signal processing unit 10 shown in FIG. 1. As shown in FIG. 2, the signal processing unit 10 includes a horizontal one-dimensional interpolating unit 501 and a vertical one-dimensional interpolating unit 502. Incidentally, the image memory 7 includes an image memory 601 constituted of a horizontal processing FIFO memory and an image memory 602 constituted of a vertical processing line buffer. The correction parameter decoder 9 includes an image distortion correction parameter decoder 33 for the x direction and an image distortion correction parameter decoder 34 for the y direction.

Incidentally, the image memory 602 is set to have a capacity to which the image memory 602 can store the data over the minimum number of lines necessary for realizing distortion correction in the vertical direction. The respect will be described later. Moreover, the capacity is normally determined according to the frequency of an output synchronizing signal supplied to an output data buffer 32.

Then, the horizontal one-dimensional interpolating unit 501 includes a data writing unit 21, an operation control unit 22, an interpolation phase/input data coordinate calculating unit 23, a data obtaining unit 24, an interpolation coefficient generating unit 25, and a data interpolation calculating unit 26. The vertical one-dimensional interpolating unit 502 includes an operation control unit 27, an interpolation phase/input data coordinate calculating unit 28, a data obtaining unit 29, an interpolation coefficient generating unit 30, a data interpolation calculating unit 31, and the output data buffer 32.

Hereupon, the data writing unit 21 is connected to the data converting unit 400. The operation control unit 22 is connected to the synchronizing signal generating unit 800. Moreover, the interpolation phase/input data coordinate calculating unit 23 is connected to the operation control unit 22 and the control micro computer 8. The data obtaining unit 24 is connected to the interpolation phase/input data coordinate calculating unit 23, the image memory 601 and the image distortion correction parameter decoder 33. Moreover, the interpolation coefficient generating unit 25 is connected to the image distortion correction parameter decoder 33. The data interpolation calculating unit 26 is connected to the data obtaining unit 24 and the interpolation coefficient generating unit 25.

Incidentally, the image memory 601 is connected to the data writing unit 21 and the data obtaining unit 24. The image memory 602 is connected to the data interpolation calculating unit 26 and the data obtaining unit 29. Moreover, the image distortion correction parameter decoder 33 is connected to the interpolation phase/input data coordinate calculating unit 23 and the data obtaining unit 24.

On the other hand, the operation control unit 27 is connected to the synchronizing signal generating unit 800. The interpolation phase/input data coordinate calculating unit 28 is connected to the operation control unit 27 and the control micro computer 8. Moreover, the data obtaining unit 29 is connected to the interpolation phase/input data coordinate calculating unit 28, the image memory 602 and the image distortion correction parameter decoder 34. The interpolation coefficient generating unit 30 is connected to the image distortion correction parameter decoder 34. Moreover, the data interpolation calculating unit 31 is connected to the data obtaining unit 29 and the interpolation coefficient generating unit 30. The output data buffer 32 is connected to the data interpolation calculating unit 31 and the synchronizing signal generating unit 800.

Incidentally, the output node of the output data buffer 32 is connected to the displaying system processing unit 1300 and the recording unit 1100. Moreover, the image distortion correction parameter decoder 34 is connected to the interpolation phase/input data coordinate calculating unit 28.

In the signal processing unit 10 having the configuration described above, first, the horizontal one-dimensional interpolating unit 501 executes a one-dimensional interpolation operation in the horizontal direction (x direction). Successively, the vertical one-dimensional interpolating unit 502 executes a one-dimensional interpolation operation in the vertical direction (y direction). Hereupon, the outline of the operations by the signal processing unit 10 is described with reference to FIGS. 3A and 3B. Incidentally, in FIGS. 3A and 3B, a case where 16 pieces of image data in all, each four of which is arranged in the x and the y directions (4×4), are used for determining the image data at each point of an output image is exemplified.

Then, FIG. 3A shows that image data at points B130 to B40 are severally calculated by the correction in the x direction correspondingly to points B1 to B4 constituting an original image including distortion. FIG. 3B shows that the image data at points b1 to b4 severally calculated by the correction in the y direction correspondingly to the points B10 to B40.

More specifically, for example, by performing a predetermined interpolation operation to the image data at four grid points which are continuous in the horizontal direction to stride the point B1, the image data at the point B10 can be calculated, and similarly the image data at the points B20 to B40 are severally calculated correspondingly to the points B2 to B4.

Next, as shown in FIG. 3B, for example to the point B30, by performing the predetermined interpolation operation to the image data at four grid points (points K20 to K23) which are continuous in the vertical direction to stride the point B30 in a broken line, the image data at the point b3 is calculated. Moreover, similarly, the image data at the points b1, b2 and b4 are severally calculated correspondingly to the points B10, B20 and B40.

Figure 4:
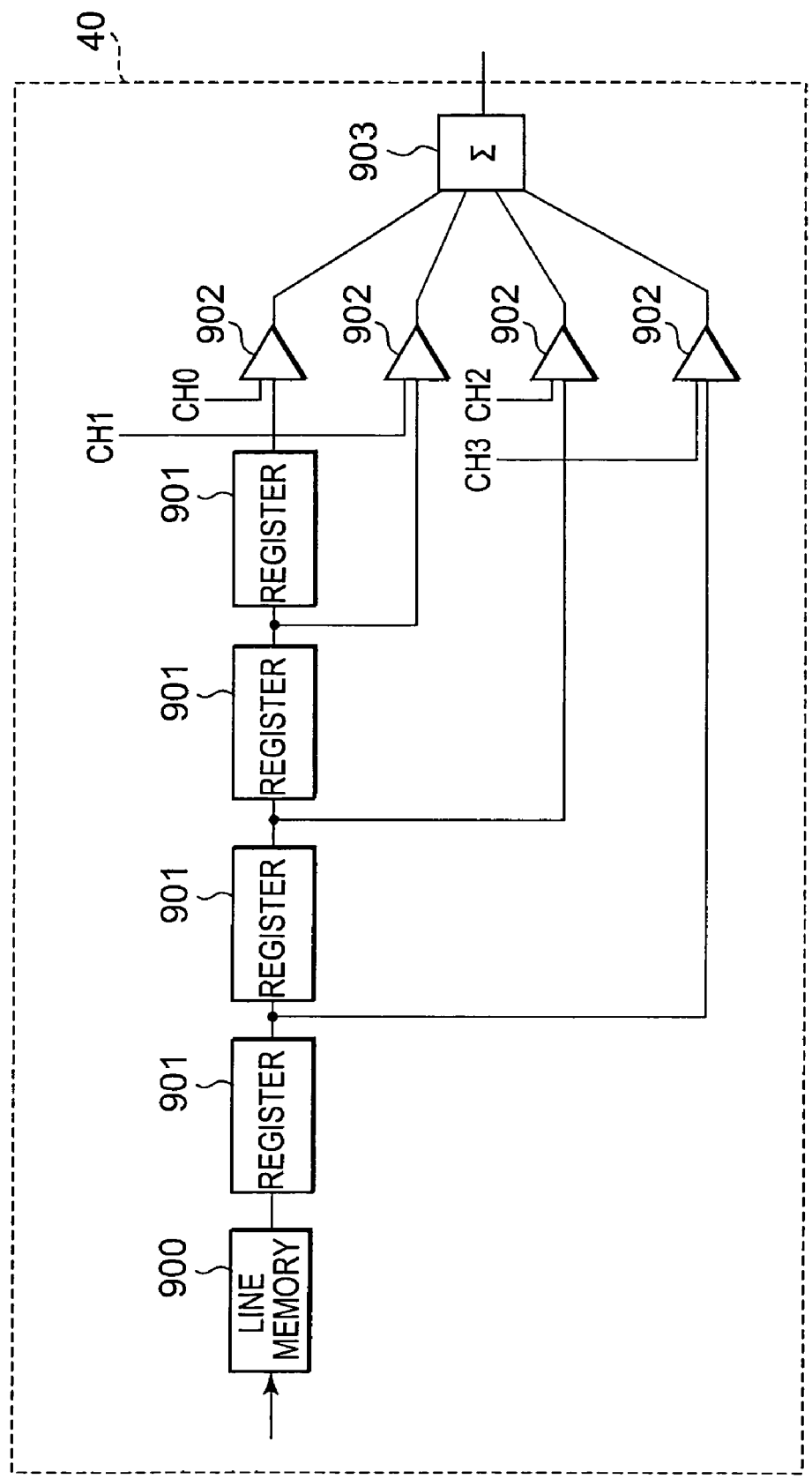
FIG. 4 is a view showing the configuration of a horizontal processing circuit included in a data interpolation calculating unit shown in FIG. 2.

Hereupon, the one-dimensional interpolation operation in the horizontal direction described above is realized by a horizontal processing circuit 40, which is included in the data interpolation calculating unit 26 and is shown in FIG. 4. As shown in FIG. 4, the horizontal processing circuit 40 includes a line memory 900, four registers 901 serially connected to the output node of the line memory 900, four multiplication circuits 902 for multiplying the data output from each of the registers 901 by corresponding interpolation coefficients CHk (k=0 to 3), and an adding circuit 903 for adding data obtained by the four multiplication circuit 902.

Incidentally, the one-dimensional interpolation operation in the vertical direction described above is realized by a circuit shown in FIG. 25, which will be described later. The realization of the one-dimensional interpolation operation will be described later in detail.

Next, the outline of the operation of the signal processing unit 10 shown in FIG. 2 is described. First, the image data input into the horizontal one-dimensional interpolating unit 501 from the data converting unit 400 is supplied to the image memory 601 by the data writing unit 21 together with a write control signal, and is written into the image memory 601 in accordance with the write control signal.

At this time, the data obtaining unit 24 supplies a read control signal to the image memory 601 for horizontal processing to obtain the image data which is in a row in the horizontal direction from the image memory 601 as interpolation data on the basis of a correction quantity parameter Xm for the x direction supplied from the image distortion correction parameter decoder 33.

Then, the data interpolation calculating unit 26 executes the one-dimensional interpolation operation in the horizontal direction by using the interpolation coefficient supplied from the interpolation coefficient generating unit 25, and the image memory 602 for vertical processing stores the result of the operation.

Next, in the vertical one-dimensional interpolating unit 502, the data obtaining unit 29 obtains the image data which is in a row in the vertical direction from the image memory 602 for vertical processing as interpolation data on the basis of a correction quantity parameter Ym for the y direction supplied from the image distortion correction parameter decoder 34. Then, the data interpolation calculating unit 31 executes the one-dimensional interpolation operation in the vertical direction by using the interpolation coefficient supplied from the interpolation coefficient generating unit 30, and the output data buffer 32 outputs the result of the operation in accordance with the output synchronizing signal.

Incidentally, as described above, the interpolation operations executed by the horizontal one-dimensional interpolating unit 501 and the vertical one-dimensional interpolating unit 502 are to be the one-dimensional interpolation operations. Consequently, a 4-tap filter such as a cubic interpolation, or a filter having the number of higher-order taps can be used.

That is to say, because the one-dimensional interpolation operations are realized by the simple circuits as described above, the operation by a high-order tap filer, which is difficult by a two-dimensional interpolation operation, can be easily realized. Consequently, an image having a higher quality can be obtained. Incidentally, because a general pixel number converting circuit or the like is to be a circuit for executing one-dimensional interpolation, an existing circuit may be commonly used for the above-mentioned operation.

Moreover, in the above description, the embodiment in which, after the one-dimensional interpolation operation in the horizontal direction is executed, the one-dimensional interpolation operation in the vertical direction is executed is described. However, the one-dimensional interpolation operation in the vertical direction may be previously executed, and after that the one-dimensional interpolation operation in the horizontal direction may be executed. Incidentally, in this case, the image data output from the data converting unit 400 is input into the vertical one-dimensional interpolating unit 502 and the vertical one-dimensional interpolation operation thereof is performed before the interpolated image data is temporarily stored in the image memory 601 for horizontal processing. Then, the image data stored in the image memory 601 in such a way is further subjected to the horizontal one-dimensional interpolation operation thereof by the horizontal one-dimensional interpolating unit 501 to be output to the outside of the signal processing unit 10 in the state in which the distortion thereof has completely corrected.

Moreover, the operation processing described above in not only applied to the data of one line, but also may be applied to every line of color signals (RGB, YUV). Furthermore, in the case where the interpolation operation is performed to a moving image, the operation may be executed in synchronization with a vertical synchronizing signal.

Incidentally, in an image apparatus such a video camera and a digital still camera, the so-called optical zooming function and the tre correcting function are frequently installed. Hereupon, when optical zooming is performed by the above-mentioned function, the distortion characteristic of a lens is changed according to either tele (zoom up) or wide (zoom down). That is to say, generally, when the lens 200 moves toward the direction of the wide, barrel distortion is generated in an image. When the lens 200 moves towards the direction of the tele, bobbin type distortion is generated in an image.

Hereupon, when the image is not corrected by appropriate correction vectors according to the optical zooming, the image quality of the image deteriorates. Consequently, the correction parameter decoder 9 is set to select the optimum correction quantity parameter according to the position of the lens.

Specifically, the correction parameter decoder 9 receives the information indicating the position of the lens 200 from the control micro computer 8, and selectively decodes the compressed data Pc supplied from the correction parameter encoder 5 according to the position information.

As described above, according to the image processing apparatus 2 shown in FIG. 1, even if the characteristic of the lens 200 changes, only the correction quantity parameter decoded according to the characteristic is used for the interpolation operation, the quantity of the data used for the operation can be suppressed to the minimum, and as the result the manufacturing cost can be reduced.

Next, the tremble stabilization function is described. Generally, as the methods for correcting the distortion of an image owing to tremble, there are a method for optically correcting the image by controlling the position of a lens or the like such as an active prism method or an active lens method, and a method for electrically correcting by performing predetermined processing of an obtained image signal such as an active image area method.

Hereupon, because the lens characteristic changes according to the position of the lens 200 in the optically correcting method, it is difficult to implement the optically correcting method in the image processing apparatus 2 according to the embodiment of the present invention.

On the other side, the electrically correcting method is implemented by the signal processing of cutting a part of image (effective area) out of the whole image on the basis of the information at a trembled position detected by a angular velocity sensor or the like. At this time, because an object of the image processing changes according to the position of the effective area or the like, it is necessary to alter the correction vector to be used for performing the interpolation operation according to the object.

Accordingly, the correction parameter decoder 9 furthermore receives the information of the trembled position from the control micro computer 8, and implements the tremble correction by selectively decoding the compressed data Pc supplied from the correction parameter encoder 5 according to the position information.

Incidentally, in the image processing apparatus 2 according to the present embodiment, if the correction parameter decoder 9 is similarly set to selectively decode the compressed data Pc according to a new lens 200 in the case where the lens 200 is exchanged, then a high quality image can be easily obtained after the exchange of a component.

Figure 5:
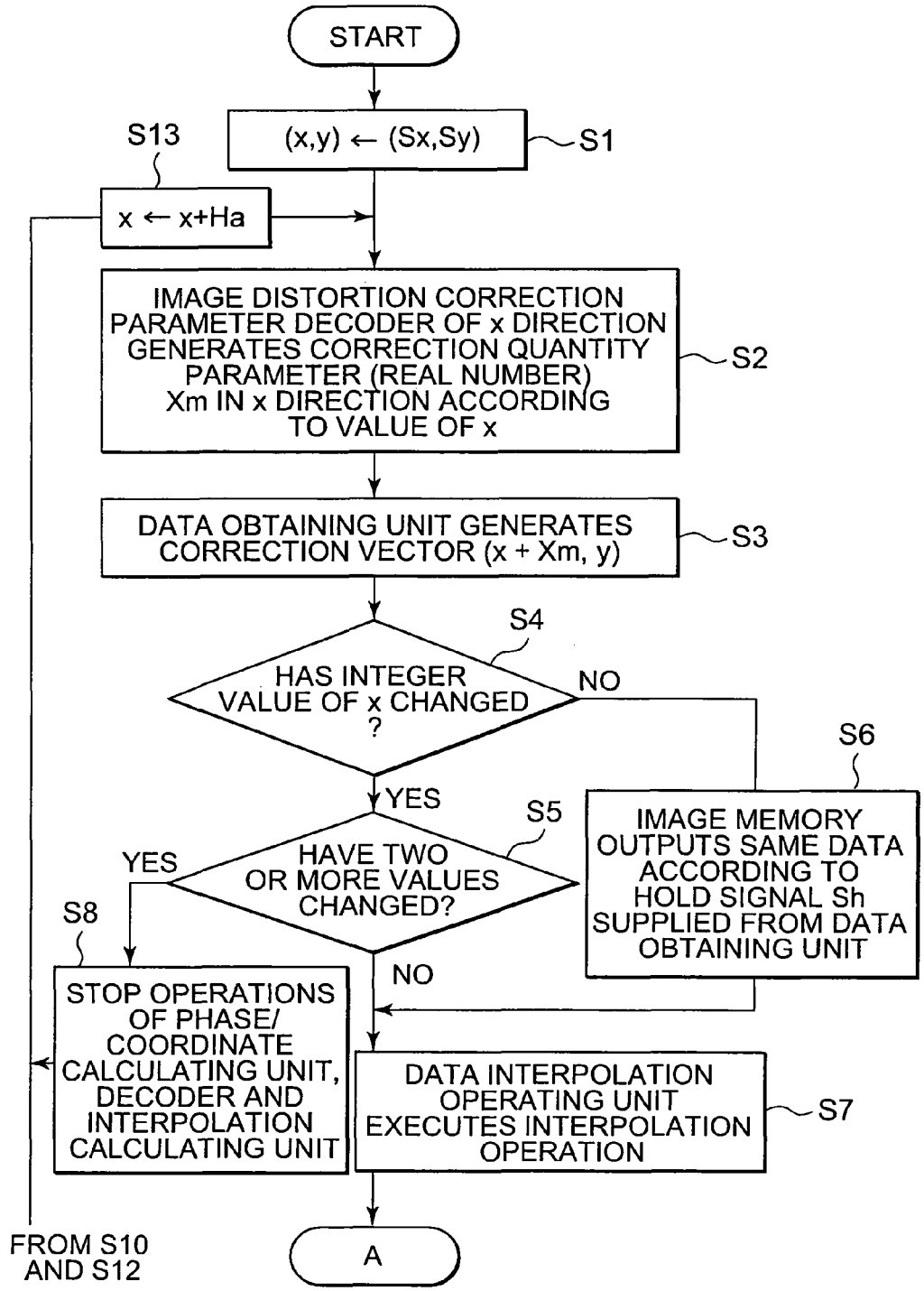
FIG. 5 is a first flow chart showing the operation of a horizontal one-dimensional interpolating unit shown in FIG. 2.
Figure 6:
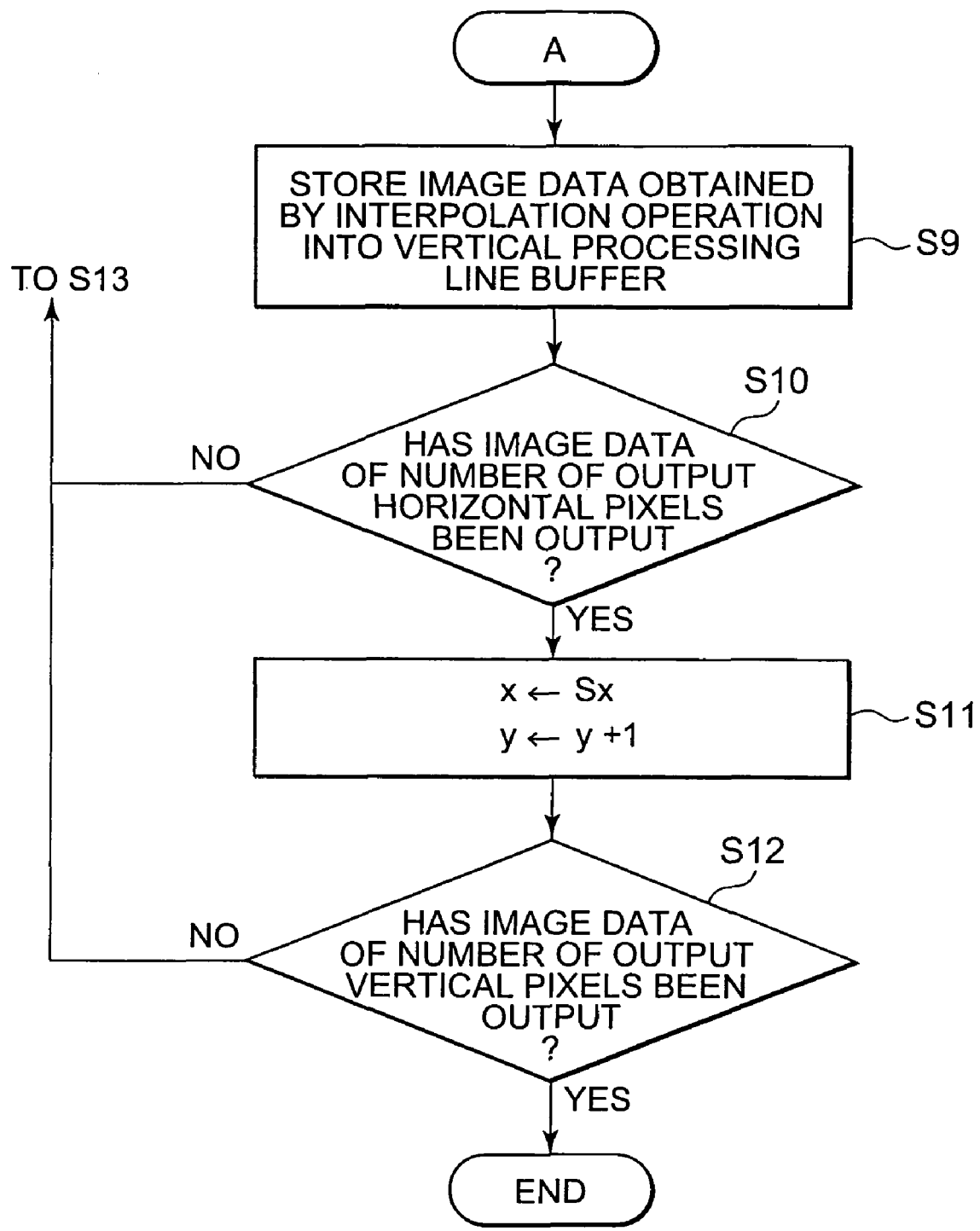
FIG. 6 is a second flow chart showing the operation of a horizontal one-dimensional interpolating unit shown in FIG. 2.

Next, referring to the flow charts of FIGS. 5 and 6, the operation of the horizontal one-dimensional interpolating unit 501 shown in FIG. 2 is described in detail. First, the operation control unit 22 generates a control timing signal according to the internal synchronizing signal supplied from the synchronizing signal generating unit 800. Then, the interpolation phase/input data coordinate calculating unit 23 operates in accordance with the control timing signal supplied from the operation control unit 22, and calculates the coordinates with a decimal point at an interpolation point in a coordinate system in the case where the image input into the signal processing unit 10 has no distortion.

Figure 7A:
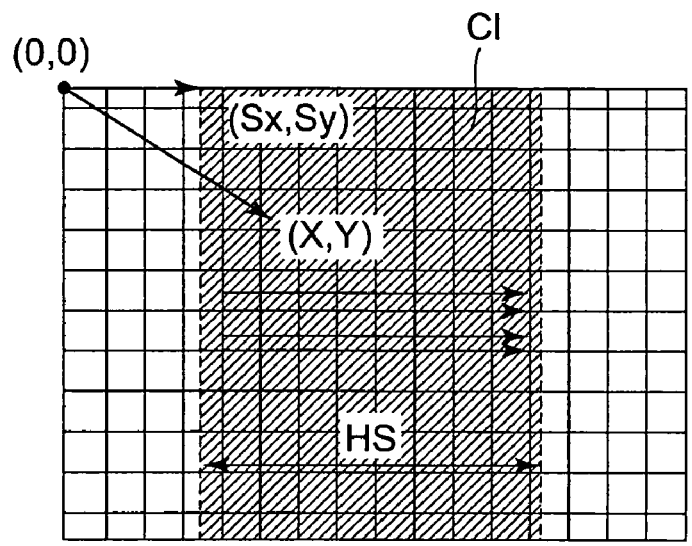
FIGS. 7A, 7B and 7C are views illustrating the operation shown in FIGS. 5 and 6.

Specifically, at Step S1, the interpolation phase/input data coordinate calculating unit 23 performs the initialization of coordinates (Sx, Sy) at the upper left of a cut-out image CI as coordinates (X, Y) on the image being subjected to a distortion correction and the same magnification conversion as shown in FIG. 7A, and supplies a correction parameter requesting signal Rx to the image distortion correction parameter decoder 33. On the other hand, at Step S2, the image distortion correction parameter decoder 33 obtains the correction quantity parameter Xm corresponding to the supplied correction parameter requesting signal Rx and the coordinates (Sx, Sy), and supplies the obtained correction quantity parameter Xm to the data obtaining unit 24 and the interpolation coefficient generating unit 25.

Hereupon, the image distortion correction parameter decoder 33 may be configured to build in, for example, a read only memory (ROM) in order to previously store a calculating table between the x coordinates and the correction quantity parameter Xm into the ROM. Alternatively, correction quantity parameters Xm may be approximated as a certain function of x coordinates, and the correction quantity parameter Xm may be obtained by using the function. The method will be described later in detail.

Figure 7B:
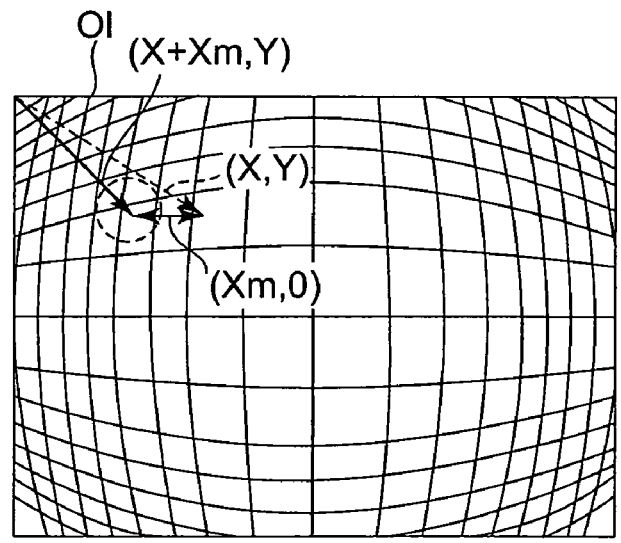

Next, at Step S3, the data obtaining unit 24 adds a correction quantity vector (Xm, 0) according to the correction quantity parameter Xm supplied from the image distortion correction parameter decoder 33 to the coordinates (X, Y) supplied from the interpolation phase/input data coordinate calculating unit 23. Thereby, as shown in FIG. 7B, the coordinates (X+Xm, Y) of the point corresponding to the coordinates (X, Y) in an original image OI before the correction, namely the correction vector, has been obtained.

Incidentally, in place of the data obtaining unit 24, the image distortion correction parameter decoder 33 may be set to obtain the correction vector according to the x coordinates supplied from the interpolation phase/input data coordinate calculating unit 23 to supply the correction vector to the data obtaining unit 24.

In this case, the data obtaining unit 24 determines whether or not the integer values of the x coordinates has changed by the addition of the Xm. When the data obtaining unit 24 determines that the integer values have changed, the operation proceeds to Step S5. When the data obtaining unit 24 determines that the integer values have not changed, the operation proceeds to Step S6.

At Step S5, the data obtaining unit 24 further determines whether or not the integer values have changed by two or more. When the data obtaining unit 24 determines that the integer values have changed by two or more, the operation proceeds to Step S8. When the data obtaining unit 24 determines that the integer value has changed by only one, the operation proceeds to Step S7. On the other hand, at Step S6, the image memory 601 again supplies the interpolation data same as that output at the preceding cycle to the data obtaining unit 24 according to the hold signal Sh supplied from the data obtaining unit 24.

In the above description, the data obtaining unit 24 generates an address of the data to be read from the image memory 601 according to the integer value of the x component (X+Xm) of the generated correction vector, and supplies a read control signal to the image memory 601 to obtain the interpolation data according to the address.

Hereupon, the image memory 601 increments addresses one by one from the starting address while the image memory 601 sequentially outputs interpolation data according to the addresses. Then, by receiving the supply of the hold signal Sh from the data obtaining unit 24, the image memory 601 temporarily stops the increment.

Incidentally, the image memory 601 may be one which receives a read starting address from the data obtaining unit 24 and outputs a predetermined number of pieces of continuous data having the read starting address as the starting address.

Hereupon, the hold signal Sh and the read starting address are obtained from the integer component of the correction quantity parameter Xm to be output from the image distortion correction parameter decoder 33.

On the other hand, the interpolation coefficient generating unit 25 handles the decimal component of the correction quantity parameter Xm supplied from the image distortion correction parameter decoder 33 as the phase of a horizontal interpolation filter, and generates an interpolation coefficient according to the decimal component. Incidentally, such operations are applied in the case where the image 102 to be input into the signal processing unit 10 has the RGB format. On the other hand, when the image 102 has the YUV format, the filter phase of a luminance signal Y can be similarly handled to the filter phase of the RGB format, and the filter phase of a color difference signal Cb/Cr can be calculated by using not only the decimal component of the correction quantity parameter Xm but also the integer component thereof.

Then, at Step S7, the data interpolation calculating unit 26 executes a one-dimensional interpolation operation according to the interpolation data supplied from the data obtaining unit 24 and the interpolation coefficient, and the operation proceeds to Step S9.

Figure 7C:
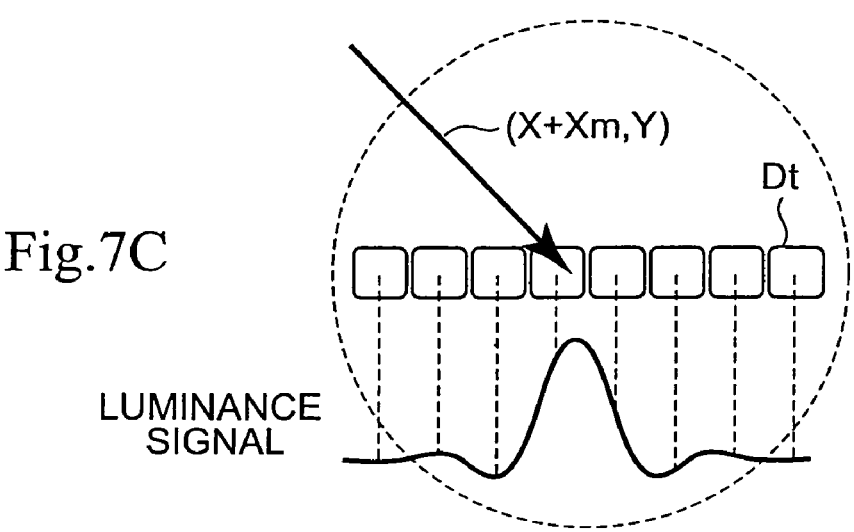

Hereupon, in the one-dimensional interpolation operation, for example in the YUV format, as shown in FIG. 7C, luminance data Dt of eight pixels in the horizontal direction from a near point to the correction vector (X+Xm, Y) is used as the interpolation data, and the interpolation operation of eight taps using the decimal component as the phase is executed. Incidentally, the result obtained by the interpolation operation is used as the luminance data and the like of an output image, thereby correcting the distortion in the horizontal direction.

On the other hand, at Step S8, the data obtaining unit 24 supplies a skip signal sk to the interpolation phase/input data coordinate calculating unit 23, the image distortion correction parameter decoder 33 and the data interpolation calculating unit 26, and stops the operations of the interpolation phase/input data coordinate calculating unit 23, the image distortion correction parameter decoder 33 and the data interpolation calculating unit 26.

Hereupon, when it is determined that x coordinates have changed by two or more at Step S5, it means a case where the center coordinates at which the interpolation operation is actually performed move over two pixels or more. Consequently, the output of data to the image memory 602 by the data interpolation calculating unit 26 is interrupted. Moreover, in the case where the center coordinates at which the interpolation operation is actually performed move over two pixels or more, the decimal component (interpolation phase) of the correction quantity parameter Xm to be output from the image distortion correction parameter decoder 33 is held until the next cycle. Consequently, the operation of the image distortion correction parameter decoder 33 is stopped.

Then, at Step S13, the interpolation phase/input data coordinate calculating unit 23 adds an expansion contraction parameter Ha in the horizontal direction to the x coordinates, and the operation proceeds to Step S2. Incidentally, the expansion contraction parameter Ha is determined by a ratio of the length in the horizontal direction of the original image having distortion to the image after the correction. When the image is expanded in the horizontal direction after the correction, the expansion contraction parameter Ha is set to be a value smaller than one. When the image is conversely contracted, the expansion contraction parameter Ha is set to be a value larger than one. When the image is changed at the same magnification, the expansion contraction parameter Ha is set to be one.

At Step S9, the data interpolation calculating unit 26 stores obtained image data into the image memory 602 composed of a vertical processing line buffer. Then, at Step S10, the interpolation phase/input data coordinate calculating unit 23 determines whether or not the image data for one line, i.e. for the number of output horizontal pixels HS, has been output to the image memory 602 on the basis of the x coordinate at the present time point. When the interpolation phase/input data coordinate calculating unit 23 determines that the data for one line has been output, the operation proceeds to Step S11. When the interpolation phase/input data coordinate calculating unit 23 determines that the data for one line has not been output yet, the operation proceeds to Step S13.

At Step S11, the interpolation phase/input data coordinate calculating unit 23 sets the x coordinate as Sx, and adds one to the y coordinate. Then, at Step S12, the interpolation phase/input data coordinate calculating unit 23 determines whether or not the image data by one frame, i.e. by the number of output vertical lines, has been output to the image memory 602, on the basis of the y coordinate. When the interpolation phase/input data coordinate calculating unit 23 determines that the data by one frame has been output, the operation is ended. When the interpolation phase/input data coordinate calculating unit 23 determines that the data by one frame has not been output, operation proceeds to Step S13.

As mentioned above, the horizontal one-dimensional interpolating unit 501 performs the one-dimensional interpolation operation in the horizontal direction to the original image having distortion, and implements the horizontal image distortion correction processing and the expansion/contraction processing in the horizontal direction at the same time. Then, the horizontal one-dimensional interpolating unit 501 stores the obtained image in the image memory 602 for vertical processing.

Figure 8:
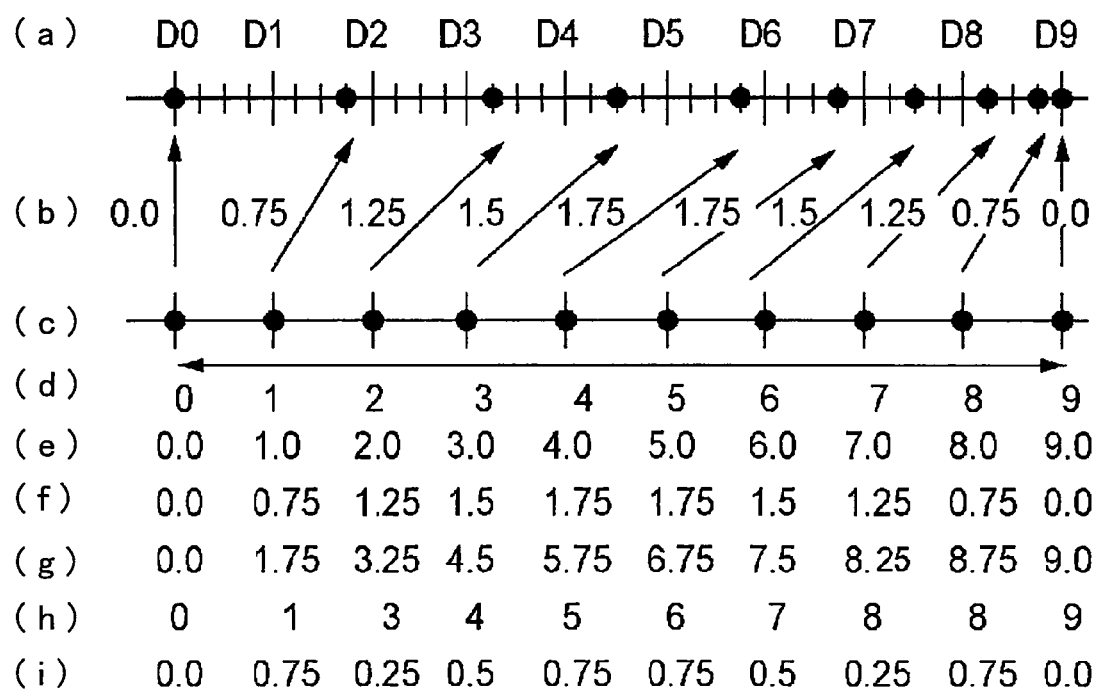
FIG. 8 is a view showing an example of same magnification conversion in horizontal one-dimensional interpolation.

Incidentally, an instantiation of the same magnification conversion by the horizontal one-dimensional interpolation is shown in FIG. 8. Hereupon, FIG. 8 shows the conversion pertaining to a luminance signal. FIG. 8(*a*) shows interpolation data D0 to D9 input into the signal processing unit 10. FIGS. 8(*b*) and 8(*f*) show correction quantity parameters Xm. FIGS. 8(*c*) and 8(*d*) show sampling positions and numbers of the data constituting an image after correction, respectively.

Moreover, FIG. 8(*e*) shows x coordinates (xt) supplied from the interpolation phase/input data coordinate calculating unit 23 to the image distortion correction parameter decoder 33. FIG. 8(*g*) shows x coordinates (correction parameters) of the correction vectors generated by the data obtaining unit 24. FIG. 8(*h*) shows an address of the interpolation data of the image before the correction. FIG. 8(*i*) shows an interpolation phase.

For example, as shown in FIG. 8, the correction quantity parameter Xm of the data located at a point where the x coordinate is 2.0 in the image after the correction is set to be 1.25. As a result, the x coordinate of the point corresponding to the point in the image before the correction can be obtained as 3.25 by adding the correction quantity parameter Xm to the value of 2.0. In this case, the integer component (3) of the x coordinate (3.25) indicates the address of the data of the image before the correction, and 0.25 indicates an interpolation phase. Consequently, the luminance signal at the point where the x coordinate of the image after the correction is 2.0 can be obtained by the one-dimensional interpolation operation which has a plurality of continuous pieces of data having x addresses near to 3 in the image before the correction as objects, and which sets the phase of the horizontal interpolation filter thereof as 0.25.

Figure 9:
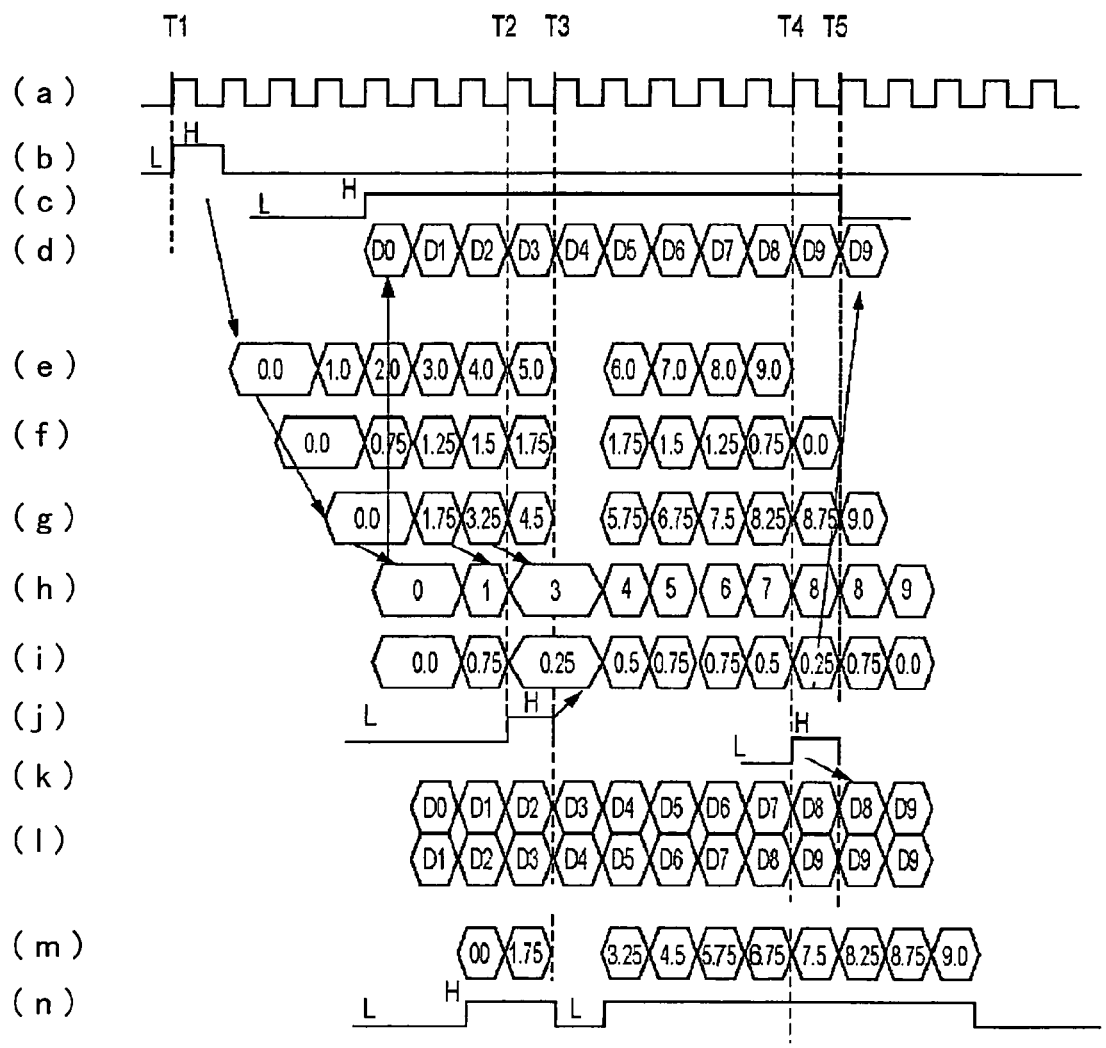
FIG. 9 is a timing chart showing the operation timing of the same magnification conversion shown in FIG. 8.

FIG. 9 is a timing chart showing the operation timing of the same magnification conversion shown in FIG. 8. Hereupon, FIG. 9(a) shows an internal synchronizing signal to be supplied to the operation control unit 22. FIG. 9(b) shows a control timing signal to be generated by the operation control unit 22. FIG. 9(c) shows a read control signal to be supplied form the data obtaining unit 24 to the image memory 601. FIG. 9(d) shows interpolation data to be input into the data obtaining unit 24 from the image memory 601. FIG. 9(e) shows x coordinates (xt) to be supplied to the image distortion correction parameter decoder 33 from the interpolation phase/input data coordinate calculating unit 23.

Moreover, FIG. 9(f) shows the correction quantity parameters Xm to be output from the image distortion correction parameter decoder 33. FIG. 9(g) shows correction parameters to be generated by the data obtaining unit 24. FIG. 9(h) shows the addresses of the interpolation data of the image before correction. FIG. 9(i) shows interpolation phases. FIGS. 9(j) and 9(k) show a skip signal sk and a hold signal Sh to be generated by the data obtaining unit 24, respectively. FIG. 9(l) shows the data of two taps to be read from the image memory 601. FIG. 9(m) shows the data to be output to the image memory 602 from the data interpolation calculating unit 26. FIG. 9(n) shows an output enabling signal to be generated in the inside of the data interpolation calculating unit 26. Incidentally, hereupon, for simplifying the description, it is supposed that the two-tap data shown in FIG. 9(l) is used in an interpolation operation for obtaining one piece of data.

As shown in FIG. 9(b), when the control timing signal is activated to a high level at time T1 according to the internal synchronizing signal, the interpolation phase/input data coordinate calculating unit 23 sequentially supplies the x coordinates (xt), which are incremented from 0.0 by 1.0 as shown in FIG. 9(e), to the image distortion correction parameter decoder 33.

Accordingly, as shown in FIG. 9(f), the image distortion correction parameter decoder 33 obtains corresponding correction quantity parameters Xm, and after that the data obtaining unit 24 calculates the correction parameters shown in FIG. 9(g). Hereupon, as shown in FIG. 9(h), the data obtaining unit 24 specifies the starting address of the interpolation data in the image before the correction to be 0 on the basis of the integer components of the correction parameters. Then, as shown in FIGS. 9(c) and 9(d), the data obtaining unit 24 supplies the address 0 specified as described above to the image memory 601 together with the activated read control signal.

Accordingly, as shown in FIG. 9(d), the image memory 601 continuously outputs interpolation data to the data obtaining unit 24 from the data D0 corresponding to the starting address 0 sequentially.

Moreover, as shown in FIGS. 9(g) and 9(j), at time T2, when the data obtaining unit 24 determines that the integer component of the correction parameter has increased by two or more, the data obtaining unit 24 generates the skip signal sk of the high level (H), and supplies the generated skip signal sk to the interpolation phase/input data coordinate calculating unit 23, the data interpolation calculating unit 26 and the image distortion correction parameter decoder 33. As a result, as shown in FIGS. 9(e) to 9(g), the generation operation of the correction parameters is stopped for one cycle from time T3. Furthermore, as shown in FIGS. 9(m) and 9(n), the output enabling signal is inactivated to a low level. Accordingly, the data outputting from the data interpolation calculating unit 26 to the image memory 602 is stopped.

Moreover, as shown in FIGS. 9(g) and 9(k), the data obtaining unit 24 determines that the integer component of the correction parameter (8.75) generated at time T4 is the same as the integer component of the correction parameter (8.25) at the preceding cycle, and activates the hold signal Sh to the high level at time T4. Accordingly, as shown in FIG. 9(l), the data obtaining unit 24 obtains the interpolation data D8 and D9 having the same two taps as those of the preceding cycle from the image memory 601 at time T5.

Figure 10:
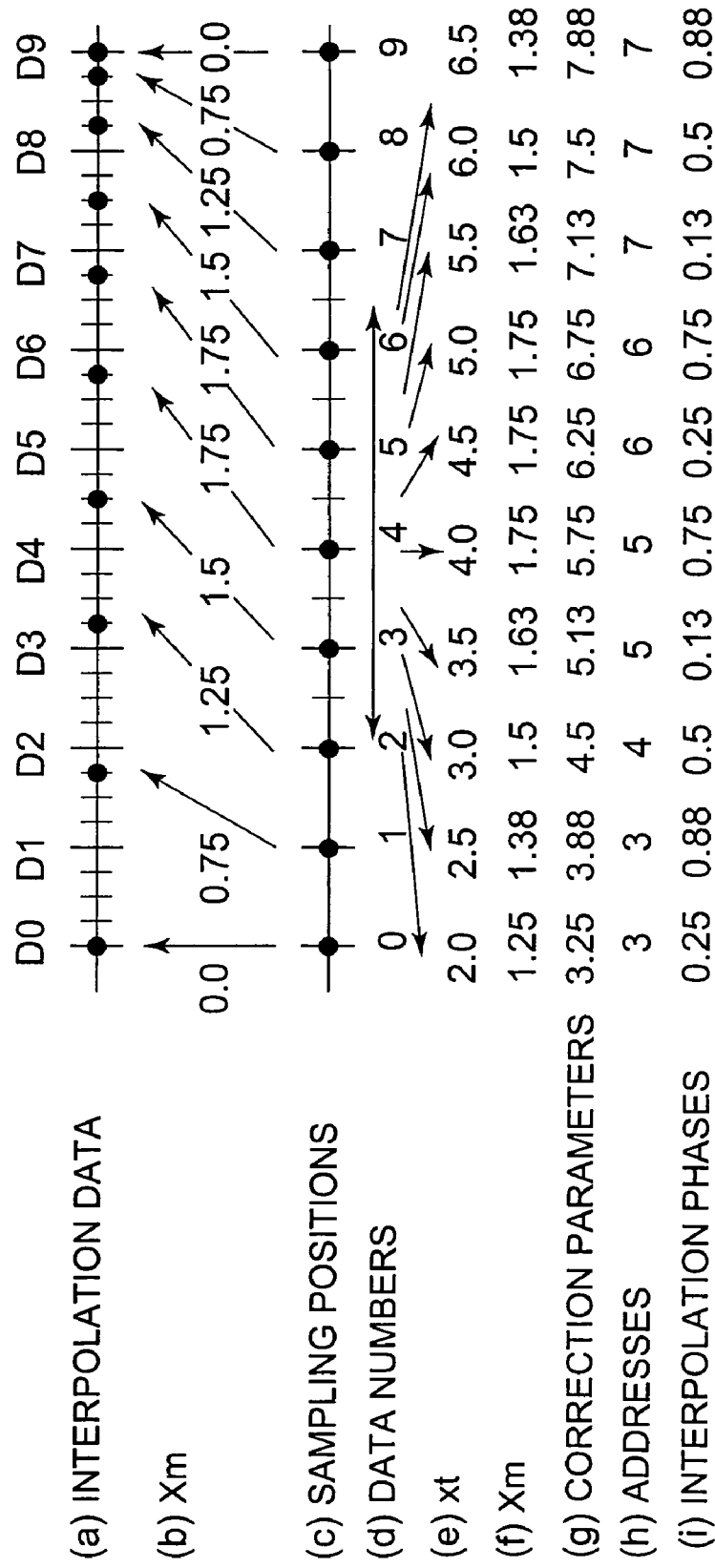
FIG. 10 is a view showing an example of horizontal expansion conversion in the horizontal one-dimensional interpolation.
Figure 11:
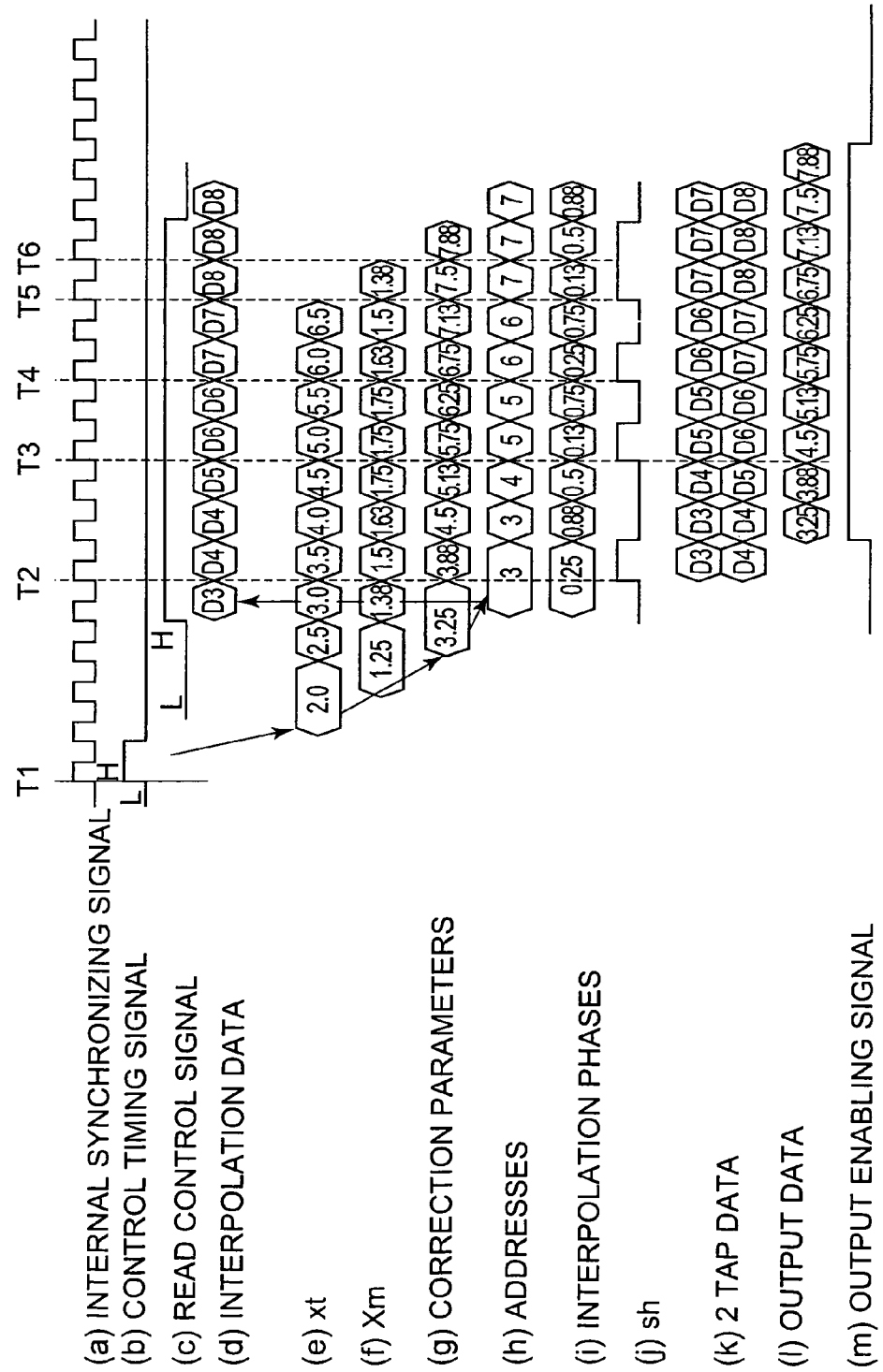
FIG. 11 is a timing chart showing the operation timing of the horizontal expansion conversion shown in FIG. 10.

Incidentally, FIG. 10 shows an instantiation of the expansion conversion by the horizontal one-dimensional interpolation similarly to FIG. 8. FIG. 11 shows the operation timing of the expansion conversion similarly to FIG. 9. In the example of the expansion conversion, as shown in FIG. 10(e), the pieces of data having the data numbers from 2 to a number near to 6 are expanded in the horizontal direction as the expansion contraction parameter Ha in the horizontal direction is 0.5. Hereupon, FIG. 10(b) shows the correction quantity parameters Xm pertaining to ten pieces of data having the data numbers from 0 to 9. FIG. 10(f) shows the correction quantity parameters Xm at the interpolation points by the expansion, namely at ten points located by every 0.5 interval in the range from 2.0 to 6.5 on the x coordinate.

Then, in such an expansion conversion, as shown in FIG. 11(g), the integer components of the correction parameters are not changed at time T2, T3, T4, T5 and T6, the hold signal Sh is activated to be the high level for one cycle at every time.

Figure 12:
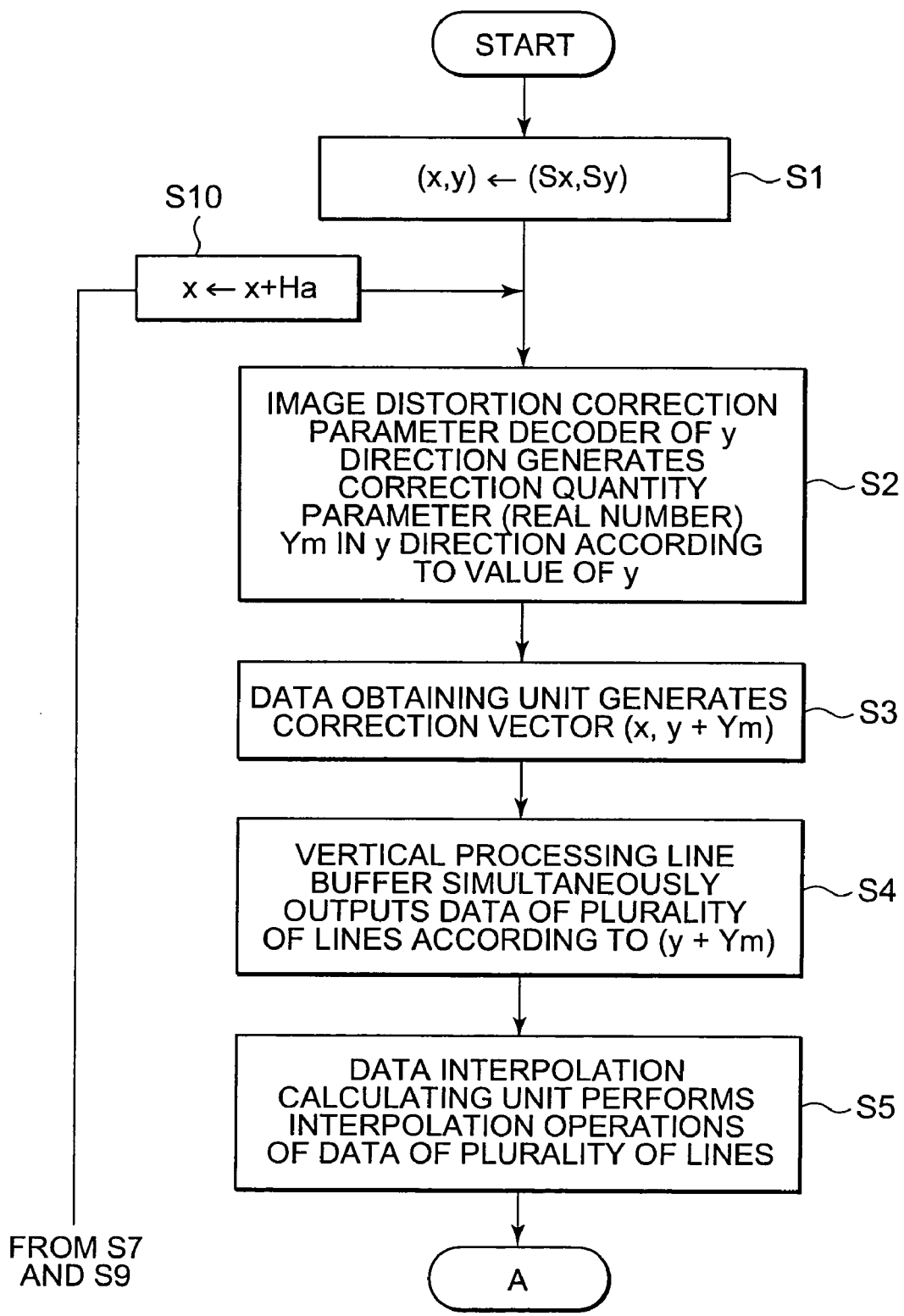
FIG. 12 is a first flow chart showing the operation of a vertical one-dimensional interpolating unit shown in FIG. 2.
Figure 13:
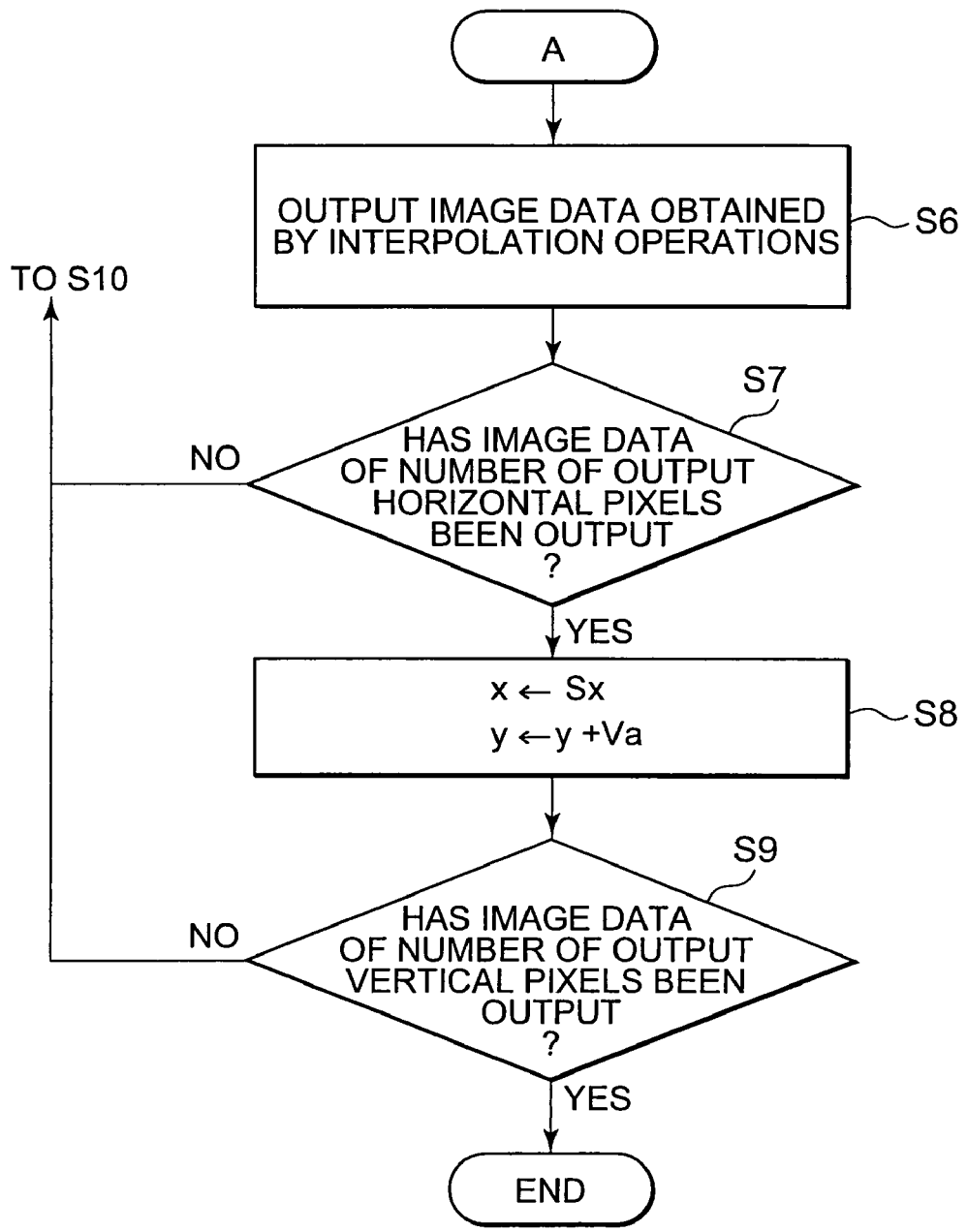
FIG. 13 is a second flow chart showing the operation of the vertical one-dimensional interpolating unit shown in FIG. 2.

Next, referring to the flow charts of FIGS. 12 and 13, the operation of the vertical one-dimensional interpolating unit 502 shown in FIG. 2 is described in detail. First, the operation control unit 27 generates a control timing signal according to the internal synchronizing signal supplied from the synchronizing signal generating unit 800. Then, the interpolation phase/input data coordinate calculating unit 28 operates in accordance with the control timing signal supplied from the operation control unit 27, and calculates the coordinates with a decimal point at an interpolation point in a coordinate system in the case where the image input into the signal processing unit 10 has no distortion.

Figure 14A:
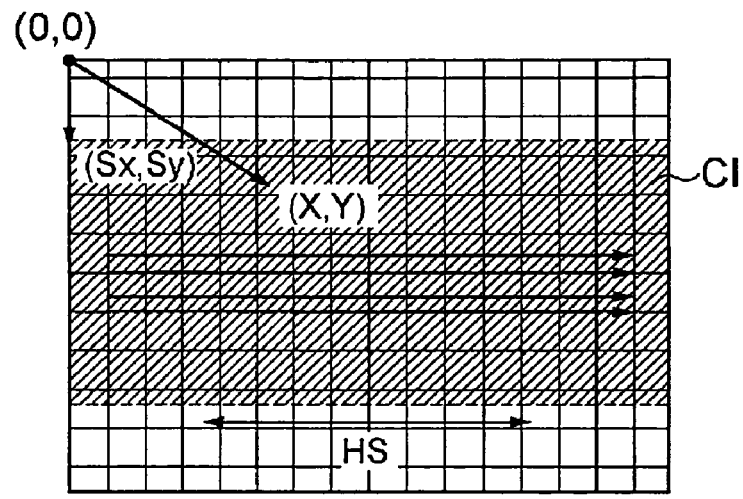
FIGS. 14A, 14B and 14C are views illustrating the operation shown in FIGS. 12 and 13.

Specifically, at Step S1, the interpolation phase/input data coordinate calculating unit 28 performs the initialization of coordinates (Sx, Sy) at the upper left of a cut-out image CI as coordinates (X, Y) on the image having received a distortion correction and the same magnification conversion as shown in FIG. 14A, and supplies a correction parameter requesting signal Ry to the image distortion correction parameter decoder 34. On the other hand, at Step S2, the image distortion correction parameter decoder 34 obtains the correction quantity parameter Ym corresponding to the y coordinate according to the supplied correction parameter requesting signal Rx, and supplies the obtained correction quantity parameter Ym to the data obtaining unit 29 and the interpolation coefficient generating unit 30.

Hereupon, the image distortion correction parameter decoder 34 may be configured to build in, for example, a read only memory (ROM), and a calculating table between the y coordinates and the correction quantity parameters Ym may be previously stored into the ROM. Alternatively, the correction quantity parameters Ym may be approximated as a certain function of y coordinates, and the correction quantity parameters Ym may be obtained by using the function. This will be described later in detail.

Figure 14B:
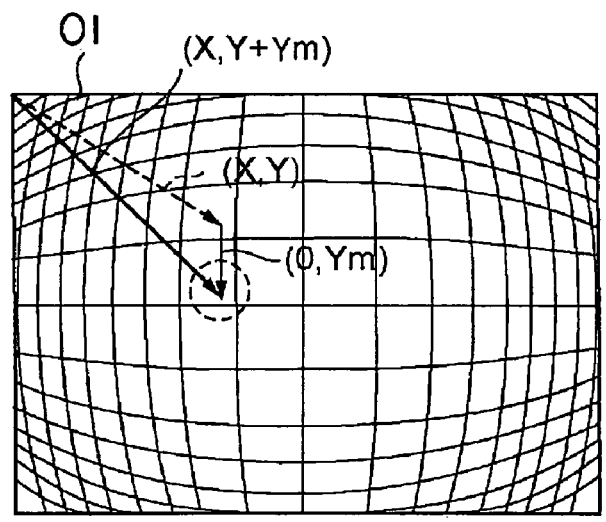

Next, at Step S3, the data obtaining unit 29 adds a correction quantity vector (0, Ym) according to the correction quantity parameter Ym supplied from the image distortion correction parameter decoder 34 to the coordinates (X, Y) supplied from the interpolation phase/input data coordinate calculating unit 28. Accordingly, as shown in FIG. 14B, the coordinates (X, Y+Ym) of the point corresponding to the coordinates (X, Y) in the original image OI before the correction, namely the correction vector, is obtained. In this case, the data obtaining unit 29 generates the address of the data to be read from the image memory 602 according to the integer value of the y component (Y+Ym) of the generated correction vector, and supplies the generated address to the image memory 602 together with the memory control signal.

Incidentally, in place of the data obtaining unit 29, the image distortion correction parameter decoder 34 may be set to obtain the correction vector according to the y coordinates supplied from the interpolation phase/input data coordinate calculating unit 28 and supplies the correction vector to the data obtaining unit 29.

Then, at Step S4, the image memory 602 for vertical processing simultaneously outputs a plurality of pieces of interpolation data being in a row over a plurality of lines in the vertical direction in the coordinate X to the data obtaining unit 29 according to the supplied address.

Hereupon, the image memory 602 receives a starting address, from which reading is started, from the data obtaining unit 29. The image memory 602 increments the address by one to output the interpolation data according to the address sequentially. Alternatively, the image memory 602 does not increment the address to output data continuous for a predetermined number from the received starting address. Hereupon, the starting address is obtained from the integer component of the correction quantity parameter Ym to be output from the image distortion correction parameter decoder 34.

On the other hand, the interpolation coefficient generating unit 30 handles the decimal component of the correction quantity parameter Ym to be supplied from the image distortion correction parameter decoder 34 as the phase of a vertical interpolation filter, and generates an interpolation coefficient according to the decimal component.

Then, at Step S5, the data interpolation calculating unit 31 executes a one-dimensional interpolation operation according to the interpolation data supplied from the data obtaining unit 29 and the interpolation coefficient. Incidentally, the interpolation operation is not only applied to the case where the image 102 to be input into the signal processing unit 10 has the RGB format. That is to say, in case of the YUV format, when the data densities of the luminance signal and the color difference signal in the vertical direction are the same, the filter phase of the luminance signal can be used as the filter phase of the color difference signal. When the data densities are different from each other, not only the decimal component of the correction quantity parameter Ym is used, but also the integer component thereof is used together, whereby the filter phase of the color difference signal is calculated.

Figure 14C:
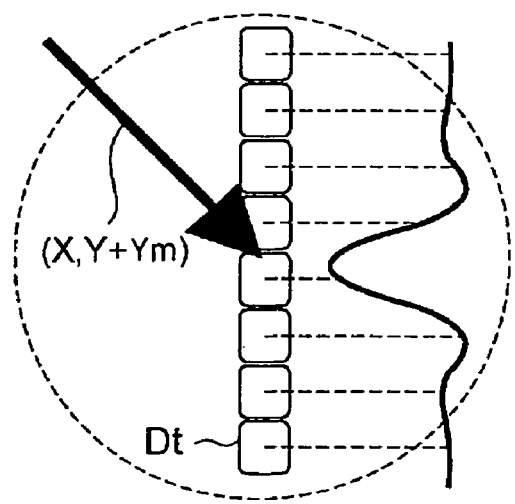

Moreover, in the YUV format, as shown in FIG. 14C, for example, luminance data Dt or the like at eight pixels in the vertical direction from a near point to the correction vector (X, Y+Ym) is used as the interpolation data, and the interpolation operation of eight taps using the decimal component as the phase is executed. Incidentally, the result obtained by the interpolation operation is used as the luminance data or the color difference data of an output image, and consequently the distortion in the vertical direction is corrected.

Next, at Step S6, the output data buffer 32 outputs the image data obtained by the interpolation operation. At Step S7, the interpolation phase/input data coordinate calculating unit 23 determines whether or not the image data for one line, i.e. for the number of output horizontal pixels HS, has been output on the basis of the x coordinate at the present time point. When the interpolation phase/input data coordinate calculating unit 23 determines that the data for one line has been output, the operation proceeds to Step S8. When the interpolation phase/input data coordinate calculating unit 23 determines that the data for one line has not been output yet, the operation proceeds to Step S10.

At Step S8, the interpolation phase/input data coordinate calculating unit 28 sets the x coordinate as Sx, and adds an expansion contraction parameter Va in the vertical direction to the y coordinate. On the other hand, at Step S10, the interpolation phase/input data coordinate calculating unit 28 adds the expansion contraction parameter Ha in the horizontal direction to the x coordinate, and the operation returns to Step S2. Incidentally, the expansion contraction parameter Va is determined on the basis of the ratio of the length in the vertical direction of the original image having distortion to the image after the correction. When the image is expanded in the vertical direction after the correction, the expansion contraction parameter Va is set to be a value smaller than 1. When the image is conversely contracted, the expansion contraction parameter Va is set to be a value larger than 1. When the image is changed at the same magnification, the expansion contraction parameter Va is set to be 1.

At Step S9, the interpolation phase/input data coordinate calculating unit 28 further determines whether or not the image data for one frame, i.e. for the vertical number of lines (the number of vertical pixels), has been output from the output data buffer 32, on the basis of the y coordinate. When the interpolation phase/input data coordinate calculating unit 28 determines that the data for one frame has been output, the operation is ended. When the interpolation phase/input data coordinate calculating unit 28 determines that the data for one frame has not been output, operation proceeds to Step S10.

Incidentally, in the one-dimensional interpolation in the vertical direction as described above, because the interpolation of data and the expansion/contraction of the image are not performed with regard to the horizontal direction, similar operations are repeated at every cycle in the scanning in the horizontal direction shown in FIG. 14A. However, when the correction quantity parameter Ym is large, there is the case where the time necessary for reading due interpolation data according to the stored area thereof in the image memory 602 becomes long. In such a case, the data obtaining unit 29 supplies an activated waiting signal WT to the interpolation phase/input data coordinate calculating unit 28 and the image distortion correction parameter decoder 34, and interrupts the operations of the interpolation phase/input data coordinate calculating unit 28 and the image distortion correction parameter decoder 34 during the activated period of the waiting signal WT.

As mentioned above, the vertical one-dimensional interpolating unit 502 performs the one-dimensional interpolation operation in the vertical direction to the original image having distortion, and implements the vertical image distortion correction processing and the expansion/contraction processing in the vertical direction at the same time, whereby the vertical one-dimensional interpolating unit 502 generates the image from which the distortion has been completely removed to output.

Figure 15:
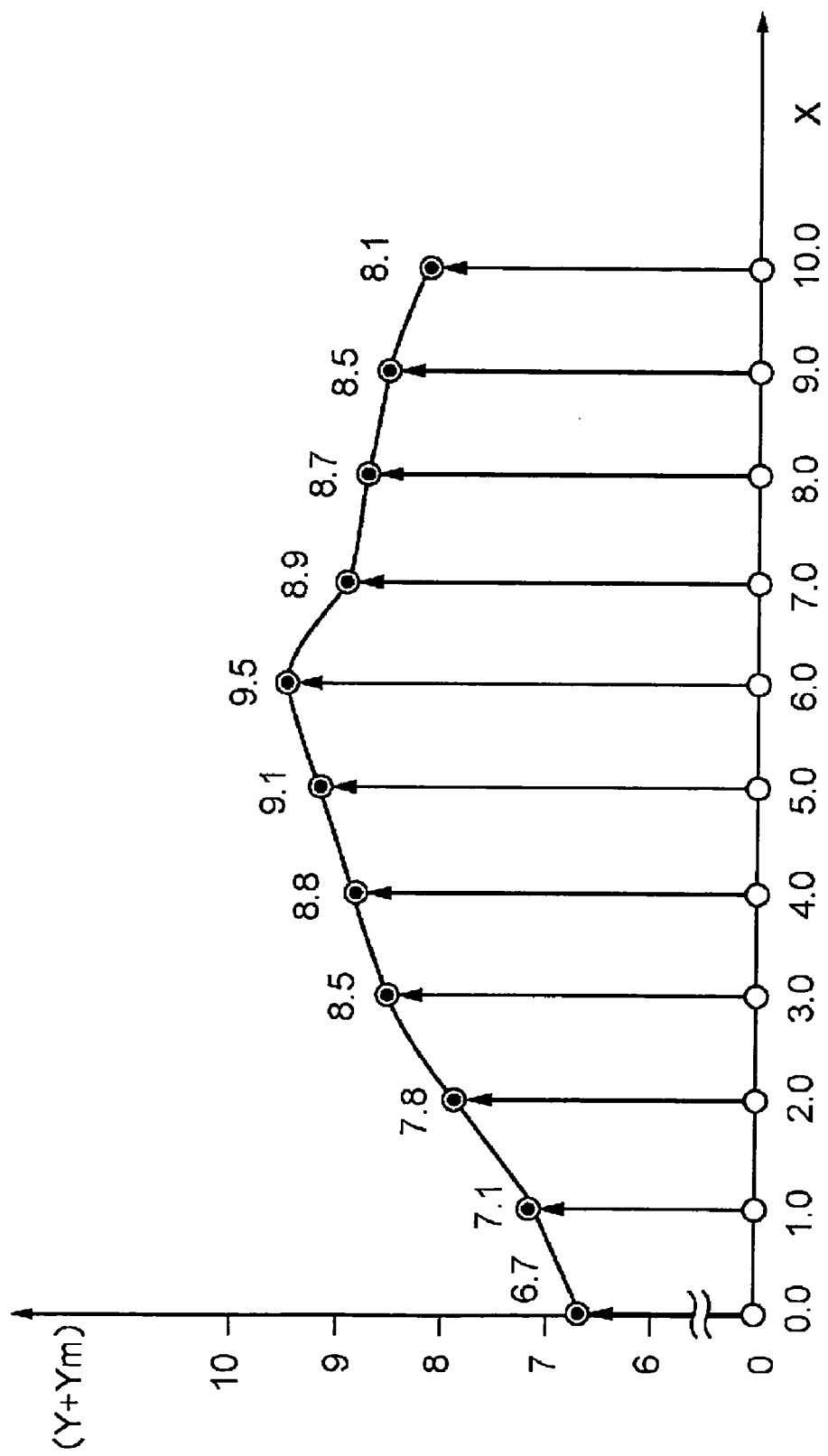
FIG. 15 is a view showing an example of vertical expansion conversion in vertical one-dimensional interpolation.

Incidentally, an instantiation of the same magnification conversion by the vertical one-dimensional interpolation is shown in FIG. 15. Hereupon, FIG. 15 is a graph showing the conversion pertaining to a luminance signal. The abscissa axis of the graph shows the x coordinate and the vertical axis of the graph shows the corrected y coordinate (Y+Ym).

Then, in FIG. 15, eleven points each having a y coordinate of 0 and an x coordinate of any one of values from 0.0 to 10.0 indicates points of an image after correction, and arrows indicate correction quantity parameters Ym from respective points to the points on the original image corresponding to the respective points. That is to say, for example, a point at coordinates (1.0, 0) in the image after the correction corresponds to a point at coordinates (1.0, 7.1) in the original image before the correction, and the correction quantity parameter is 7.1 and the interpolation phase is the decimal component 0.1 thereof.

Next, the pre-processing apparatus 3 and the correction parameter decoder 9, both shown in FIG. 1, are described in detail. First, referring to the flow chart shown in FIG. 16, the outlines of the operations of the pre-processing apparatus 3 and the correction parameter decoder 9 are described.

Figure 16:
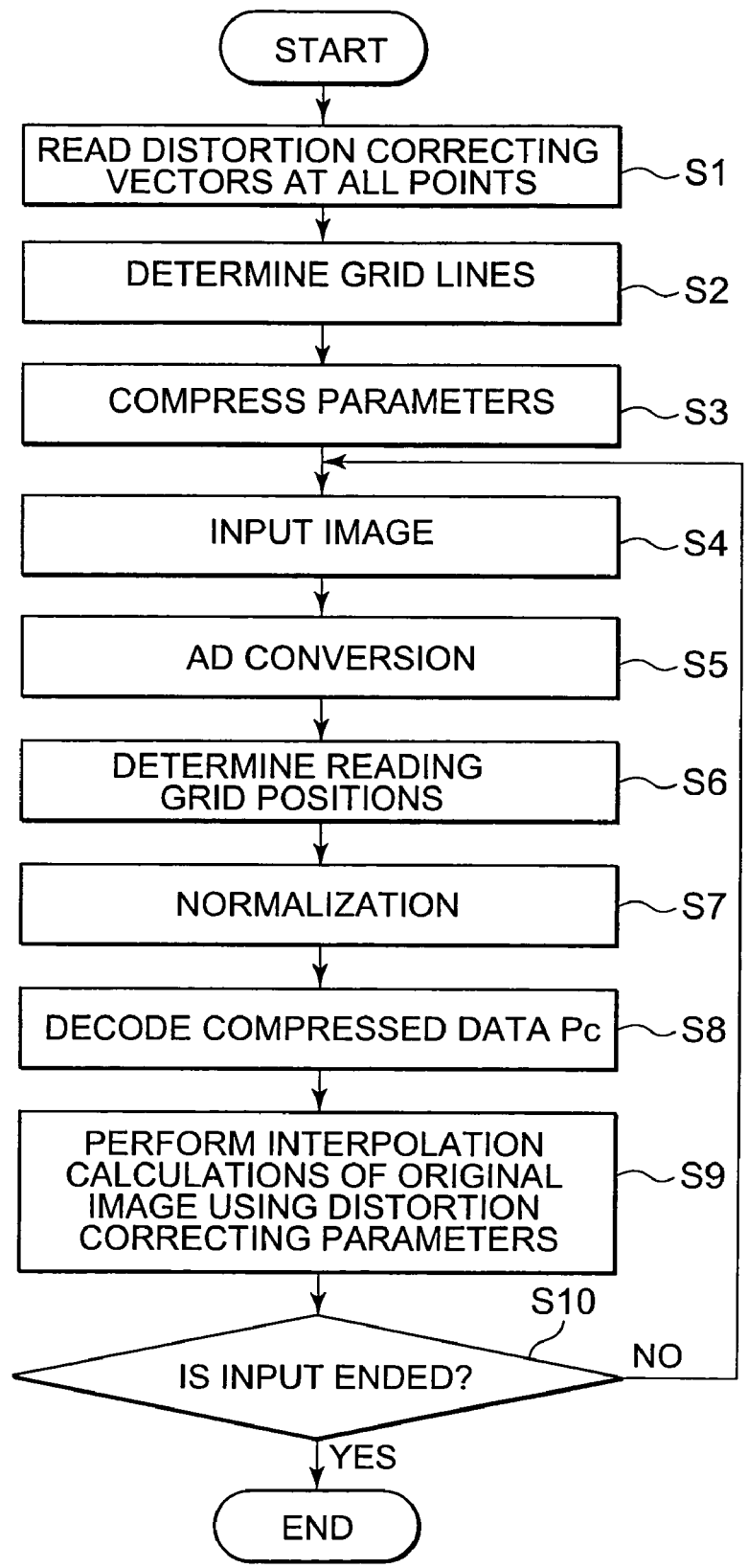
FIG. 16 is a flow chart showing the outline of the operations of a pre-processing apparatus and a correction parameter decoder, each shown in FIG. 1.

As shown in FIG. 16, at Step S1, the correction parameter encoder 5 reads the correction quantity vectors at all pixel points from the correction parameter deriving unit 6. Next, as shown at Step S2, the correction parameter encoder 5 determines grid lines for splitting the correction quantity vectors at all the pixel points at every segment. Incidentally, the determination of the grid lines will be described later in detail.

At Step S3, the correction parameter encoder 5 compresses the correction quantity vector of each segment split by the grid lines to be compressed data Pc, and supplies the compressed data Pc to the correction parameter decoder 9. At Step S4, the imaging device 300 images an image. Incidentally, the compression of the correction quantity vectors will be described later in detail.

Then, at Step S5, the data converting unit 400 converts the analog image signal generated by the imaging to a digital image signal. At Step S6, the correction parameter decoder 9 determines a grid necessary for reading correction quantity parameters to the signal processing unit 10. At Step S7, the correction parameter decoder 9 normalizes the coordinates supplied from the signal processing unit 10 according to the grid.

Next, at Step S8, the correction parameter decoder 9 decodes the compressed data Pc supplied from the correction parameter encoder 5 by using the grid, and supplies the obtained correction quantity parameters to the signal processing unit 10. Then, at Step S9, the signal processing unit 10 performs the interpolation operation of the original image by using the correction quantity parameters. Hereupon, at Step S10, the control micro computer 8 determines whether or not the inputting of the original image to the signal processing unit 10 should be ended. When the control micro computer 8 determines that the inputting should be ended, the control micro computer 8 ends the operation of the image processing apparatus 2. When the control micro computer 8 determines that the inputting should not be ended, the operation of the control micro computer 8 returns to Step S4.

Figure 17:
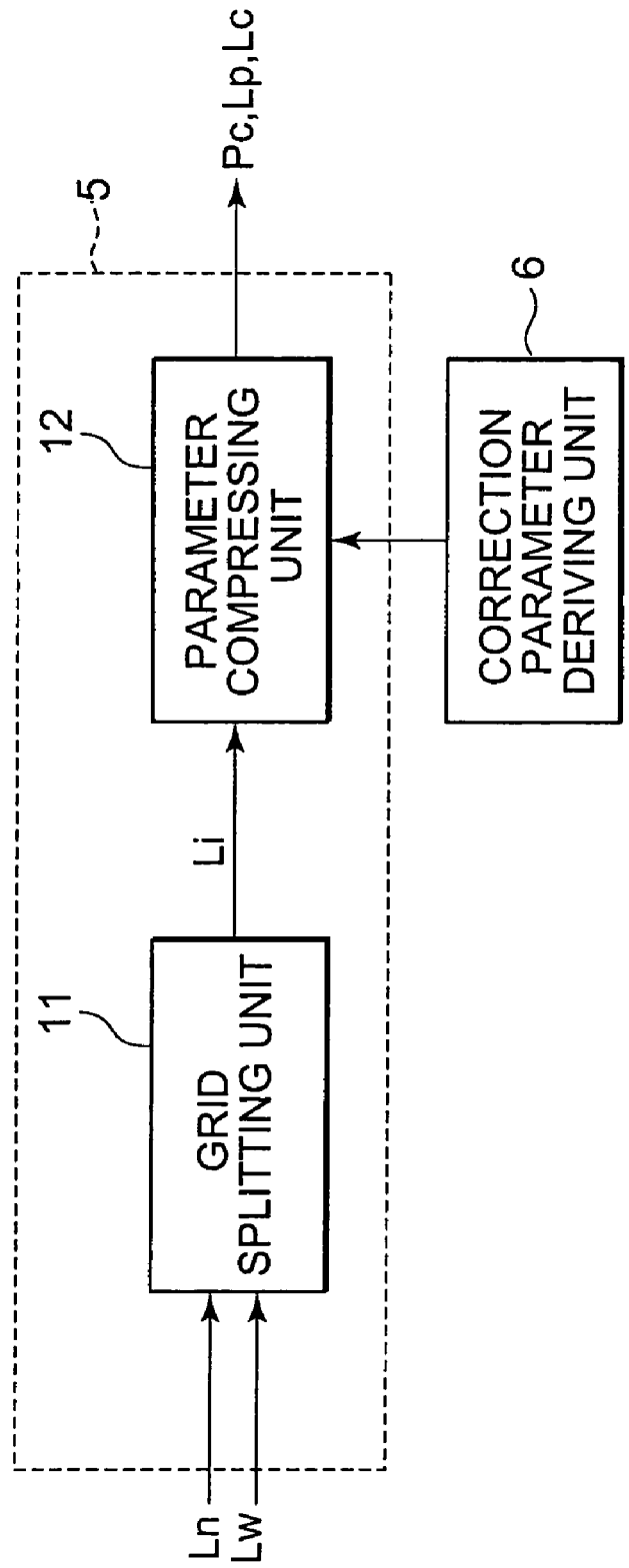
FIG. 17 is a block diagram showing the configuration of a correction parameter encoder shown in FIG. 1.

FIG. 17 is a block diagram showing the configuration of the correction parameter encoder 5 shown in FIG. 1. As shown in FIG. 17, the correction parameter encoder 5 includes a grid splitting unit 11 and a parameter compressing unit 12. Hereupon, the grid splitting unit 11 is connected to the user interface, and the parameter compressing unit 12 is connected to the grid splitting unit 11 and the correction parameter deriving unit 6. In the following, referring to FIGS. 18A, 18B to 23, the operation of the correction parameter encoder 5 is described in detail.

First, the grid splitting unit 11 determines grid lines for splitting the image 102 obtained from the data converting unit 400 into a plurality of areas. Then, the parameter compressing unit 12 compresses the correction quantity vectors of an image by using grid points at every area split by the grid lines, and supplies the obtained compressed data Pc to the correction parameter decoder 9.

By such a method, the number of the correction quantity vectors which should be held by the correction parameter decoder 9 can be reduced, and further operations can be performed by dividing the correction vectors in the x and the y directions similarly in the case where the correction quantity vectors of all points are held. Consequently, a high speed interpolation operation can be realized.

Figure 18A:
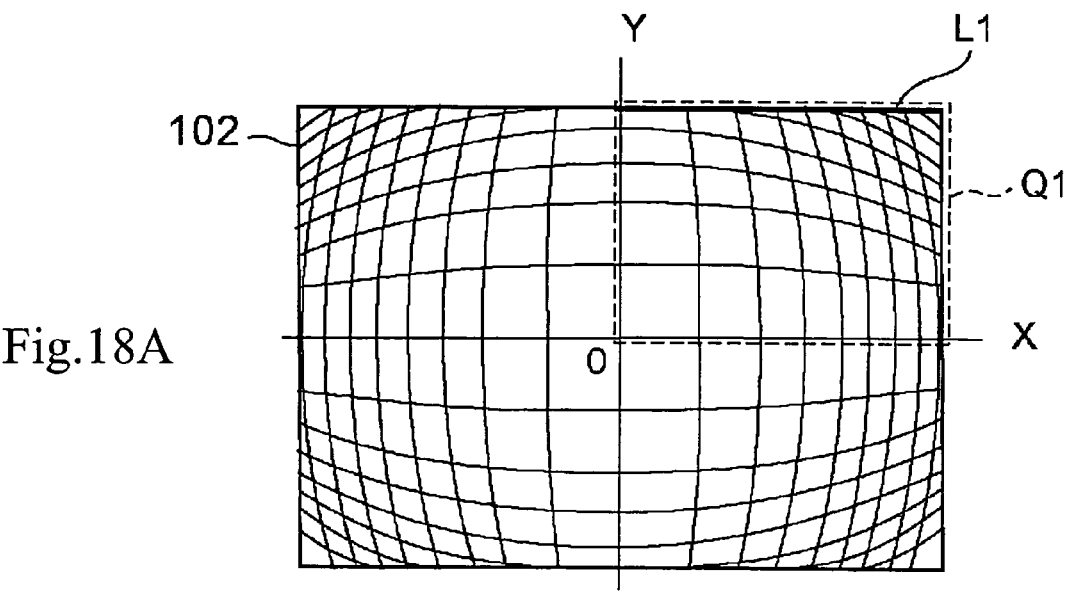
FIGS. 18A and 18B are views illustrating the outline of the operation of a grid splitting unit shown in FIG. 17.

In the following, the grid splitting operations by the grid splitting unit 11 shown in FIG. 17 are described. Incidentally, because the distortion of the image 102 generated by the data converting unit 400 is actually generated in point symmetry to the centre (the origin), as shown in FIG. 18A, it is sufficient to set only an area of a quarter of the image 102, for example, the first quadrant Q1, as the object area of grid splitting.

That is to say, because the distortion is determined according to the distance from the centre, the image processing in the first quadrant Q1 can be applied to the image processing in the other quadrants as it is by inverting the signs in x coordinates and/or y coordinates.

The grid split determining method includes a method of uniformly splitting a predetermined area into the x direction and the y direction (uniform split), a method of splitting the predetermined area so that the width of each grid is the exponentiation of 2 (exponentiation split), and a method of performing the split at the optimum split positions (the optimum split).

Figure 18B:
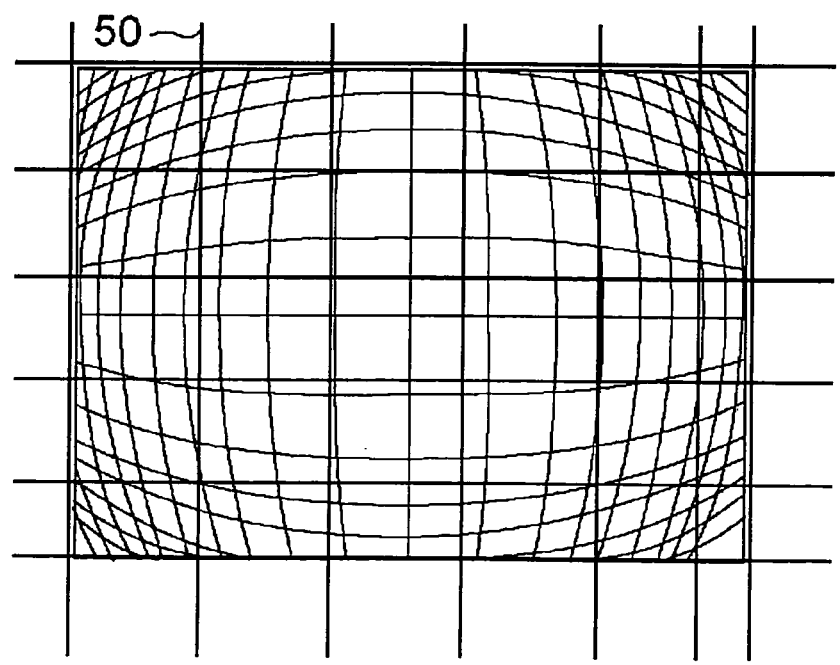

Hereupon, the grid splitting unit 11 receives a signal Lw appointing a grid splitting method and a signal Ln appointing the number of grid splitting from the user interface, and splits the image 102 into the appointed number of splits by using a grid 50 by the appointed method as shown in FIG. 18B.

In this case, only the correction quantity vectors at the grid points obtained by the above-mentioned grid splitting, i.e. the correction quantity vectors at every (1/grid width) in each direction, are used for the interpolation operations. Incidentally, in the exponentiation split, by the setting of the grid width to be the exponentiation of 2, the operations of the correction quantity vectors at each grid point become easy, whereby the scale of a circuit can be reduced.

Figure 19:
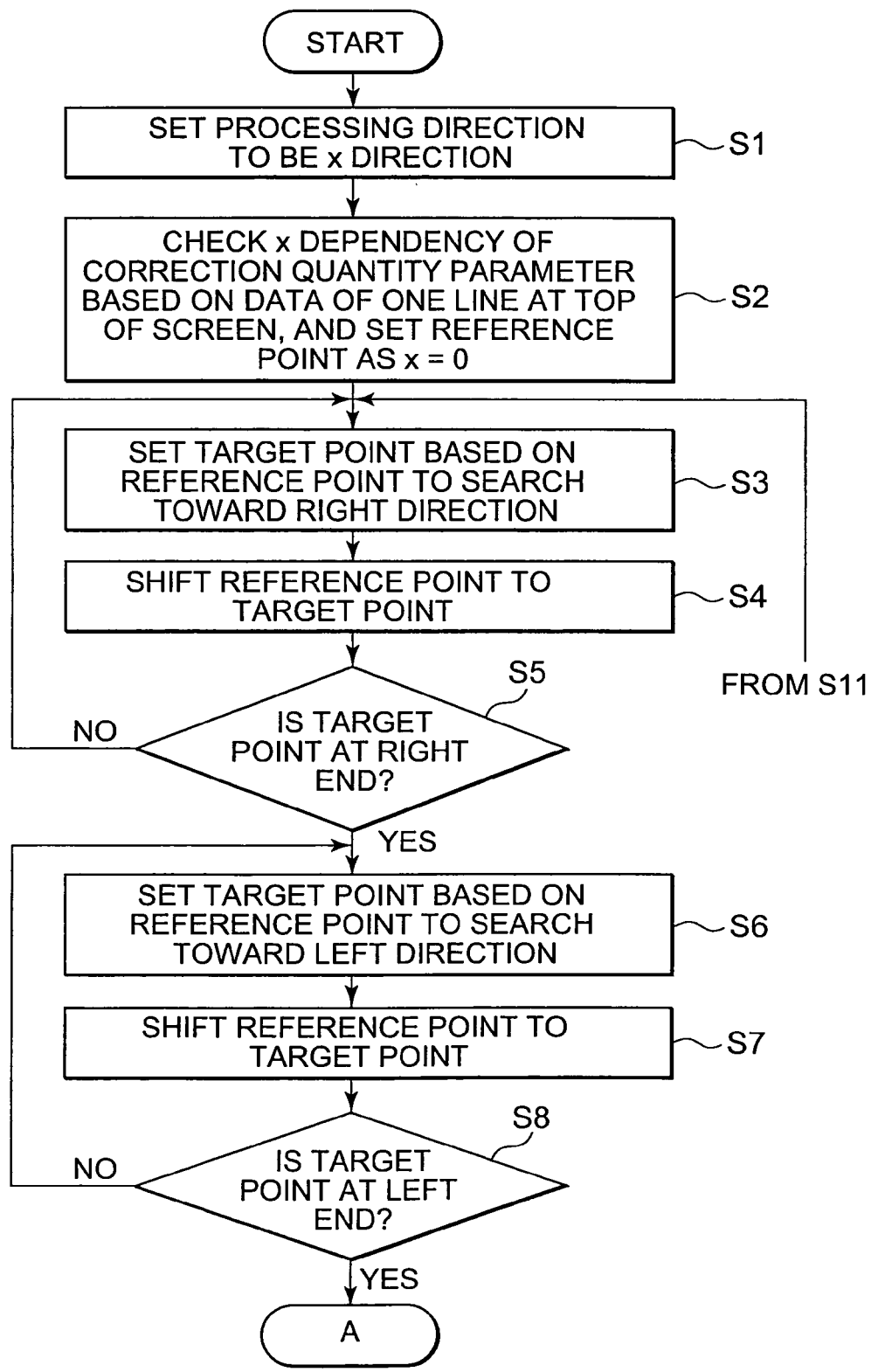
FIG. 19 is a first flow chart showing a method of the optimum split.
Figure 20:
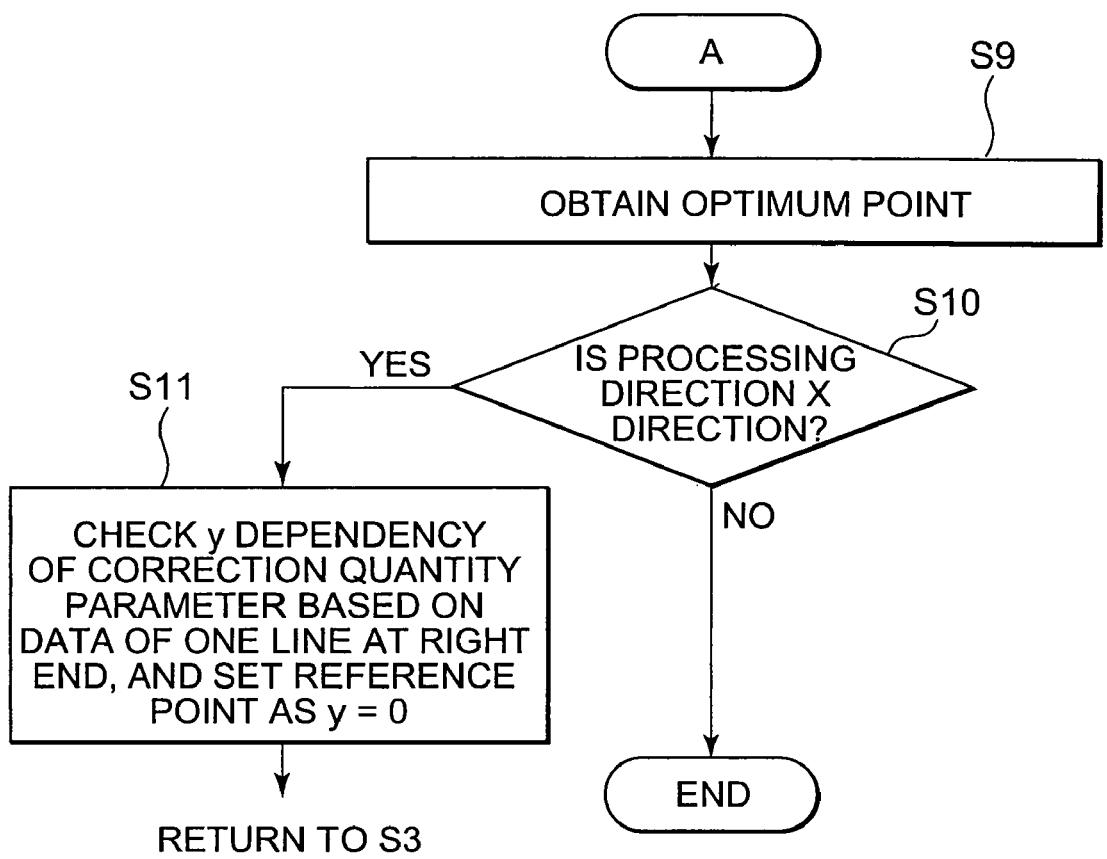
FIG. 20 is a second flow chart showing a method of the optimum split.

In the following, referring to the flow charts of FIGS. 19 and 20, the optimum splitting method to be executed by the grid splitting unit 11 is described.

Figure 21A:
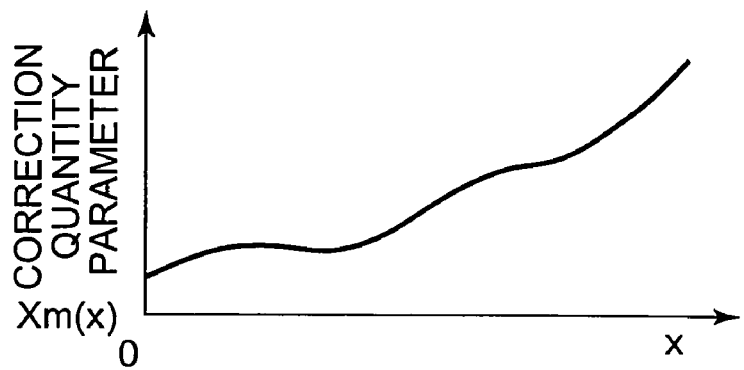
FIGS. 21A, 21B, 21C and 21D are first views illustrating the operations shown in FIGS. 19 and 20.

At Step S1, first, the scanning direction in the image processing is determined to be in the x direction. Next, at Step S2, the correction quantity parameters for one line L1 at the top of the screen shown in FIG. 18A are obtained for examining the x-dependency of the correction quantity parameters. Then, for example, when the reference point is set at x=0, an example of the x-dependency of the correction quantity parameters Xm(x) is shown in FIG. 21A.

At Step S3, a target point is set at a point shifted from the reference point (the origin) by two pixels toward the right direction therefrom, and all the points between the reference point and the target point (one segment) are fitted by a quadratic polynomial (hereinafter also referred to as a "segment quadratic polynomial").

At this time, in the segment, in the case where a condition in which a difference between the value of the correction quantity parameter Xm(x) and the correction quantity obtained by the quadratic polynomial (also referred to as a cost) is smaller than a predetermined value is satisfied, the target point is further shifted to the right side by one pixel, and the cost calculation is repeated. In such a way, the maximum point satisfying the above-mentioned condition is searched (right direction search).

Figure 21B:
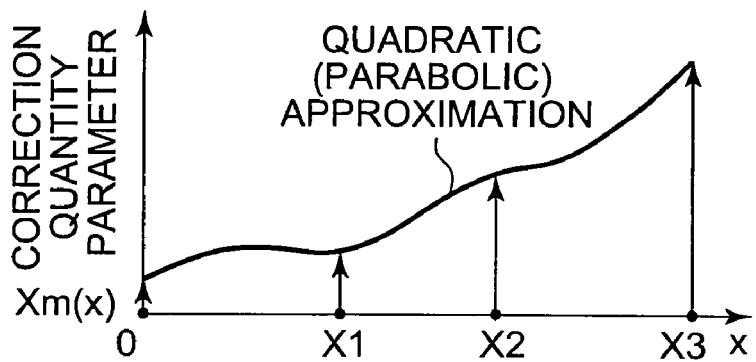
Figure 21C:
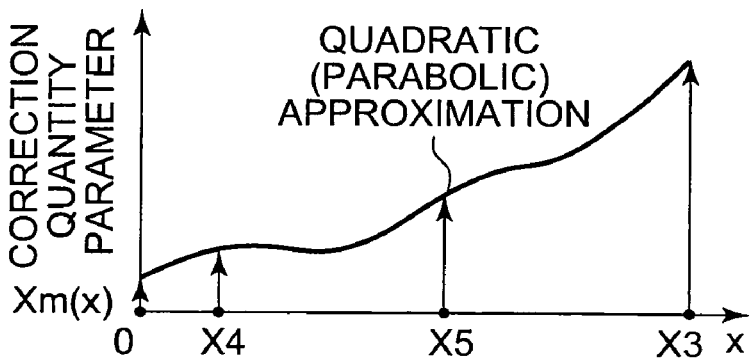

At Step S4, the reference point is shifted to the target point, and the right direction search at the next segment is executed. Incidentally, by such a method, for example, points X1, X2 and X3 shown in FIG. 21B are sequentially determined, and a correction quantity parameter Xm(x) as a function of x is approximated by means of a quadratic polynomial at every segment.

At Step S5, the grid splitting unit 11 determines whether or not the target point is at the right end. When the grid splitting unit 11 determines that the target point is at the right end, the operation of the grid splitting unit 11 proceeds to Step S6. When the grid splitting unit 11 determines that the target point is not at the right end, the operation of the grid splitting unit 11 returns to Step S3.

At Step S6, the data at the right end is set as the reference point, and a target point is set at a pixel shifted from the reference point toward the left side by two pixels. A left direction search is executed similarly to the right direction search. Then, after a certain segment is determined by the cost calculation, the reference point is shifter to the target point at Step S7, the left direction search in the next segment is executed. Incidentally, by such a method, for example, points X5 and X4 shown in FIG. 21C sequentially determined, and a correction quantity parameter Xm(x) as the function of x is approximated by a quadratic polynomial at every segment.

At Step S8, the grid splitting unit 11 determines whether the target point is at the left end or not. When the grid splitting unit 11 determines that the target point is at the left end, the operation of the grid splitting unit 11 proceeds to Step S9. When the grid splitting unit 11 determines that the target point is not at the left end, the operation of the grid splitting unit 11 returns to Step S6.

Figure 21D:
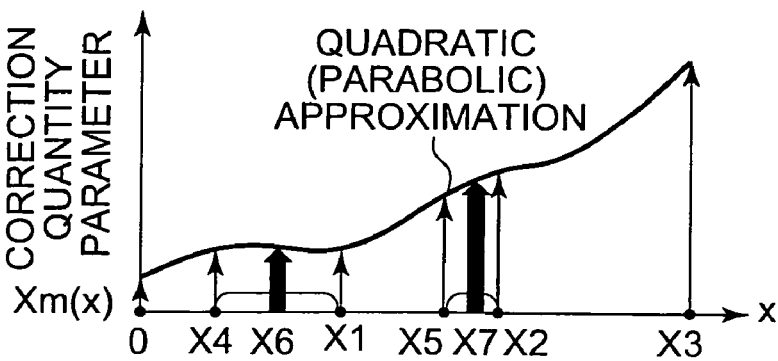

Next, at Step S9, as shown in FIG. 21D, a split position at which the cost of the whole becomes the minimum (optimum point) is obtained by comparing the points obtained by the right direction search and the points obtained by the left direction search. Hereupon, for example, as shown in FIG. 21D, a point X6 is determined by comparing the point X4 and the point X1, and a point X7 is determined by comparing the point X5 and the point X2.

At Step S10, the grid splitting unit 11 determines whether the search direction of the split position is the x direction or not. When the grid splitting unit 11 determines that the search direction of the split position is the x direction, the operation of the grid splitting unit 11 proceeds to Step S11. When the grid splitting unit 11 determines that the search direction of the split position is not the x direction but the y direction, the grid splitting unit 11 ends its operation.

At Step S11, the grid splitting unit 11 obtains correction quantity parameters of one line at the right end of a split object area, and checks the y dependency of the correction quantity parameters. Then, the operation of the grid splitting unit 11 returns to Step S3. Incidentally, a function having a reference point of y=0, an abscissa axis of the y coordinates, and an ordinate axis of the correction quantity parameters Xm(y) is shown similarly to one shown in FIG. 21A. The search operation is executed to the function similarly to the x direction. The grid splitting unit 11 determines the split positions in each of the x direction and the y direction to settle the grid 50. Incidentally, the settled grid positions are supplied to the parameter compressing unit 12 as grid information Li.

Figure 22A:
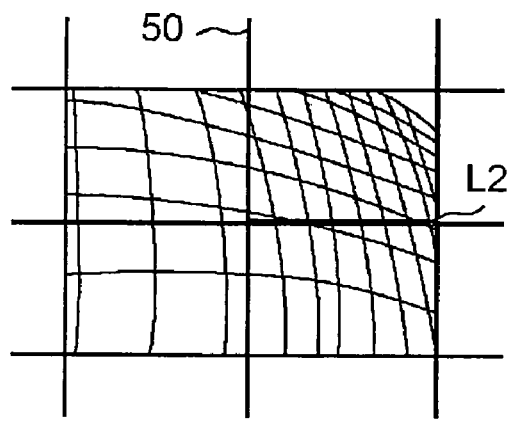
FIGS. 22A, 22B and 22C are second views illustrating the operations shown in FIGS. 19 and 20.

The parameter compressing unit 12 shown in FIG. 17 holds only the correction quantity vector at each grid point on the basis of the grid information Li supplied from the grid splitting unit 11. Then, the parameter compressing unit 12 determines a line segment L2 constituting the grid 50 as shown in FIG. 22A as processing objects. Hereupon, for example, the x coordinates of both ends of the line segment L2 are supposed to be X0 and X2, and the correction quantity parameters at both the ends are supposed to be Xm0 and Xm2, respectively. Then, the relation between the x coordinate at each point on the line segment L2 and the correction quantity parameter thereof is shown as, for example, FIG. 22B. In this case, the x coordinate of a pixel on the line segment L2 is supposed to be X1, and the correction quantity parameter is supposed to be Xm1. Then, coefficients Ca, Cb and Cc satisfying the following expression (1) are calculated.

$$\left. \begin{array}{l} Ca \times X0^2 + Cb \times X0 + Cc = Xm0 \\ Ca \times X1^2 + Cb \times X1 + Cc = Xm1 \\ Ca \times X2^2 + Cb \times X2 + Cc = Xm2 \end{array} \right\} \quad (1)$$

Figure 22B:
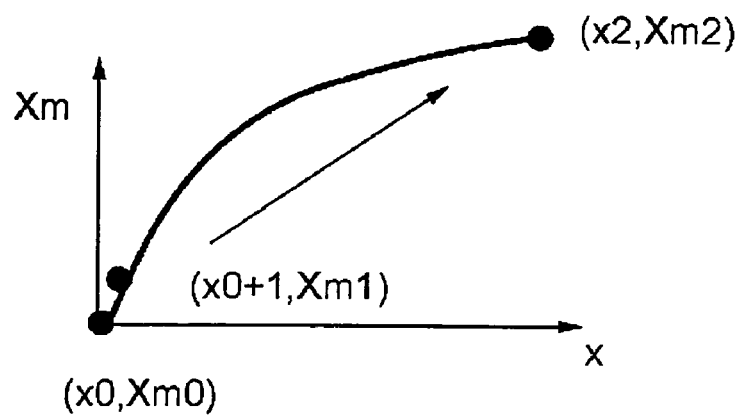
Figure 22C:
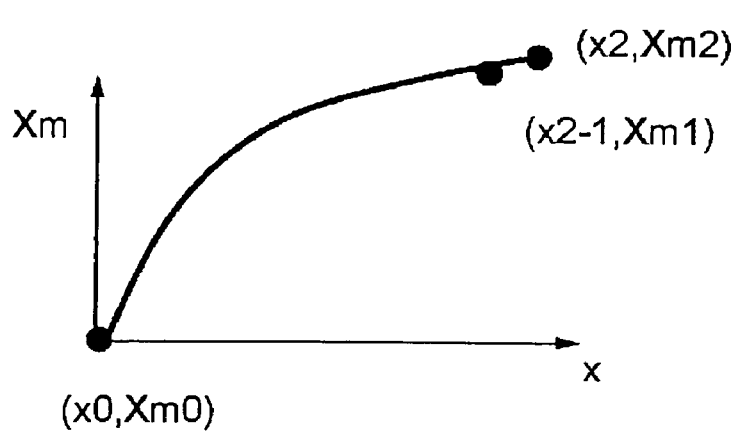

Incidentally, as shown in FIGS. 22B and 22C, X1 is sequentially incremented one by one from X0 to X2, and differences between the magnitude of the correction quantity parameter at each point on the line segment L2 and the approximate value of each segment by the quadratic polynomial are sequentially compared. Then, the x coordinate and the correction quantity parameter at the point where the difference becomes the minimum are assigned into the expression (1) as X1 and Xm1, respectively.

Hereupon, the parameter compressing unit 12 calculates the coefficients Ca, Cb and Cc as to all of the line segments constituting the grid 50, and holds the calculated coefficients Ca, Cb and Cc. Furthermore, the parameter compressing unit 12 supplies the coefficients Ca, Cb and Cc to the correction parameter decoder 9 as the compressed data Pc.

Figure 23:
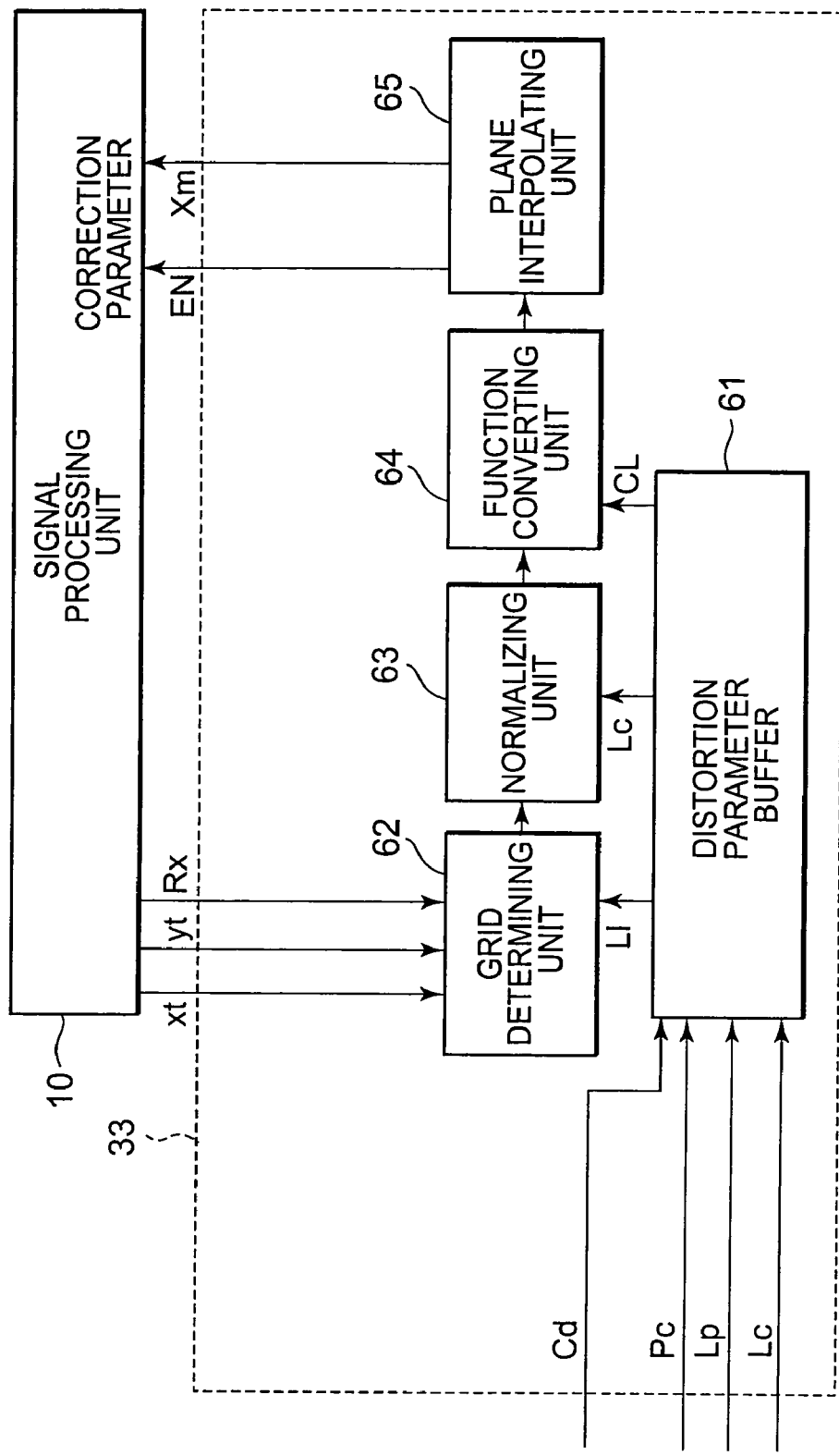
FIG. 23 is a block diagram showing the configuration of an image distortion correction parameter decoder for the x direction shown in FIG. 2.

FIG. 23 is a block diagram showing the configuration of the image distortion correction parameter decoder 33 for the x direction shown in FIG. 2. As shown in FIG. 23, the image distortion correction parameter decoder 33 includes a distortion parameter buffer 61, a grid determining unit 62, a normalizing unit 63, a function converting unit 64 and a plane interpolating unit 65.

Hereupon, the distortion parameter buffer 61 is connected to the control micro computer 8 and the correction parameter encoder 5, and the grid determining unit 62, the normalizing unit 63 and the function converting unit 64 are all connected to the distortion parameter buffer 61. Furthermore, the grid determining unit 62 is connected to the signal processing unit 10, and the normalizing unit 63 is connected to the grid determining unit 62. Moreover, the function converting unit 64 is connected to the normalizing unit 63, and the plane interpolating unit 65 is connected to the function converting unit 64. Incidentally, the signal processing unit 10 is connected to the plane interpolating unit 65.

The image distortion correction parameter decoder 33 having the configuration described above decodes the compressed data Pc supplied from the correction parameter encoder 5 to decompress the correction quantity parameter of each point on the screen in the x direction. The operation is described in detail in the following.

Incidentally, the image distortion correction parameter decoder 34 for the y direction shown in FIG. 2 has a configuration similar to the one of the image distortion correction parameter decoder 33 for the x direction, and operates similarly to the image distortion correction parameter decoder 33.

First, the distortion parameter buffer 61 receives the inputting of the compressed data Pc, grid position information Lp indicating the position of the grid corresponding to the compressed data Pc, and grid constant information Lc composed of the reciprocal number of the width of the grid from the correction parameter encoder 5, and the distortion parameter buffer 61 stores the received data and information. Furthermore, the distortion parameter buffer 61 receives the inputting of a command signal Cd from the control micro computer 8.

The grid determining unit 62 receives the x coordinate (xt) and the y coordinate (yt) of the point where the image after correction is obtained from the signal processing unit 10 together with the correction parameter requesting signal Rx, and determines the grid frame in which the point is included. Hereupon, the grid determining unit 62 compares the supplied coordinates (xt, yt) with grid information LI supplied from the distortion parameter buffer 61 to determine the grid frame.

Figure 24A:
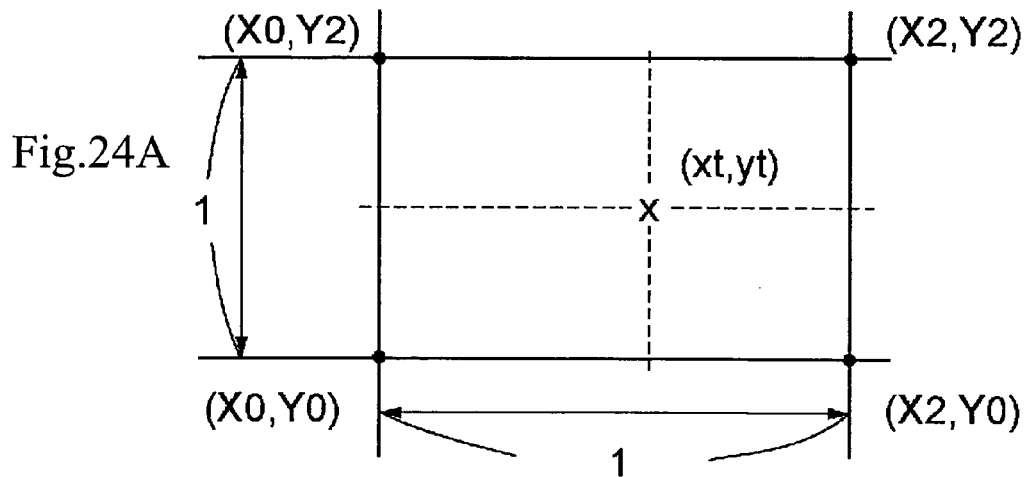
FIGS. 24A and 24B are views illustrating the operation of the correction parameter decoder shown in FIG. 23.

Next, the normalizing unit 63 normalizes the coordinates (xt, yt) in accordance with the following expression (2) for executing the predetermined interpolation operation within the range of the grid frame determined by the grid determining unit 62. Incidentally, hereupon, as shown in FIG. 24A, it is supposed that the coordinates at the four corners of the grid frame including the coordinates (xt, yt) are (X0, Y0), (X0, Y2), (X2, Y0) and (X2, Y2).

$$Px = \frac{xt - X0}{X2 - X0} \\ Py = \frac{yt - Y0}{Y2 - Y0}$$
(2)

Incidentally, the values of the 1/(X2−X0) and 1/(Y2−Y0) in the expression (2) are calculated by the grid splitting unit 11 included in the correction parameter encoder 5, and the normalizing unit 63 receives the values from the distortion parameter buffer 61 as the grid constant information Lc. Accordingly, by the execution of the multiplication using the values by the normalizing unit 63, the coordinates (px, py) are calculated.

Figure 24B:
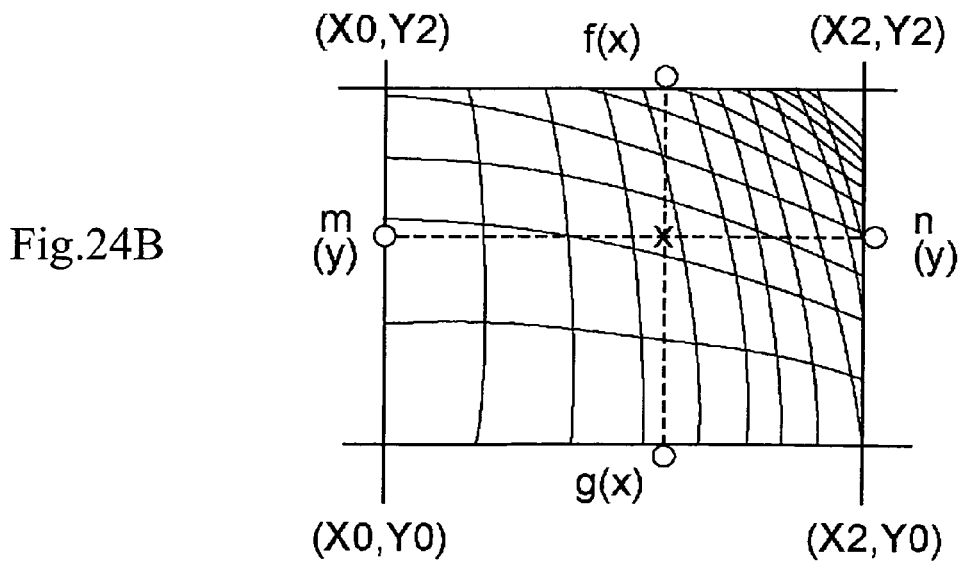

The function converting unit 64 obtains correction quantity parameters f(x), g(x), m(y) and n(y) as the functions of x or y in the grid frame including the coordinates (xt, yt) as shown in FIG. 24B. Moreover, the function converting unit 64 receives the coefficients Ca, Cb and Cc in each of the four functions as coefficient information CL from the distortion parameter buffer 61.

Then, the function converting unit 64 obtains the correction quantity parameters of the coordinates (xt, yt) by using the four functions. For securing the continuity of the functions in the x direction and the y direction, the function converting unit 64 converts the four functions f, g, m and n into, for example, approximate functions F, G, M and N in consideration of weighting as shown in the following expression (3). Incidentally, fa, fb and fc in the expression (3) indicate coefficients corresponding to the coefficients Ca, Cb and Cc in the function f. Similarly, ga, gb and gc indicate coefficients corresponding to the coefficients Ca, Cb and Cc in the function g. Ma, mb and mc indicate coefficients corresponding to the coefficients Ca, Cb and Cc in the function m. Na, nb and nc indicates coefficients corresponding to the coefficients Ca, Cb and Cc in the function n.

$$F(x) = 2 \times fa \times x^2 + (fb - fa) \times x + fc \\ G(x) = 2 \times ga \times x^2 + (gb - ga) \times x + gc \\ M(Y) = 2 \times ma \times y^2 + (mb - ma) \times y + mc \\ N(y) = 2 \times na \times y^2 + (nb - na) \times y + nc$$
(3)

Incidentally, the function converting unit 64 supplies the coordinates (px, py) supplied from the normalizing unit 63 to the plane interpolating unit 65 as they are.

Then, the plane interpolating unit 65 calculates the correction quantity parameter Xm at the coordinates (xt, yt) in accordance with the expression (4) by using the functions F, G, M and N obtained by the function converting unit 64 and the information indicating the coordinates (px, py).

$$Xm = \frac{1}{2} \times \left\{ \begin{matrix} (1 - py) \times F(px) + py \times G(px) + \\ (1 - px) \times N(py) + px \times M(py) \end{matrix} \right\}$$
(4)

The plane interpolating unit 65 supplies the correction quantity parameter Xm calculated by such method to the signal processing unit 10 together with an enable signal EN indicating the end of the calculation operation of the parameter. Incidentally, the image distortion correction parameter decoder 34 for the y direction calculates the correction quantity parameter Ym by a method similar to the one described above, and supplies the calculated parameter Ym to the signal processing unit 10 together with the enable signal EN.

Incidentally, the above-mentioned functions f, g, m and n constituting the grid frame may be generally approximated by a n-th order polynomial (n denotes a natural number) besides being approximated by a quadratic polynomial in a segment as described above.

Figure 25:
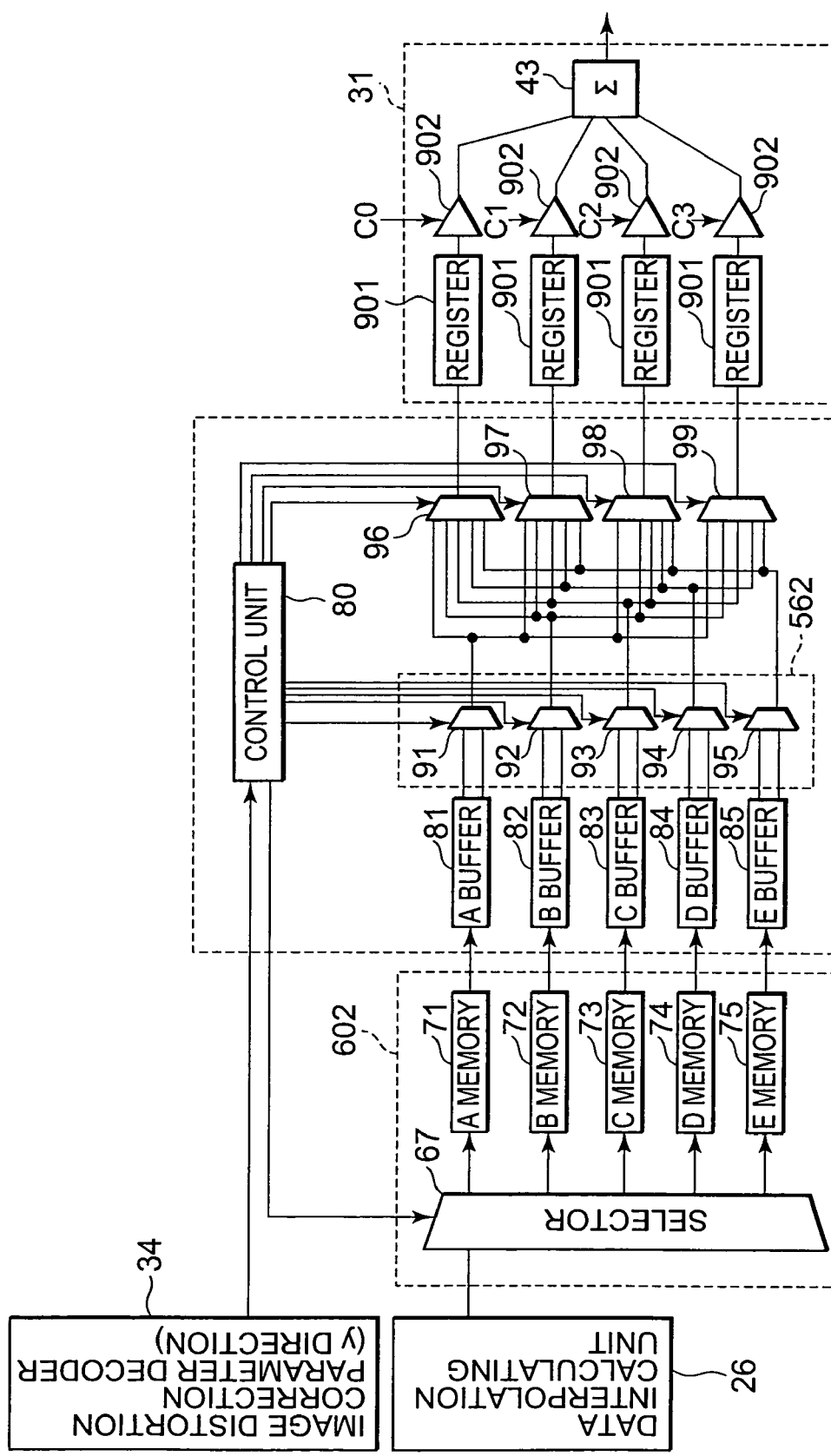
FIG. 25 is a view showing the configuration of image memories, a data obtaining unit and the data interpolation calculating unit shown in FIG. 2.

FIG. 25 is a view showing the configurations of the image memory 602, the data obtaining unit 29 and the data interpolation calculating unit 31 shown in FIG. 2. Incidentally, FIG. 25 shows the configurations in the case where the image processing apparatus 2 generates the image data at each pixel by the interpolation operation using the image data of 16 pixels of (4×4) taps.

As shown in FIG. 25, the image memory 602 includes a selector 67, and five memories of the number larger than the number of vertical taps by one, namely an A memory 71, a B memory 72, a C memory 73, a D memory 74 and E memory 75. The data obtaining unit 29 includes a control unit 80, an A buffer 81, a B buffer 82, a C buffer 83, a D buffer 84, an E buffer 85, a cycle splitting unit 562 and selectors 96 to 99. Incidentally, the cycle splitting unit 562 includes selectors 91 to 95.

Hereupon, the data obtaining unit 29 includes five buffers (from the A buffer 81 to the E buffer 85), the number of which is larger than the number of vertical taps by one as described above, the corresponding five selectors 91 to 95, and four selectors 96 to 99, the number of which is the number of vertical taps.

Moreover, the data interpolation calculating unit 31 includes four registers 901, the multiplication circuit 902 and an adder circuit 43.

In the above description, the selector 67 is connected to the data interpolation calculating unit 26 and the control unit 80, and the A memory 71, the B memory 72, the C memory 73, the D memory 74 and the E memory 75 are connected to the selector 67.

Moreover, the control unit 80 is connected to the image distortion correction parameter decoder 34. The A buffer 81 is connected to the A memory 71. The B buffer 82 is connected to the B memory 72. Similarly, the C buffer 83 is connected to the C memory 73. The D buffer 84 is connected to the D memory 74. The E buffer 85 is connected to the E memory 75.

Moreover, the selector 91 is connected to the A buffer 81. The selector 92 is connected to the B buffer 82. The selector 93 is connected to the C buffer 83. Similarly, the selector 94 is connected to the D buffer 84. The selector 95 is connected to the E buffer 85. Moreover, the selectors 96 to 99 is connected to the five selectors 91 to 95, respectively. Incidentally, the selectors 91 to 99 is controlled by the control unit 80, respectively.

Moreover, the registers 901 are connected to the selectors 96 to 99, respectively. The multiplication circuits 902 are connected to the registers 901, respectively. Then, all of the four multiplication circuits 902 are connected to one adder circuit 43.

Hereupon, as described above, the data subjected to the interpolation processing in the horizontal direction by the data interpolation calculating unit 26 is written into the image memory 602, and the interpolation processing in the vertical direction is simultaneously performed to the data obtained from the image memory 602 by the data obtaining unit 29, whereby an image distortion correction is executed without generating any frame delay as a processing waiting time.

In the following, the operations of the image memory 602, the data obtaining unit 29 and the data interpolation calculating unit 31 shown in FIG. 25 are described in detail. First, the data subjected to interpolation processing in the horizontal direction is sequentially supplied to the selector 67 from the data interpolation calculating unit 26. The data is sorted and stored into five memories of the A memory 71 to the E memory 75 by the selector 67 controlled by the control unit 80.

Then, the data stored in the A memory 71 is supplied to the selector 91 through the A buffer 81. The data stored in the B memory 72 is supplied to the selector 92 through the B buffer 82. Similarly, the data stored in the C memory 73 is supplied to the selector 93 through the C buffer 83. The data stored in the D memory 74 is supplied to the selector 94 through the D buffer 84. The data stored in the E memory 75 is supplied to the selector 95 through the E buffer 85.

Hereupon, the respective selectors 91 to 95 included in the cycle splitting unit 562 split the data read, for example, per two pixels from the A buffer 81 to the E buffer 85 in accordance with the control by the control unit 80 to supply the data for one pixel at every cycle to the selectors 96 to 99.

Then, the respective selectors 96 to 99 selectively output the data supplied from the selectors 91 to 95 to the registers 901 by the control by the control unit 80. Accordingly, four pieces of data, the number of which is the number of the taps necessary for the interpolation processing in the vertical direction, are selectively supplied to the data interpolation calculating unit 31.

Furthermore, the respective data stored in the registers 901 are multiplied by interpolation coefficients C0 to C3 by the respective multiplication circuits 902, and the four products are added to one another in the adder circuit 43. Accordingly, the interpolation operations in the vertical direction are performed, and the interpolated data are supplied to the output data buffer 32.

Figure 26:
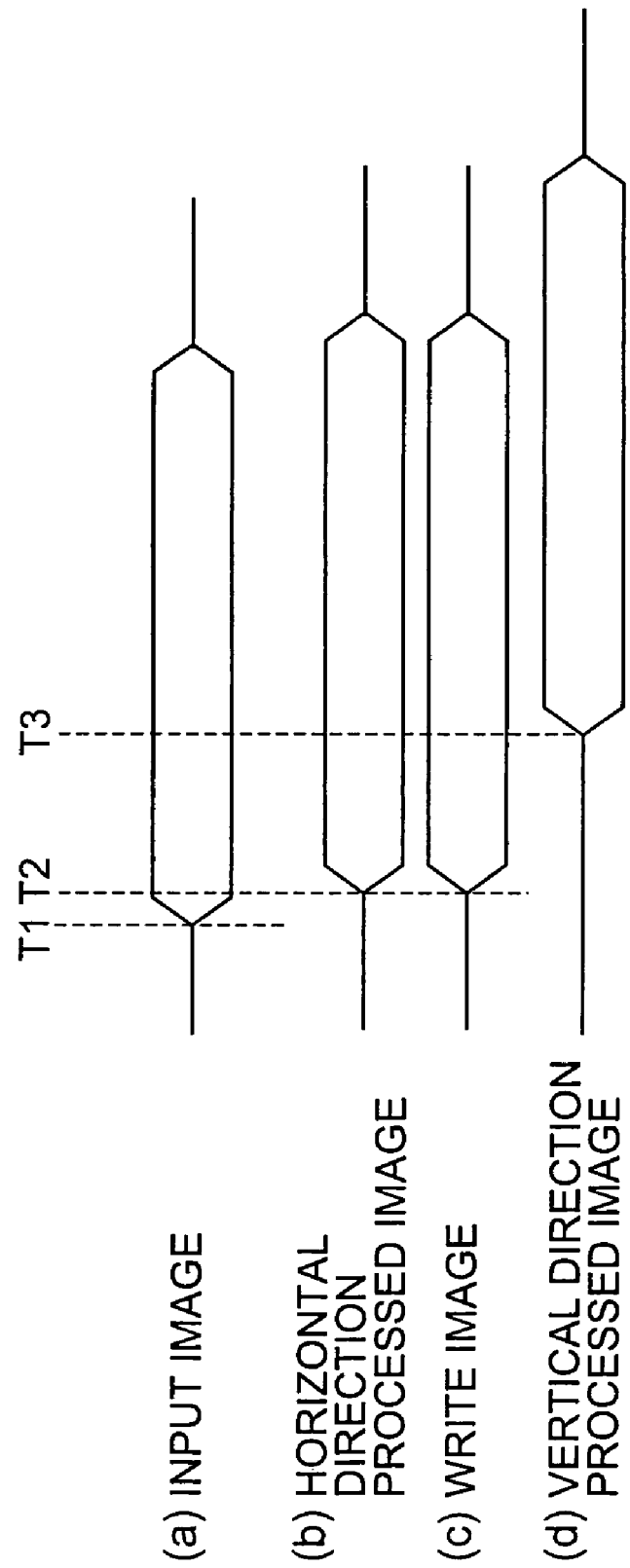
FIG. 26 is a timing chart showing the timing of horizontal one-dimensional interpolation processing and vertical one-dimensional interpolation processing.

Hereupon, referring to FIG. 26, the operation of the image processing apparatus 2 according to the embodiment of the present invention is described. Incidentally, in FIGS. 26(a) to 26(d), the image data for one frame is shown.

First, as shown in FIG. 26(a), when the image data is input to the signal processing unit 10 from the time T1, the interpolation processing in the horizontal direction is performed by the horizontal one-dimensional interpolating unit 501 from the time T2. Then, as shown in FIG. 26(c), the image subjected to the interpolation processing in the horizontal direction is sequentially written into the A memory 71 to the E memory 75 included in the image memory 602 after the time T2. Hereupon, the data for vertical processing is, for example, read from the image memory 602 to the data obtaining unit 29 in odd cycles, and the data subjected to horizontal processing is written from the data interpolation calculating unit 26 into the image memory 602 in even cycles. Accordingly, distortion correction processing of two-cycle period is executed.

Figure 27:
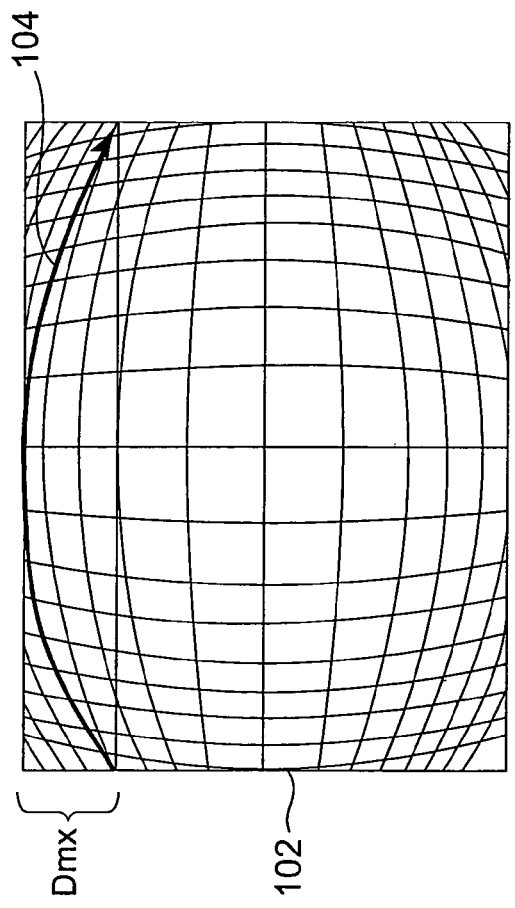
FIG. 27 is a view illustrating memory capacity necessary for executing the horizontal one-dimensional interpolation and the vertical one-dimensional interpolation.

In this case, as shown in FIG. 27, the interpolation operation of each line in the vertical direction is sequentially executed from the time T3 when data Dmx for the number of lines according to the maximum distortion quantity in the vertical direction on the maximum distortion curve 104 of the horizontal lines in the image 102 has been stored in the image memory 602. Consequently, the delay time of the interpolation operation is set to be in a range from the time T1 to the time T3, and there is no necessity of setting the time of performing the interpolation processing of the data for one frame in the horizontal direction (frame delay) to be a waiting time, whereby the image distortion correction can be executed in real time.

Moreover, as the whole, the image memory 602 has a memory capacity for storing the data for a number obtained by adding the number of lines corresponding to the maximum distortion quantity to the number of the taps for the vertical processing (e.g. four taps) in the vertical direction, and for the number of the pixels of the image in the horizontal direction which has been input into the signal processing unit 10 in the horizontal direction. Incidentally, for example, the five memories of the A memory 71 to the E memory 75 shown in FIG. 25 are set to have the same capacity, and the port width of each memory is set as, for example, 32 bits.

Figure 28:
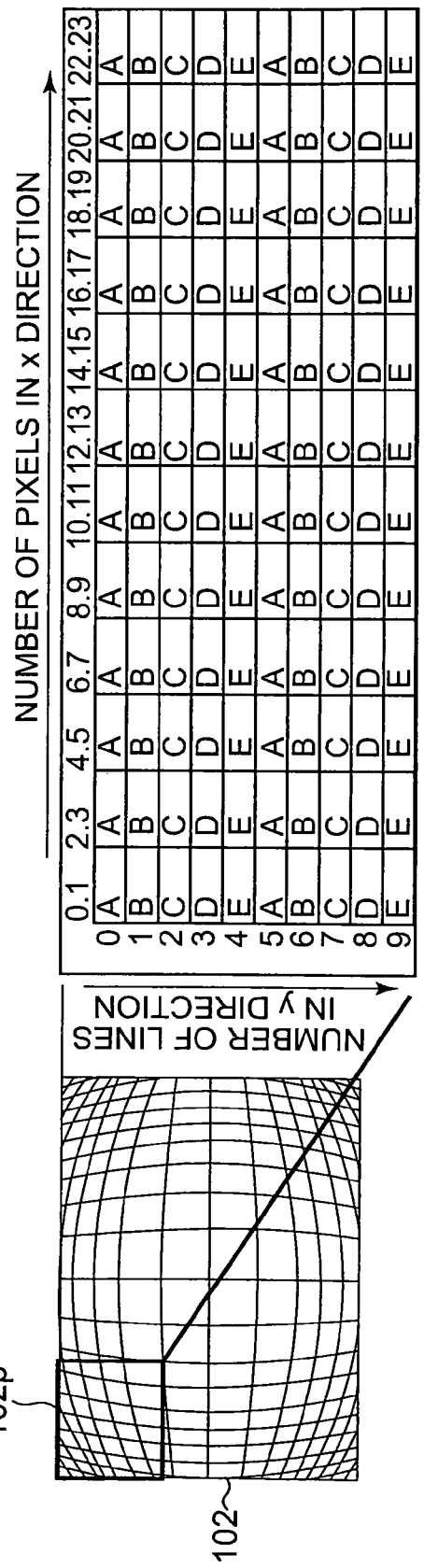
FIG. 28 is a view illustrating a data storing method for storing into the image memory shown in FIG. 25.

Hereupon, a method for storing the data in an area 102P in the image 102 into the image memory 602 is shown in FIG. 28. Incidentally, the letters "A" to "E" in FIG. 28 denote the "A memory" 71 to the "E memory" 75 shown in FIG. 25. Moreover, in the case where the port width of each memory is made of 32 bits and the data for one pixel is made of 16 bits including a Y signal (brightness information) and a C signal (color difference information) as described above, the selector 67 sequentially stores the data into the A memory 71 to the E memory 75 under the setting of the data for two pixels as a unit.

That is to say, as shown in FIG. 28, the selector 67 stores the data at the $0^{th}$ to the $23^{rd}$ pixels on the $0^{th}$ line into the A memory 71, and then stores the data at the $0^{th}$ to the $23^{rd}$ pixels on the first line into the B memory 72. Moreover, similarly, the selector 67 stores the data at the $0^{th}$ to the $23^{rd}$ pixels on the second line into the C memory 73. The selector 67 stores the data at the $0^{th}$ to the $23^{rd}$ pixels on the third line into the D memory 74. The selector 67 stores the data at the $0^{th}$ to the $23^{rd}$ pixels on the fourth line into the E memory 75. Incidentally, the selector 67 sequentially stores the data on each line into the A memory 71 to the E memory 75 every line similarly in the successive lines.

In the following, the reason why the data obtaining unit 29 needs the number of the buffers larger than the number of the vertical taps by one is described. When the image 102 having distortion is locally viewed, as shown in patterns 1 to 3 shown in FIGS. 29A to 29C, there is not the case where image data has moved over two pixels or more in the vertical direction in two pixels adjoining in the horizontal direction.

Figure 30A:
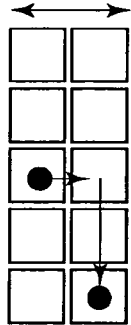
FIGS. 30A and 30B are views showing unchangeable patterns of an adjoining pixel in the vertical direction.
Figure 30B:
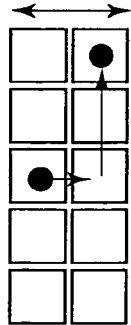

That is to say, as shown in the pattern 1 of FIG. 29A, the image data does not move at all in the vertical direction in the pixels adjoining in the horizontal direction. Alternatively, as shown in the patterns 2 and 3 of FIGS. 29B and 29C, although the image data moves into the vertical direction for one pixel, the image data does not move over two pixels in the vertical direction in the pixels adjoining in the horizontal direction as shown in FIGS. 30A and 30B.

Figure 31:
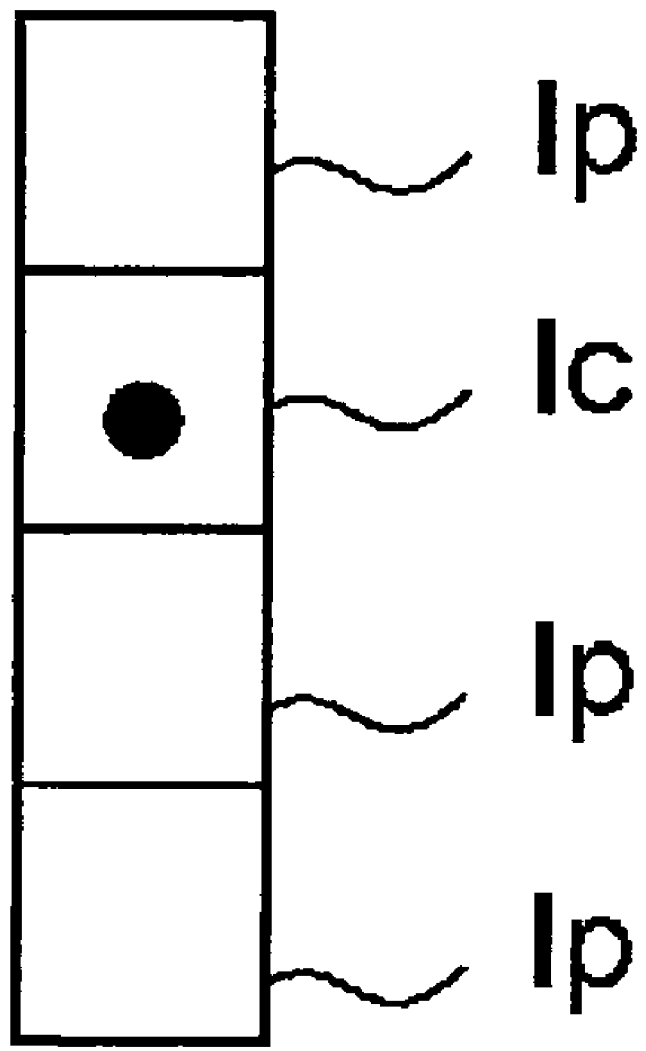
FIG. 31 is a view illustrating vertical four-tap processing.

Hereupon, in the vertical four-tap processing, as shown in FIG. 31, filtering processing is executed by using four-pixel data including three peripheral pixels Ip adjoining to the centre pixel Ic in the vertical direction.

Figure 32:
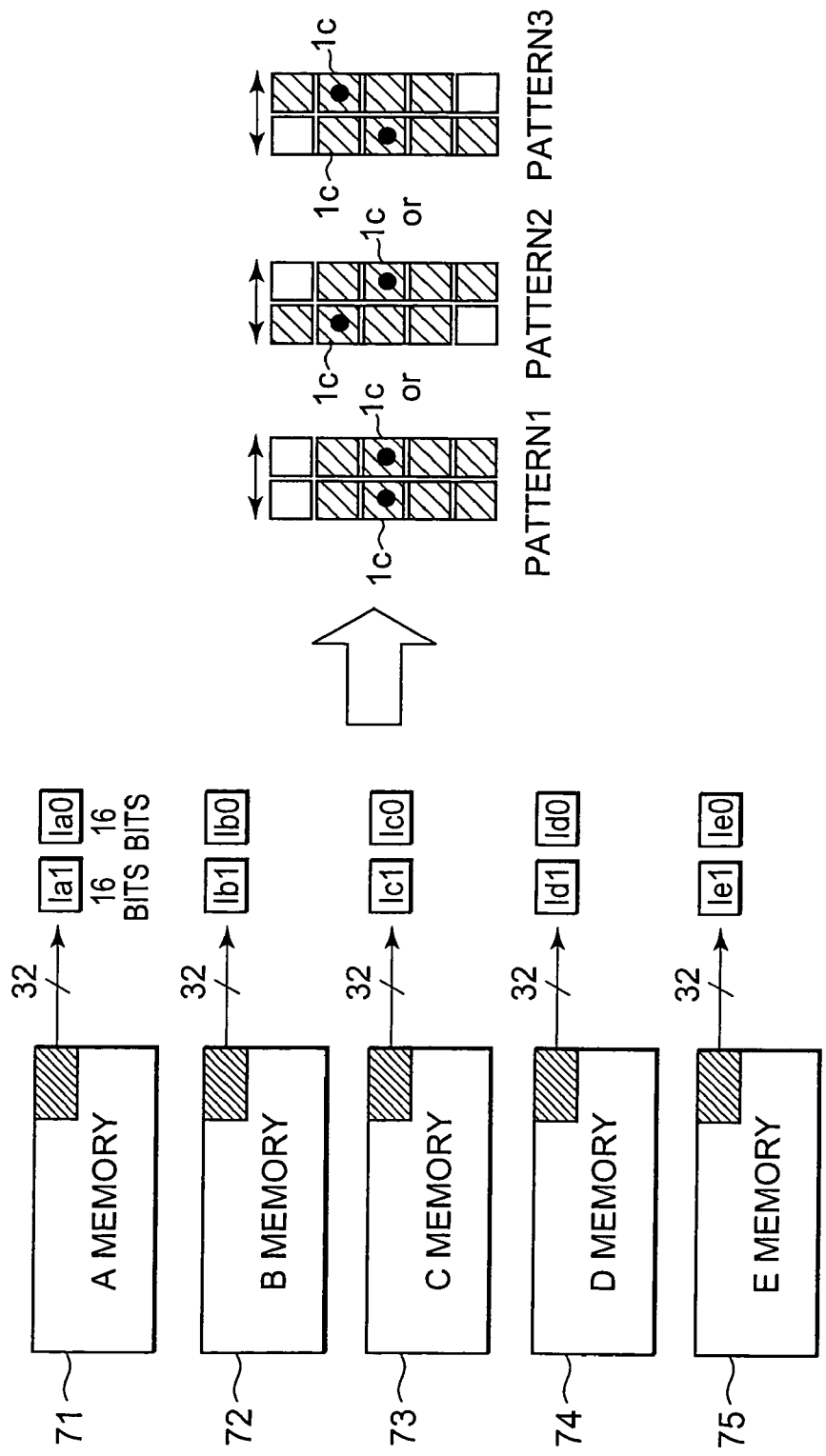
FIG. 32 is a view illustrating a method of reading data from the image memories shown in FIG. 25.
Figure 33:
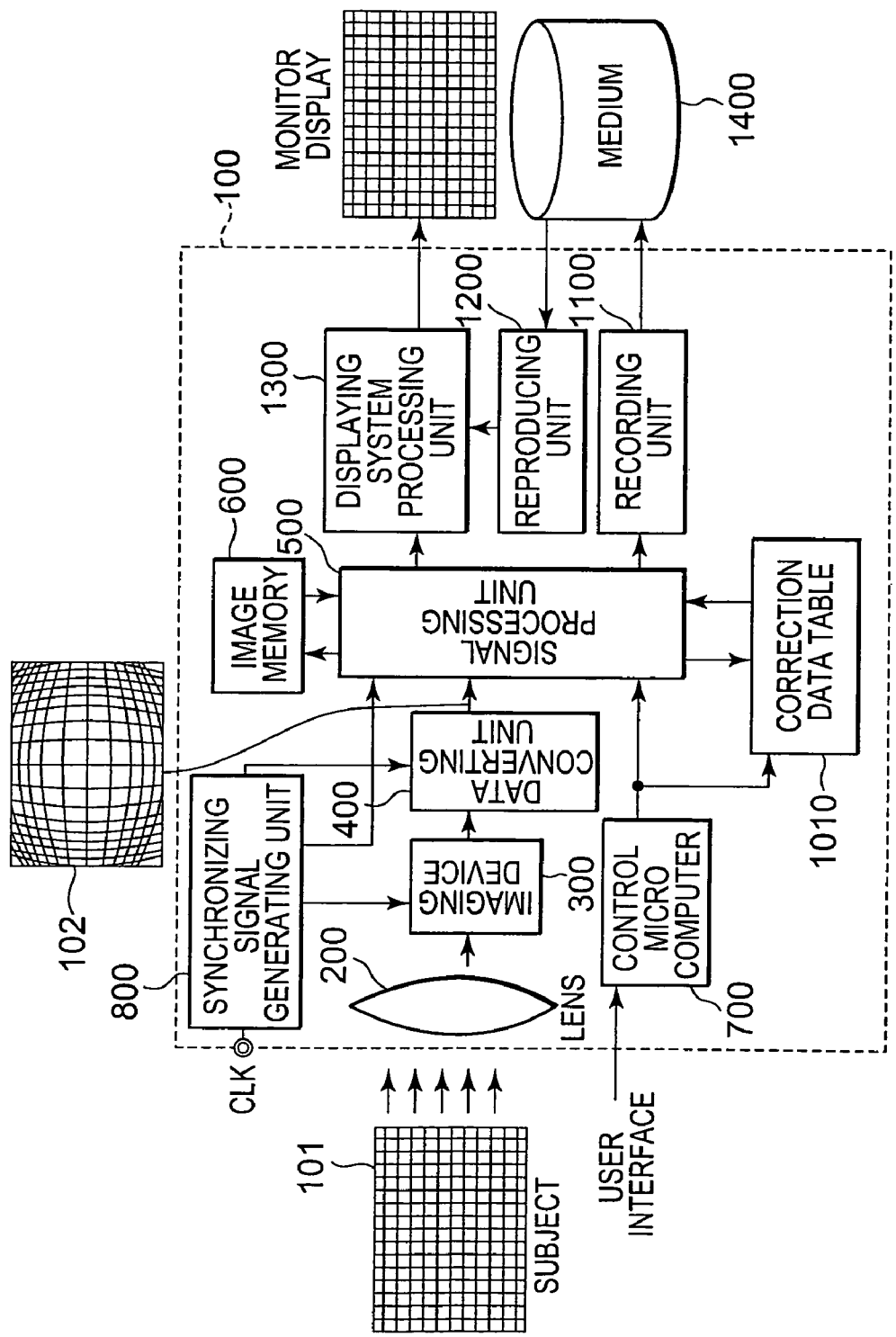
FIG. 33 is a block diagram showing the configuration of a conventional image processing apparatus.
Figure 34:
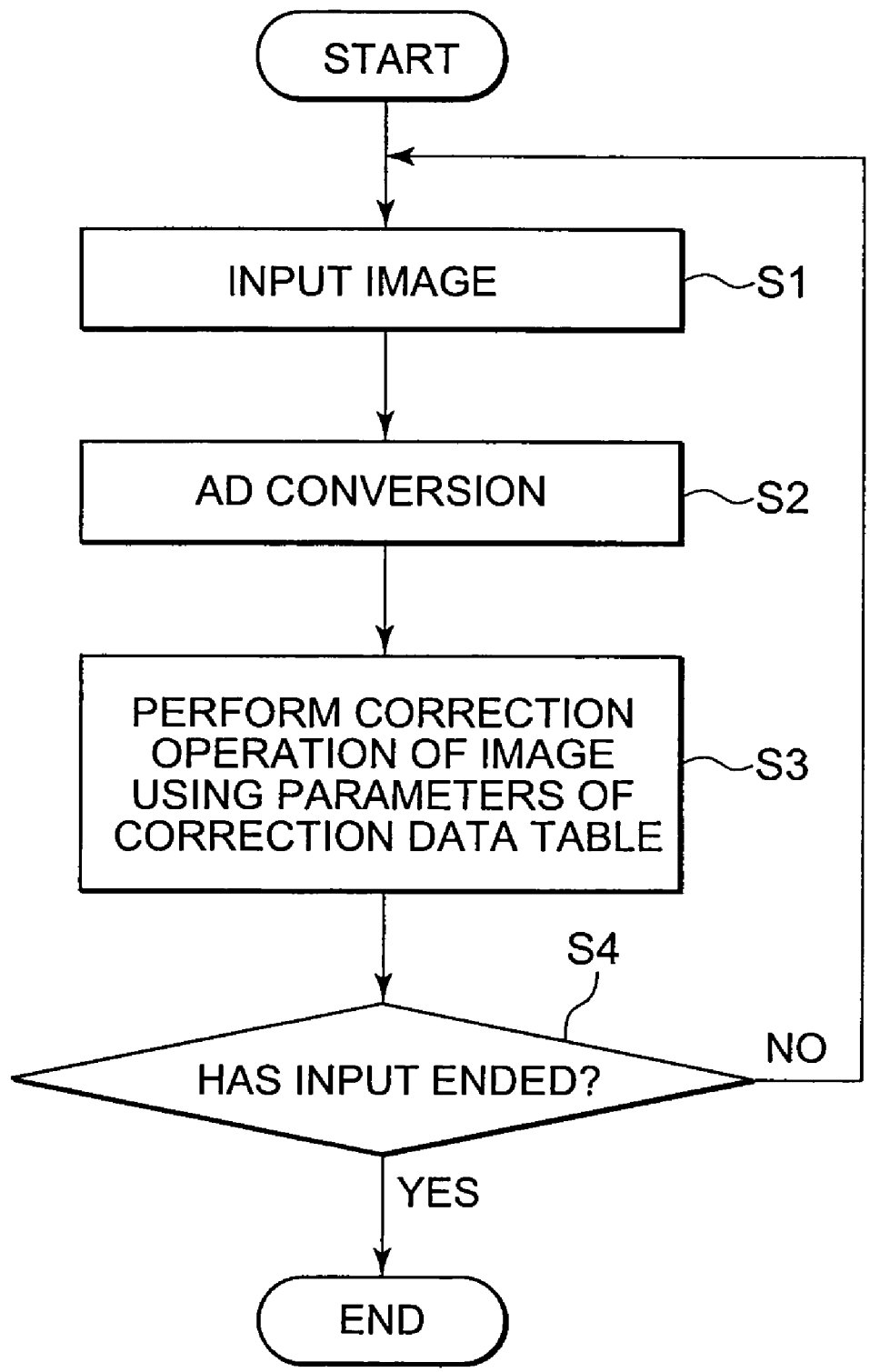
FIG. 34 is a flow chart showing the outline of the operation of the image processing apparatus shown in FIG. 33.
Figure 35:
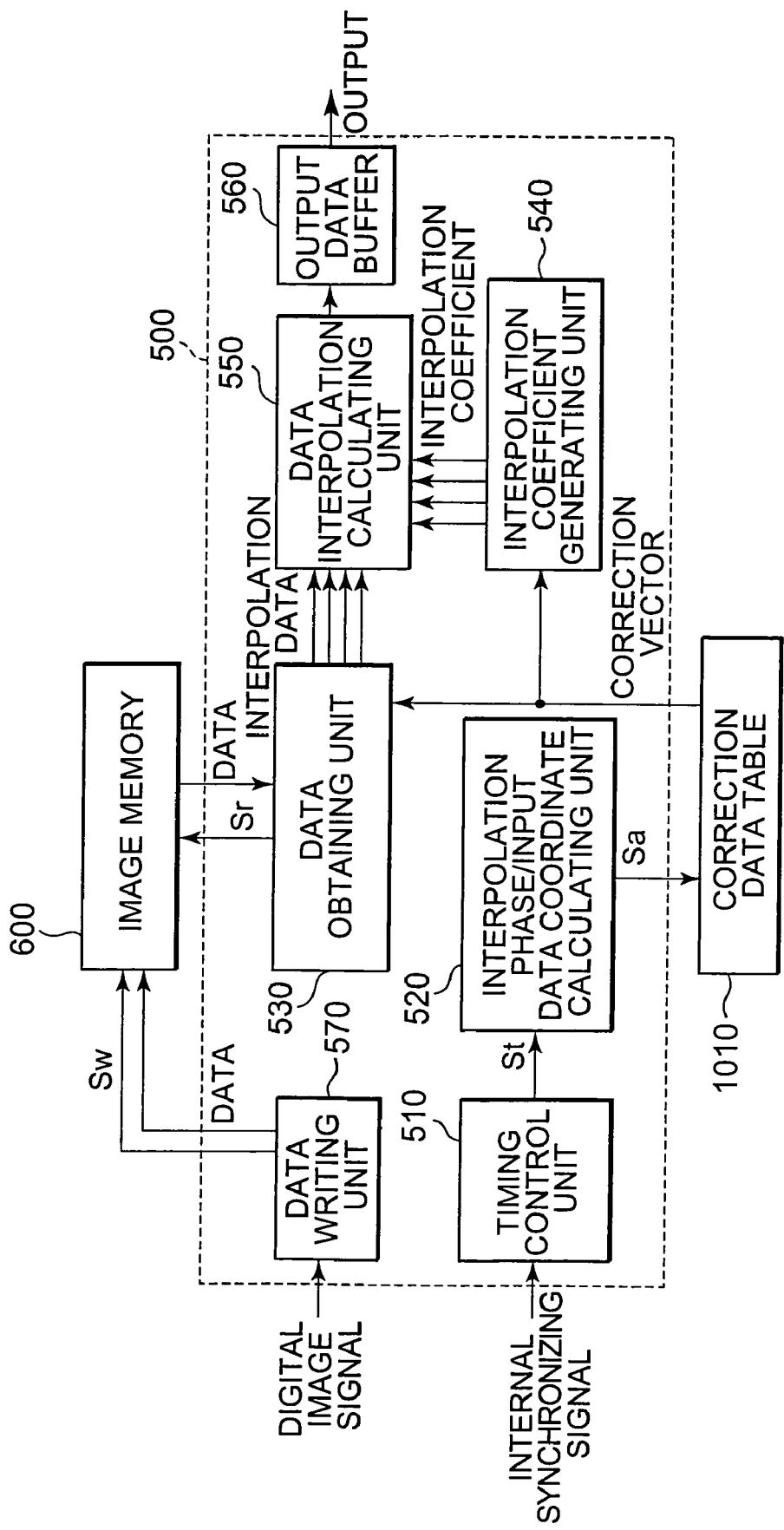
FIG. 35 is a block diagram showing the configuration of a signal processing unit shown in FIG. 33.
Figure 37:
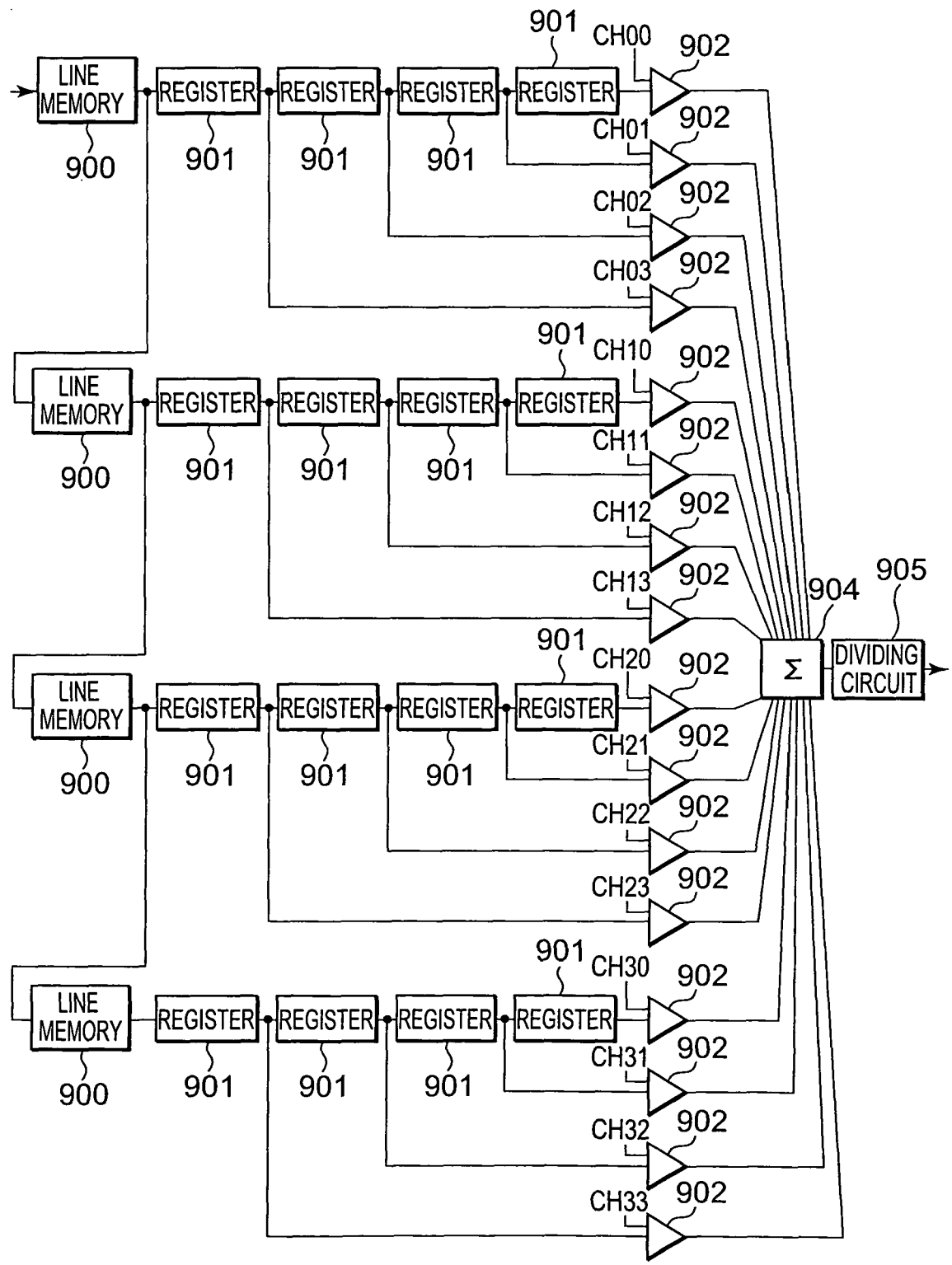
FIG. 37 is a block diagram showing the configuration of a data interpolation calculating unit shown in FIG. 35.

In this case, as shown in FIG. 32, the five memories of the A memory 71 to the E memory 75 included in the image memory 602 are severally supposed to have a port of, for example, 32 bits. In this case, image data of 16 bits is output for two pixels through each of the ports by one time of access.

That is to say, as shown in FIG. 32, by one time of access, pieces of image data Ia0 and Ia1, each composed of 16 bits, is read by the two pixels from the A memory 71. Pieces of image data Ib0 and Ib1, each composed of 16 bits, is read by the two pixels from the B memory 72. Pieces of image data Ic0 and Ic1, each composed of 16 bits, is read by the two pixels from the C memory 73. Moreover, similarly, pieces of image data Id0 and Id1, each composed of 16 bits, is read by the two pixels from the D memory 74. Pieces of image data Ie0 and Ie1, each composed of 16 bits, is read by the two pixels from the E memory 75.

In the way described above, by reading the image data for adjoining two pixels the number of which is larger than the number of taps by one in the vertical direction, the same processing is executed in every column even if a change between adjoining pixels is any one of the patterns 1 to 3 shown in FIGS. 29A to 29C, respectively. That is to say, for example, as shown in shaded areas of FIG. 32, by executing the filtering processing of the object of the image data in four pixels being in a row in the vertical direction from a pixel located at an upper position of the center pixel Ic by one to a pixel located at a lower position of the center pixel Ic by two in each column, the image data of the two pixels adjoining in the horizontal direction is severally generated.

Incidentally, which pattern is corresponding to the change between the adjoining pixels among the patterns 1 to 3 shown in FIGS. 29A to 29C, respectively, is previously identified before the filtering processing by the control unit 80.

More specifically, the control unit 80 receives the y coordinates of two center pixels Ic in two columns adjoining in the horizontal direction from the image distortion correction parameter decoder 34, and controls the selectors 96 to 99 according to the difference of the y coordinates, whereby, the image data shown in the shaded areas of FIG. 32 is selectively supplied to the data interpolation calculating unit 31 as the object of the filtering processing.

Incidentally, in the above, the filtering processing of four taps is described as an example. However, it is needless to say that the image processing method according to the embodiment of the present invention can be applied to the filtering processing other than the processing of four taps by configuring the image memory 602, the data obtaining unit 29 and the data interpolation calculating unit 31 to ones according to the number of taps to alter the input-output cycles of data against the image memory 602.

As described above, according to the image processing system in the embodiment of the present invention, one-dimensional interpolation operations are performed to an imaged image with optical distortion in the horizontal direction and in the vertical direction, and correction vectors are effectively used, whereby, the distortion correction not only to a still image but also to a moving image requiring real time processing can be implemented by means of a simple configuration, and a high quality image having no distortions can be easily obtained.

Moreover, according to the image processing system in an embodiment of the present invention, the distortion of an image can be corrected in real time by signal processing whereby, the degree of freedom of designing a lens can be heightened, and the miniaturization of the lens and the reduction of the cost of the lens can be easily realized.

According to the image processing apparatus, the image processing system and the image processing method of the present invention, the distortion of an original image can be corrected in real time at a low cost, therefore, a high quality image can be easily obtained.

The invention claimed is:

1. An image processing system for correcting an original image having distortion, comprising:
    an encoded parameter storage means for storing horizontal correction parameters and vertical correction parameters, the horizontal correction parameters indicating distances in the horizontal direction by which a horizontal correcting means adjusts designated pixels in the original image and the vertical correction parameters indicating distances in the vertical direction by which a vertical correcting means adjusts designated pixels in the original image;
    horizontal decoding means for decoding said encoded horizontal correction parameters supplied from said encoded parameter storage means;
    the horizontal correcting means for correcting distortion along the horizontal direction of said original image by performing one-dimensional horizontal interpolation operations between the designated pixels in the original image using said horizontal correction parameters decoded by said horizontal decoding means;
    vertical decoding means for decoding said encoded vertical correction parameters supplied from said encoded parameter storage means; and
    the vertical correcting means for correcting distortion along the vertical direction of said original image by performing one-dimensional vertical interpolation operations between the designated pixels in the original image using said vertical correction parameters decoded by said vertical decoding means,
    wherein said horizontal correction parameters and vertical correction parameters are obtained by performing grid split, at a grid splitting means, according to a control signal supplied from a user interface, and
    parameter compressing means for selectively compressing said horizontal correcting parameters at grid points obtained by said grid split and supplied to said horizontal decoding means, and for selectively compressing said vertical correcting parameters at said grid points and supplied to said vertical decoding means.

2. The image processing system according to claim 1, wherein:
   said horizontal decoding means includes
      a first grid determining means for determining a grid frame enclosing each pixel point of a generated image, according to a grid generated by said grid splitting means, and
      a horizontal parameter calculating means for approximating each grid frame determined by said first grid determining means by a function, and for calculating said horizontal correcting parameters at each pixel point of said generated image by using said function; and in that:
   said vertical decoding means includes
      a second grid determining means for determining a grid frame enclosing each pixel point of said generated image, according to a grid generated by said grid splitting means, and
      a vertical parameter calculating means for approximating each grid frame determined by said second grid determining means by a function, and for calculating said vertical correcting parameters at each pixel point of said generated image by using said function.

3. The image processing system according to claim 2, wherein at least one of said horizontal parameter calculating means and said vertical parameter calculating means approximates at least one grid frame by means of n-th order polynomial (where n is a natural number).

4. The image processing system according to claim 1, further comprising:
   an image storing means for storing a horizontally corrected image obtained by the correction of said horizontal correcting means;
   wherein said vertical correcting means includes
   data obtaining means for obtaining from said image storing means said horizontally corrected image according to said vertical correcting parameters, and
   interpolation operating means for performing a one-dimensional interpolation operations using said vertical correcting parameters to said horizontally corrected image data obtained by said data obtaining means.

5. An image processing method for correcting an original image having distortion, characterized by comprising:
   a first step of performing grid split to said original image according to a control signal supplied from a user interface;
   a second step of selectively encoding correction quantities in the horizontal direction and in the vertical direction at a grid point obtained by said grid split;
   a third step of decoding said encoded correction quantities in the horizontal direction and in the vertical direction;
   a fourth step of performing a one-dimensional interpolation operation to said original image in the horizontal direction according to a decoded correction quantity in the horizontal direction; and
   a fifth step of performing a one-dimensional interpolation operation to said original image in the vertical direction according to a decoded correction quantity in the vertical direction.

6. The imaging processing method according to claim 5, characterized in that said third step includes:
   a grid frame determining step of determining a grid frame enclosing each pixel point of a generated image, according to a grid generated at said first step; and
   a parameter calculating step of approximating each grid frame determined at said grid frame determining step by means of a function, and for calculating said correction quantities in the horizontal direction and in the vertical direction at each pixel point constituting said generated image by means of said function.

7. The image processing method according to claim 6, characterized in that, at said parameter calculating step, at least one grid frame is approximated by means of an n-th order polynomial (n is a natural number).

8. The image processing method according to claim 1, wherein:
   said horizontal correcting step performs said horizontal one-dimensional interpolation operation by fitting said horizontal correcting parameters for the designated pixels into a quadratic polynomial, which is then used as the basis to determine the distance by which to move image data at pixels between the designated pixels; and
   said vertical correcting step performs said vertical one-dimensional interpolation operation by fitting said vertical correcting parameters for the designated pixels into a quadratic polynomial, which is then used as the basis to determine the distance by which to move image data at pixels between the designated pixels.

* * * * *